(12) United States Patent
Yamazaki

(10) Patent No.: US 10,044,208 B2
(45) Date of Patent: *Aug. 7, 2018

(54) ELECTRONIC DEVICE

(71) Applicant: SEMICONDUCTOR ENERGY LABORATORY CO., LTD., Atsugi-shi, Kanagawa-ken (JP)

(72) Inventor: Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,086

(22) Filed: Feb. 7, 2017

(65) Prior Publication Data

US 2017/0149260 A1    May 25, 2017

Related U.S. Application Data

(63) Continuation of application No. 14/152,104, filed on Jan. 10, 2014, now Pat. No. 9,608,463.

(30) Foreign Application Priority Data

Jan. 11, 2013  (JP) ................................ 2013-004115
Feb. 20, 2013  (JP) ................................ 2013-030753

(51) Int. Cl.
*H02J 7/00* (2006.01)
*H01M 10/0525* (2010.01)
(Continued)

(52) U.S. Cl.
CPC ....... *H02J 7/0052* (2013.01); *H01M 10/0525* (2013.01); *H01M 10/4235* (2013.01);
(Continued)

(58) Field of Classification Search
CPC ........................................................ H02J 7/0052
(Continued)

(56) References Cited

U.S. PATENT DOCUMENTS

| 3,640,770 A | 2/1972 | Zito, Jr. |
| 4,525,437 A | 6/1985 | Yamazaki |

(Continued)

FOREIGN PATENT DOCUMENTS

| CN | 101252212 A | 8/2008 |
| CN | 101569052 A | 10/2009 |

(Continued)

OTHER PUBLICATIONS

International Search Report (Application No. PCT/JP2013/085329) dated Mar. 25, 2014.

(Continued)

*Primary Examiner* — M'Baye Diao
(74) *Attorney, Agent, or Firm* — Nixon Peabody LLP; Jeffrey L. Costellia

(57) ABSTRACT

Degradation of a battery is prevented or the degree of the degradation is reduced, and charge and discharge performance of the battery is maximized and maintained for a long time. A reaction product, which is formed on an electrode surface and causes various malfunctions and degradation of a battery such as a lithium-ion secondary battery, is dissolved by application of electrical stimulus, specifically, by applying a signal to supply a current reverse to a current with which the reaction product is formed (reverse pulse current).

19 Claims, 33 Drawing Sheets

(51) Int. Cl.
*H01M 10/42* (2006.01)
*H01M 10/44* (2006.01)

(52) U.S. Cl.
CPC ........... *H01M 10/44* (2013.01); *H02J 7/0042* (2013.01); *H02J 7/0075* (2013.01); *Y02E 60/122* (2013.01)

(58) Field of Classification Search
USPC ........................................................ 320/137
See application file for complete search history.

(56) References Cited

U.S. PATENT DOCUMENTS

| | | | |
|---|---|---|---|
| 4,857,419 | A | 8/1989 | Jinnai et al. |
| 6,204,545 | B1 | 3/2001 | Nakata |
| 6,366,056 | B1 | 4/2002 | Podrazhansky et al. |
| 7,128,825 | B2 | 10/2006 | Liu et al. |
| 8,193,777 | B2 | 6/2012 | Nakashima |
| 8,988,047 | B2 | 3/2015 | Bartling et al. |
| 2004/0099915 | A1 | 5/2004 | Takayama et al. |
| 2004/0108224 | A1* | 6/2004 | Robertson ............... C25D 21/12 205/789 |
| 2004/0216673 | A1 | 11/2004 | Sakata et al. |
| 2006/0233699 | A1* | 10/2006 | Mills ..................... B01J 19/088 423/648.1 |
| 2008/0197813 | A1 | 8/2008 | Asakura et al. |
| 2010/0188048 | A1 | 7/2010 | Nishino et al. |
| 2011/0274974 | A1* | 11/2011 | Sabi ..................... H01M 2/0212 429/220 |
| 2011/0294009 | A1 | 12/2011 | Kawakami et al. |
| 2012/0244430 | A1 | 9/2012 | Yamazaki et al. |
| 2013/0196441 | A1 | 8/2013 | Rubinsky et al. |
| 2013/0224563 | A1* | 8/2013 | Ihara ................. H01M 10/0566 429/150 |
| 2014/0084849 | A1 | 3/2014 | Lee et al. |
| 2014/0197797 | A1 | 7/2014 | Yamazaki |
| 2014/0199580 | A1 | 7/2014 | Yamazaki |

FOREIGN PATENT DOCUMENTS

| | | |
|---|---|---|
| CN | 101689677 A | 3/2010 |
| JP | 05-152002 A | 6/1993 |
| JP | 2009-032668 A | 2/2009 |
| JP | 2009-181907 A | 8/2009 |
| JP | 2011-216200 A | 10/2011 |
| JP | 2012-009418 A | 1/2012 |
| KR | 2010-0040298 A | 4/2010 |
| WO | WO-2009/001502 | 12/2008 |

OTHER PUBLICATIONS

Written Opinion (Application No. PCT/JP2013/085329) dated Mar. 25, 2014.

Chinese Office Action (Application No. 201380070064.2) dated Dec. 27, 2016.

* cited by examiner

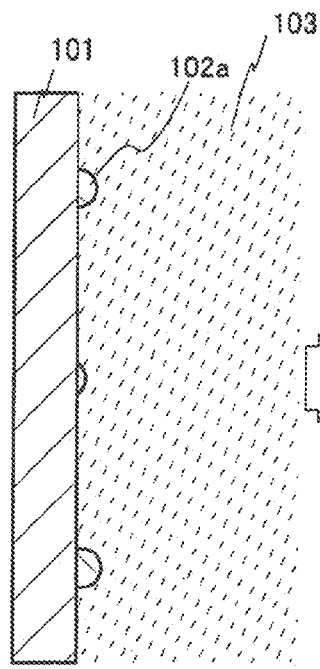
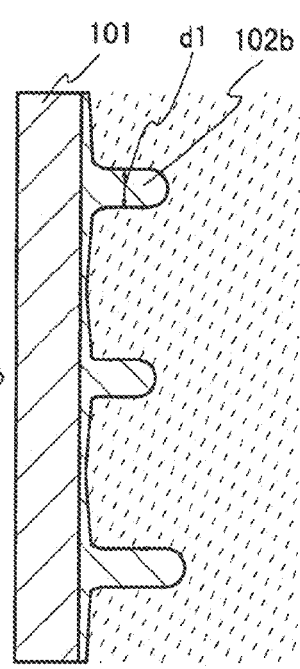
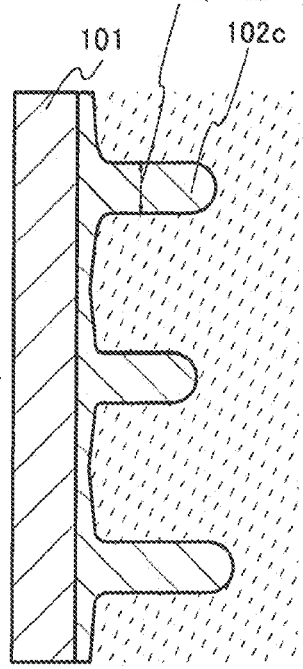
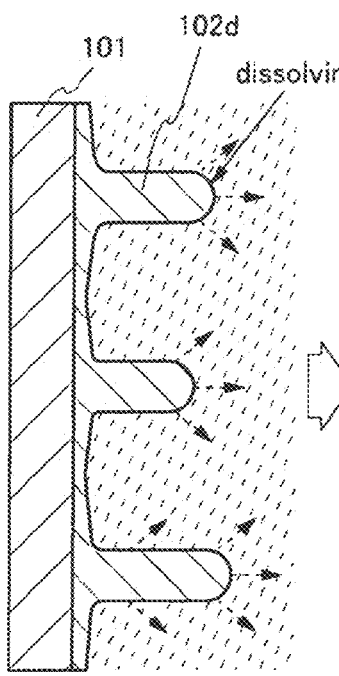
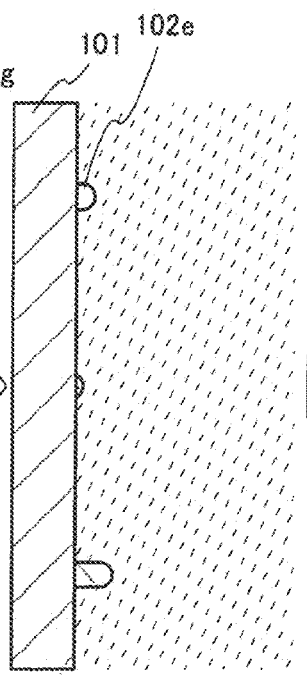
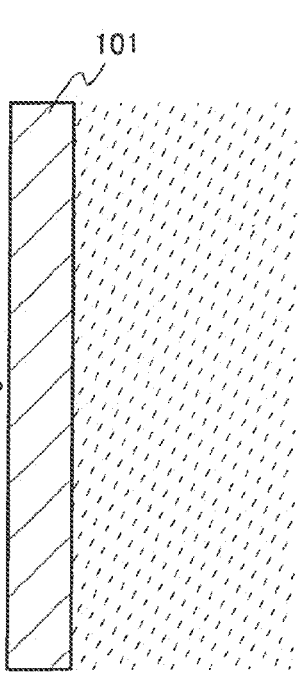

301 304 302a 303

301 302b 301 302c 301 302d
dissolving 301 302e

301 charging

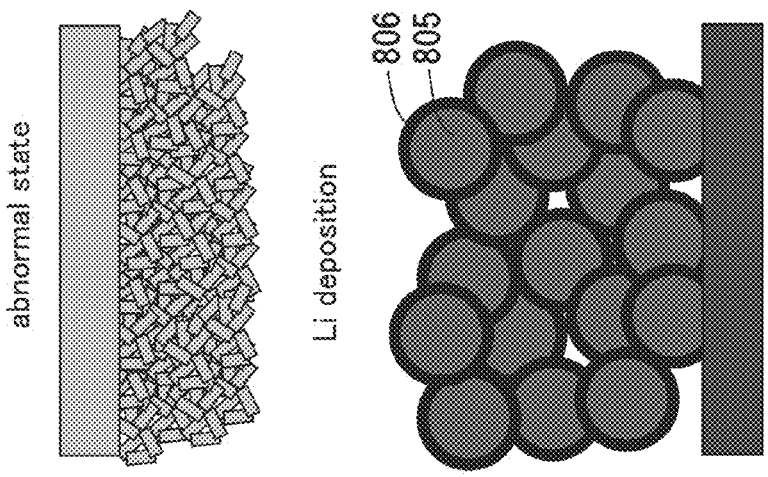
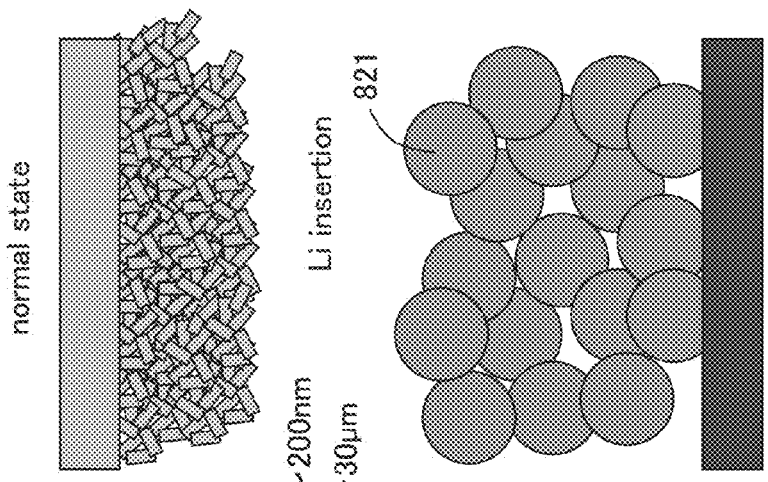
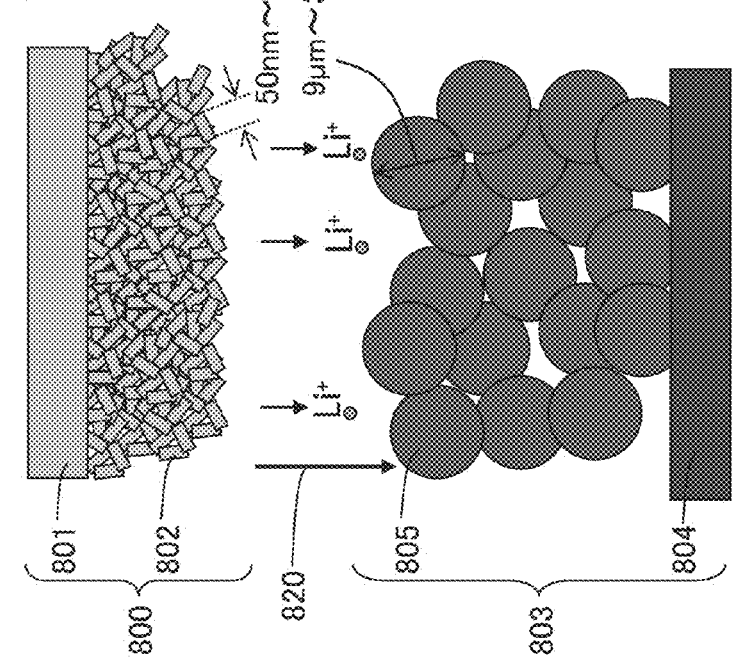

10.0 μm 10.0 μm 10.0 µm 10.0 μm

ELECTRONIC DEVICE

TECHNICAL FIELD

The present invention relates to an object, a method, or a manufacturing method. In addition, the present invention relates to a process, a machine, manufacture, or a composition of matter. In particular, the present invention relates to, for example, a power storage device, a secondary battery, a driving method thereof, or a fabrication method thereof. In particular, the present invention relates to, for example, an electronic device and a method for charging an electronic device. In addition, the present invention relates to a system having a function of reducing the degree of degradation of an electronic device.

Note that an electronic device in this specification generally means a device that can operate by utilizing a battery (also referred to as a power storage device), a conductive layer, a resistor, a capacitor, and the like.

BACKGROUND ART

A lithium-ion secondary battery, which is one of batteries, is used in a variety of applications including a power source of a mobile phone, a fixed power source of a residential power storage system, power storage equipment of a power generation facility, such as a solar cell, and the like. Characteristics such as high energy density, excellent cycle characteristics, safety under various operating environments, and long-term reliability are necessary for the lithium-ion secondary battery.

In addition, the lithium-ion secondary battery includes at least a positive electrode, a negative electrode, and an electrolytic solution (Patent Document 1).

REFERENCE

Patent Document

[Patent Document] Japanese Published Patent Application No. 2012-009418

DISCLOSURE OF INVENTION

The battery such as the lithium-ion secondary battery is degraded due to repeated charge and discharge and the capacity thereof is gradually decreased. The voltage of the battery eventually becomes lower than voltages in a range where an electronic device including the battery can be used; thus, the battery does not function as a battery.

In view of the above, an object of the present invention is to prevent degradation of a battery or to reduce the degree of the degradation and to maximize and maintain charge and discharge performance of the battery for a long time.

Further, batteries are electrochemical devices whose lifetimes are difficult to estimate individually in advance. Although batteries are charged and discharged without any problem when manufactured and thus shipped as quality products, there are some defective products which suddenly do not function as batteries later from any cause.

Another object of the present invention is to prevent a battery from suddenly being non-functional, to secure long-term reliability of each battery, and to increase the long-term reliability. Another object of the present invention is to provide a maintenance-free battery by solving the object. In particular, there is a problem in that the maintenance of a fixed power source or power storage equipment requires considerable cost and time.

Further, although batteries are charged and discharged without any problem when manufactured and thus shipped as quality products, there are some defective products which produce heat, expand, ignite, or explode later from any cause. Hence, another object of the present invention is to ensure the safety of a battery.

Another object of the present invention is to enable rapid charge and discharge of a battery.

Another object of the present invention is to increase the efficiency of charge and discharge to reduce the size of a battery. Another object of the present invention is to provide a novel driving method, a novel charging method, or a novel discharging method of a battery such as a lithium-ion secondary battery. Note that the descriptions of these objects do not disturb the existence of other objects. Note that in one embodiment of the present invention, there is no need to achieve all the objects. Note that other objects will be apparent from and can be derived from the description of the specification, the drawings, the claims, and the like.

The present inventor has found a breakthrough idea that a reaction product (also referred to as dross) deposited on an electrode surface causes various malfunctions and degradation of a battery such as a lithium-ion secondary battery, and that the reaction product is dissolved by application of electrical stimulus, specifically, by applying a signal to supply a current reverse to a current with which the reaction product is formed. One embodiment of the present invention makes it possible to provide a battery which is not degraded in principle.

The signal to supply the reverse current refers to a pulse current, and can also be referred to as a reverse pulse current (also referred to as an inversion pulse current). Note that the reverse pulse current refers to a current of a signal with which a current does not flow successively or continuously but flows momentarily or continuously for a moment (for 0.1 seconds or longer and 3 minutes or shorter, typically 3 seconds or longer and 30 seconds or shorter). Intervals at which the reverse pulse current is supplied and the intensity of the reverse pulse current are set as appropriate.

Here, a mechanism of formation of dross on an electrode surface and a mechanism of dissolution of the dross are described below with reference to FIGS. 1A to 1F.

Note that the term "dross" (which includes a decomposition reaction product layer, a depleted substance, a deposit, and the like in its category) formed on an electrode surface refers to a whisker, for example. The term "depleted substance" refers to part of components (an electrode, an electrolytic solution, or the like) which change in quality and are degraded. Dross may include a compound.

The term "deposit" refers to a substance formed by separation of a crystal or a solid component from an electrode material, a liquid substance, or the like; the deposit can have a film shape, a particle shape, a whisker shape, or the like.

The term "whisker" refers to a crystal that grows from a crystal surface to the outside to have a whisker shape. The whisker grows in a complicated manner in some cases; the whisker branches into a plurality of whiskers in some cases.

FIGS. 1A, 1B, and 1C are schematic cross-sectional views of reaction products 102a, 102b, and 102c, respectively, which are formed on a surface of an electrode 101, typically a negative electrode, through abnormal growth.

FIG. 1A is the schematic view of part of a battery including at least a positive electrode, a negative electrode, and an electrolytic solution.

Only the one electrode 101 and the electrolytic solution in the vicinity of the electrode 101 are illustrated in FIGS. 1A to 1C for simplicity. The electrode 101 and an electrolytic solution 103 correspond to a negative electrode 404 and an electrolytic solution 406 in FIG. 4A, respectively.

Here, a current flow at the time of charging is described with reference to FIG. 4A. When a battery using lithium is regarded as a closed circuit, lithium ions move and a current flows in the same direction. Note that in the battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the terms "anode" or "cathode" is used, whether it is at the time of charging or discharging is noted and whether it corresponds to a positive electrode or a negative electrode is also noted.

Two terminals in FIG. 4A are connected to a charger, and a storage battery 400 is charged. As the charge of the storage battery 400 proceeds, a potential difference between electrodes increases. The positive direction in FIG. 4A is the direction in which a current flows from the one terminal outside the storage battery 400 to a positive electrode 402, flows from the positive electrode 402 to the negative electrode 404 in the storage battery 400, and flows from the negative electrode 404 to the other terminal outside the storage battery 400. In other words, a current flows in the direction of a flow of a charging current.

Here, in FIGS. 1A to 1F, the electrode 101 is either a positive electrode or a negative electrode, and description is made on the assumption that the electrode 101 is a negative electrode. FIG. 1A illustrates the state where a current is supplied between the negative electrode and a positive electrode (not illustrated) during a period t1 and the reaction products 102a are deposited on the electrode 101 that is the negative electrode so that the electrode 101 is dotted with the reaction products 102a.

FIG. 1B illustrates the state where a current is supplied between the negative electrode and the positive electrode during a period t2 (t2 is longer than t1). Projections of the reaction product 102b abnormally grow from the positions where they are deposited and the reaction product 102b is deposited on the entire surface.

FIG. 1C illustrates the state where a current is supplied during a period t3 longer than the period t2. Projections of the reaction product 102c in FIG. 1C grow to be longer than the projections of the reaction product 102b in FIG. 1B in the direction perpendicular to the electrode 101. Note that although an example of a reaction product which grows in length in the direction perpendicular to the electrode 101 is illustrated in FIG. 1B, without particular limitation thereon, and the reaction product may grow and bend to have a bent portion or a plurality of bent portions. A thickness d2 of the projection of the reaction product 102c in FIG. 1C is larger than or equal to a thickness d1 of the projection of the reaction product 102b in FIG. 1B.

Dross is not uniformly deposited on the entire surface of the electrode as a current supply time passes. Once dross is deposited, dross is more likely to be deposited on the position where the dross has been deposited than on the other positions, and a larger amount of dross is deposited on the position and grows to be a large lump. The region where the large amount of dross has been deposited has higher conductivity than the other region. For this reason, a current is likely to concentrate at the region where the large amount of dross has been deposited, and the dross grows around the region faster than in the other region. Accordingly, a projection and a depression are formed by the region where a large amount of dross is deposited and the region where a small amount of dross is deposited, and the projection and the depression become larger as time goes by as illustrated in FIG. 1C. Finally, the large projection and depression cause severe degradation of the battery.

After the state in FIG. 1C, a signal to supply a current reverse to a current with which a reaction product is formed, a reverse pulse current here, is applied to dissolve the reaction product. FIG. 1) illustrates the state at the time immediately after the reverse pulse current is supplied. As shown by arrows in FIG. 1D, a reaction product 102d is dissolved from its growing point. This is because when the reverse pulse current is supplied, the potential gradient around the growing point of the reaction product 102d becomes steep, so that the growing point is likely to be preferentially dissolved. Note that the growing point is at least a part of a surface of the reaction product 102d, for example, a surface of a tip of the reaction product 102d.

The reverse pulse current to supply a current reverse to a current with which dross is formed is supplied in the state where the projection and depression due to non-uniform deposition of dross are formed, whereby a current concentrates at the projection and the dross is dissolved. The dross dissolution means that dross in a region in the electrode surface where a large amount of dross is deposited is dissolved to reduce the area of the region where the large amount of dross is deposited, preferably means that the electrode surface is returned to the state at the time before the dross is deposited on the electrode surface. Even when the electrode surface is not returned to an initial state at the time before the dross is deposited on the electrode surface, a significant effect can be provided by inhibiting an increase in the amount of dross to keep the amount small, or by reducing the size of the dross.

FIG. 1E illustrates a state in the middle of the dissolution of the reaction product by additionally supplying the reverse pulse current; the reaction product 102d is dissolved from its growing point to be the reaction product 102c smaller than the reaction product 102d.

Then, a signal to supply a current reverse to a current with which the reaction product is formed is applied, i.e., a reverse pulse current is supplied, one or more times, for example; thus, ideally, the surface of the electrode 101 can be returned to an initial state at the time before the reaction product is deposited on the surface of the electrode 101 as illustrated in FIG. 1F. Since a current flows from the right side to the left side in FIGS. 1A to 1F in charging, a reverse pulse current is supplied so as to flow in the direction opposite to the direction of the current flow (from the left side to the right side in FIGS. 1A to 1F). Specifically, one period during which the reverse pulse current is supplied is longer than or equal to 0.1 seconds and shorter than or equal to 3 minutes, typically longer than or equal to 3 seconds and shorter than or equal to 30 seconds.

A technical idea of one embodiment of the present invention is to utilize the mechanism of formation of dross and the mechanism of dissolution of the dross. One embodiment of the present invention includes a first electrode and a second electrode, and includes at least an electrolytic solution between the first electrode and the second electrode. A reaction product, which grows from at least one point in a surface of the first electrode due to a current that flows between the first electrode and the second electrode, is dissolved from a growing point of the reaction product by supplying a current reverse to the current. Note that the use of the mechanisms can provide a novel electronic device based on an extremely novel principle.

Another embodiment of the present invention is to apply a signal to supply a current reverse to a current with which a reaction product is formed more than once. That is, another embodiment of the present invention includes a first electrode and a second electrode, and includes at least an electrolytic solution between the first electrode and the second electrode. A reaction product, which grows from at least one point in a surface of the first electrode due to a current that flows between the first electrode and the second electrode, is dissolved from a growing point of the reaction product by supplying a current reverse to the current, and then supply of the current reverse to the current after supply of the current that flows between the first electrode and the second electrode is repeated.

Another embodiment of the present invention is to make a period during which a signal to supply a current reverse to a current with which a reaction product is formed is applied shorter than a period during which the reaction product is formed. That is, another embodiment of the present invention includes a first electrode and a second electrode, and includes at least an electrolytic solution between the first electrode and the second electrode. A reaction product, which grows from at least one point in a surface of the first electrode due to a current that flows between the first electrode and the second electrode for a predetermined period, is dissolved from a growing point of the reaction product by supplying a current reverse to the current for a period shorter than the predetermined period.

In addition, when the reaction product dissolves in the electrolytic solution at high speed, the state in FIG. 1D can be changed into the state in FIG. 1F even if the signal to supply a current reverse to a current with which the reaction product is formed is applied for a very short time.

Note that depending on conditions (e.g., pulse width, timing, and intensity) for applying the signal to supply a current reverse to a current with which a reaction product is formed, the state in FIG. 1D can be changed into the state in FIG. 1F in a short time by applying the signal even only once.

Although the negative electrode is described as an example in FIGS. 1A to 1F, without particular limitation thereon, the same effect can also be obtained in the case of using a positive electrode.

Progress in the degradation of a battery can be prevented or the degree of the degradation can be reduced by applying a signal to supply a current reverse to a current with which a reaction product is formed during charge.

One embodiment of the present invention is not limited to the mechanisms illustrated in FIGS. 1A to 1F. The other examples of the mechanisms are described below.

FIGS. 2A to 2F illustrate mechanisms different from those in FIGS. 1A to 1F in part of a process of generation (or growth) of a reaction product; the reaction product is deposited on an entire electrode surface and partly grows abnormally.

FIGS. 2A, 2B, and 2C are schematic cross-sectional views of reaction products 202a, 202b, and 202c, respectively, which are formed on a surface of an electrode 201, typically a surface of a negative electrode, through abnormal growth. Note that a space between a pair of electrodes is filled with an electrolytic solution 203.

FIG. 2A illustrates the state where a current is supplied between the negative electrode and a positive electrode (not illustrated) during the period t1 and the reaction product 202a is deposited on the entire surface of the electrode 201 that is the negative electrode and partly grows abnormally. Examples of the electrode 201 on which the reaction product 202a is deposited are graphite, a combination of graphite and graphene oxide, and titanium oxide.

FIG. 2B illustrates a reaction product 202b which grows when a current is supplied between the negative electrode and the positive electrode during the period t2 (t2 is longer than t1). FIG. 2C illustrates a reaction product 202c which grows due to a current flow during the period t3 that is longer than the period t2.

After the state in FIG. 2C, a signal to supply a current reverse to a current with which the reaction product is formed is applied to dissolve the reaction product. FIG. 2D illustrates the state at the time immediately after the signal to supply the current reverse to the current with which the reaction product is formed is applied, e.g., a reverse pulse current is supplied. As shown by arrows in FIG. 2D, a reaction product 202d is dissolved from its growing point.

FIG. 2E illustrates a state in the middle of the dissolution of the reaction product by additionally supplying the reverse pulse current; the reaction product 202d is dissolved from its growing point to be a reaction product 202e smaller than the reaction product 202d.

In this manner, one embodiment of the present invention can be applied regardless of the process of generation of the reaction product and the mechanism thereof. By applying a signal to supply a current reverse to a current with which the reaction product is formed one or more times, ideally, the surface of the electrode 201 can be returned to the initial state at the time before the reaction product is deposited on the electrode surface as illustrated in FIG. 2F.

Unlike FIGS. 1A to 1F, FIGS. 3A to 3F are an example where a protective film is formed on an electrode surface and illustrate a state where a reaction product is deposited in a region not covered with the protective film and abnormally grows.

FIGS. 3A to 3C are schematic cross-sectional views of reaction products 302a. 302b, and 302c which abnormally grow and formed in a region of a surface of an electrode 301 (typically, a negative electrode) that is not covered with a protective film 304. Note that a space between a pair of electrodes is filled with an electrolytic solution 303. For the protective film 304, a single layer of a silicon oxide film, a niobium oxide film, or an aluminum oxide film or a stack including any of the films is used.

FIG. 3A illustrates the state where a current is supplied between the negative electrode and a positive electrode (not illustrated) during the period t1, and the reaction products 302a are deposited on exposed portions of the electrode 301 serving as the negative electrode and grow abnormally.

FIG. 3B illustrates the state of the reaction product 302b which grows when a current is supplied between the negative electrode and the positive electrode during the period t2 (t2 is longer than t1). FIG. 3C illustrates the state of the reaction product 302c which grows when a current is supplied during the period t3 longer than the period t2.

After the state in FIG. 3C, a signal to supply a current reverse to a current with which the reaction product is formed is applied to dissolve the reaction product. FIG. 3D illustrates the state at the time immediately after the signal to supply the current reverse to the current with which the reaction product is formed is applied. As shown by arrows in FIG. 3D, a reaction product 302d is dissolved from its growing point.

FIG. 3E illustrates the state where the reaction product is in the middle of the dissolution by additionally supplying the reverse pulse current; the reaction product 302d is dissolved from its growing point to be a reaction product 302e smaller than the reaction product 302d.

Another embodiment of the present invention includes a first electrode, a protective film covering part of the first electrode, a second electrode, and an electrolytic solution between the first electrode and the second electrode. A reaction product, which grows due to a current that flows between the first electrode and the second electrode from a region of a surface of the first electrode which is not covered with the protective film, is dissolved by applying a signal to supply a current reverse to the current. Note that the use of the mechanisms illustrated in FIGS. 3A to 3F can provide a novel electronic device based on an extremely novel principle.

FIG. 4A is a cross-sectional view of a storage battery 400. The negative electrode 404 includes a negative electrode current collector and a negative electrode active material layer in contact with the negative electrode current collector. The negative electrode active material layer faces a positive electrode active material layer, and the electrolytic solution 406 and a separator 408 are provided between the positive electrode active material layer and the negative electrode active material layer. The negative electrode 404 corresponds to any of the electrode 101 in FIGS. 1A to 1F, the electrode 201 in FIGS. 2A to 2F, and the electrode 301 in FIGS. 3A to 3F.

Examples of batteries that can be used as the storage battery 400 include but are not limited to secondary batteries such as a lithium-ion secondary battery, a lithium-ion polymer secondary battery, a liquid circulation battery such as a zinc-bromine battery, and high-operating-temperature secondary batteries such as a sodium-sulfur battery and a lithium-iron sulfide battery. Note that there is no particular limitation on the examples, and the storage battery 400 may include a lithium-ion capacitor, for example.

The positive electrode 402 of the storage battery 400 includes a positive electrode current collector and the positive electrode active material layer in contact with the positive electrode current collector.

FIG. 4B is a longitudinal cross-sectional view of a storage battery electrode 410, in the storage battery electrode 410 in FIG. 4B, an active material layer 414 is provided over the current collector 412. The storage battery electrode 410 can be used as a positive electrode or a negative electrode. The active material layer 414 is formed over only one surface of the current collector 412 in FIG. 4B; however, active material layers 414 may be formed so that the current collector 412 is sandwiched therebetween. The active material layer 414 does not necessarily need to be formed over the entire surface of the current collector 412 and a region that is not coated, such as a region for connection to an external terminal, is provided as appropriate.

<Current Collector>

The current collector 412 can be formed using a highly conductive material which is not alloyed with a carrier ion of lithium or the like, such as a metal typified by stainless steel, gold, platinum, zinc, iron, nickel, copper, aluminum, titanium, or tantalum or an alloy thereof. Alternatively, an aluminum alloy to which an element which increases heat resistance, such us silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collector 412 can have a foil-like shape, a plate-like shape (sheet-like shape), a net-like shape, a cylindrical shape, a coil shape, a punching-metal shape, an expanded-metal shape, or the like, as appropriate. The current collector 412 preferably has a thickness of greater than or equal to 10 μm and less than or equal to 30 μm.

<Active Material Layer>

The active material layer 414 includes at least an active material. The active material layer 414 may further include a binder for increasing adhesion of particles of the active material, a conductive additive for increasing the conductivity of the active material layer 414, and the like in addition to the active material.

<Positive Electrode Active Material>

In the case of using the storage battery electrode 410 as the positive electrode 402 of the storage battery 400, a material into and from which lithium ions can be inserted and extracted can be used for the active material (hereinafter referred to as a positive electrode active material) included in the active material layer 414. Examples of such a positive electrode active material are a lithium-containing complex material with an olivine crystal structure, a lithium-containing complex material with a layered rock-salt crystal structure, and a lithium-containing complex material with a spinel crystal structure. Specifically, a compound such as $LiFeO_2$, $LiCoO_2$, $LiNiO_2$, $LiMn_2O_4$, $V_2O_5$, $Cr_2O_5$, or $MnO_2$ can be used for the positive electrode active material.

Typical examples of the lithium-containing complex material with an olivine crystal structure ($LiMPO_4$ (general formula) (M is one or more of Fe(II), Mn(II), Co(II), and Ni(II))) are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

$LiFePO_4$ is particularly preferable because it properly has properties necessary for the positive electrode active material, such as safety, stability, high capacity density, high potential, and the existence of lithium ions which can be extracted in initial oxidation (charge).

Examples of the lithium-containing complex material with a layered rock-salt crystal structure are lithium cobalt oxide ($LiCoO_2$), $LiNiO_2$, $LiMnO_2$, $Li_2MnO_3$, NiCo-containing composite oxide (general formula: $LiNi_xCo_{1-x}O_2$ (0<x<1)) such as $LiNi_{0.8}Co_{0.2}O_2$, NiMn-containing composite oxide (general formula: $LiNi_xMn_{1-x}O_2$ (0<x<1)) such as $LiNi_{0.5}Mn_{0.5}O_2$, NiMnCo-containing composite oxide (also referred to as NMC) (general formula: $LiNi_xMn_yCo_{1-x-y}O_2$ (x>0, y>0, x+y<1)) such as $LiNi_{1/3}Mn_{1/3}Co_{1/3}O_2$, $Li(Ni_{0.8}Co_{0.15}Al_{0.05})O_2$, and $Li_2MnO_3$-$LiMO_2$ (M=Co, Ni, or Mn).

Examples of the lithium-containing complex material with a spinel crystal structure are $LiMn_2O_4$, $Li_{1+x}Mn_{2-x}O_4$, $Li(MnAl)_2O_4$, and $LiMn_{1.5}Ni_{0.5}O_4$.

It is preferable to add a small amount of lithium nickel oxide ($LiNiO_2$ or $LiNi_{1-x}MO_2$ (M=Co, Al, or the like)) to a lithium-containing complex material with a spinel crystal structure which contains manganese such as $LiMn_2O_4$ because advantages such as minimization of the elution of manganese and the decomposition of an electrolytic solution can be obtained.

Alternatively, a lithium-containing complex material such as $Li_{(2-j)}MSiO_4$ (general formula) (M is one or more of Fe(II), Mn(II), Co(II), and Ni(II), $0 \leq j \leq 2$) can be used for the positive electrode active material. Typical examples of $Li_{(2-j)}MSiO_4$ (general formula) are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$. $Li_{(2-j)}Ni_kMn_lSiO_4$ ($k+l \leq 1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q \leq 1$, $0<m<1$, $0<n<1$, and $0<q<1$), and $Li_{(2-j)}Fe_rNi_sCo_tMn_uSiO_4$ ($r+s+t+u \leq 1$, $0<r<1$, $0<s<1$, $0<t<<$, and $0<u<1$).

Still alternatively, a nasicon compound expressed by $A_xM_2(XO_4)_3$; (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaFeF_3$ or $FeF_3$, a metal chalcogenide (a sulfide, a selenide, or a telluride) such as $TiS_2$ or $MoS_2$, a lithium-containing complex material with an inverse spinel crystal structure such as $LiMVO_4$, a vanadium oxide ($V_2O_5$, $V_6O_{13}$, $LiV_3O_8$, or the like), a manganese oxide, an organic sulfur, or the like can be used as the positive electrode active material.

In the case where carrier ions are alkali metal ions other than lithium ions, alkaline-earth metal ions, beryllium ions, or magnesium ions, the following may be used as the positive electrode active material: a lithium compound or a lithium-containing complex material which is obtained by substituting an alkali metal (e.g., sodium or potassium) or an alkaline-earth metal (e.g., calcium, strontium, barium, beryllium, or magnesium) for lithium in the lithium compound or the lithium-containing complex material. Note that in the case where lithium ions are not used as carrier ions, although lithium deposition does not occur, a solid product of carrier ions other than the lithium ions might be generated, in which case supply of a reverse pulse current more than once during charge is effective.

<Negative Electrode Active Material>

When the storage battery electrode 410 is used as the negative electrode 404 of the storage battery 400, a material with which lithium can be dissolved and deposited or a material into and from which lithium ions can be inserted and extracted can be used for an active material (hereinafter referred to as a negative electrode active material) included in the active material layer 414; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 $mAh/cm^3$).

Examples of the carbon-based material are graphite, graphitizing carbon (soft carbon), non-graphitizing carbon (hard carbon), a carbon nanotube, graphene, and carbon black.

Examples of the graphite are artificial graphite such as meso-carbon microbeads (MCMB), coke-based artificial graphite, and pitch-based artificial graphite and natural graphite such as spherical natural graphite.

Graphite has a low potential substantially equal to that of a lithium metal (0.1 V to 0.3 V vs. $Li/Li^+$) while lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active material, an alloy-based material which enables charge-discharge reaction by an alloying reaction and a dealloying reaction with lithium can be used. In the case where carrier ions are lithium ions, for example, a material containing at least one of Al, Si, Ge, Sn, Pb, Sb, Bi, Ag, Au, Zn, Cd, In, Ga, and the like can be used. Such elements have higher capacity than carbon. In particular, silicon has a significantly high theoretical capacity of 4200 mAh/g. For this reason, silicon is preferably used as the negative electrode active material. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$. $La_3Co_2Sn_7$, $CoSb_3$, InSb, SbSn, and the like.

Alternatively, for the negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example. $Li_{2.6}Co_{0.4}N_3$ is preferable because of high charge and discharge capacity (900 mAh/g and 1890 $mAh/cm^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. Note that in the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material: for example, a transition metal oxide which does not cause an alloy reaction with lithium, such as cobalt oxide (CoO), nickel oxide (NiO), or iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

<Binder>

As the binder, polyvinylidene fluoride (PVDF) as a typical example, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose, or the like can be used.

<Conductive Additive>

As a conductive additive, a material that has a large specific surface area is preferably used; for example, acetylene black (AB) can be used. Alternatively, a carbon material such as a carbon nanotube, graphene, or fullerene can be used.

Graphene is flaky and has an excellent electrical characteristic of high conductivity and excellent physical properties of high flexibility and high mechanical strength. Thus, the use of graphene as the conductive additive can increase contact points and the contact area of particles of an active material.

Note that graphene in this specification refers to single-layer graphene or multilayer graphene including two or more and a hundred or less layers. Single-layer graphene refers to a one-atom-thick sheet of carbon molecules having π bonds. Graphene oxide refers to a compound formed by oxidation of such graphene. When graphene oxide is reduced to form graphene, oxygen contained in the graphene oxide is not entirely released and part of the oxygen remains in the graphene. When the graphene contains oxygen, the proportion of the oxygen, which is measured by XPS, is higher than or equal to 2 at. % and lower than or equal to 20 at. %, preferably higher than or equal to 3 at. % and lower than or equal to 15 at. %.

In the case where graphene is multilayer graphene including graphene obtained by reducing graphene oxide, the interlayer distance between graphenes is greater than 0.34 nm and less than or equal to 0.5 nm, preferably greater than or equal to 0.38 nm and less than or equal to 0.42 nm, more preferably greater than or equal to 0.39 nm and less than or equal to 0.41 nm. In general graphite, the interlayer distance between single-layer graphenes is 0.34 nm. Since the interlayer distance between the graphenes obtained by reducing graphene oxides is longer than that in general graphite, carrier ions can easily transfer between the graphenes in multilayer graphene.

As the conductive additive, metal powder or metal fibers of copper, nickel, aluminum, silver, gold, or the like, a conductive ceramic material, or the like can alternatively be used instead of the above carbon material.

Here, an active material layer using graphene as the conductive additive is described with reference to FIG. 4C.

FIG. 4C is an enlarged longitudinal cross-sectional view of the active material layer 414. The active material layer 414 includes active material particles 422, graphenes 424 as a conductive additive, and a binder (not illustrated).

The longitudinal cross section of the active material layer 414 shows substantially uniform dispersion of the sheet-like graphenes 424 in the active material layer 414. The graphenes 424 are schematically shown by thick lines in FIG. 4C but are actually thin films each having a thickness corresponding to the thickness of a single layer or a multilayer of carbon molecules. The plurality of graphenes 424 are formed in such a way as to wrap, coat, or be adhered to a plurality of the active material particles 422, so that the graphenes 424 make surface contact with the plurality of the active material particles 422. Further, the graphenes 424 are also in surface contact with each other; consequently, the plurality of graphenes 424 form a three-dimensional network for electronic conduction.

This is because graphene oxides with extremely high dispersibility in a polar solvent are used as materials of the graphenes 424. The solvent is removed by volatilization from a dispersion medium containing the graphene oxides uniformly dispersed and the graphene oxides are reduced to give graphenes; hence, the graphenes 424 remaining in the active material layer 414 partly overlap with each other and are dispersed such that surface contact is made, thereby forming a path for electronic conduction.

Unlike a conductive additive in the form of particles, such as acetylene black, which makes point contact with the active material, the graphenes 424 are capable of surface contact with low contact resistance; accordingly, the electronic conduction of the active material particles 422 and the graphenes 424 can be improved without an increase in the amount of a conductive additive. Thus, the proportion of the active material particles 422 in the active material layer 414 can be increased. Accordingly, the discharge capacity of the storage battery can be increased.

<Electrolytic Solution>

As an electrolyte in the electrolytic solution 406, a material which contains carrier ions is used. Typical examples of the electrolyte are lithium salts such as $LiPF_6$, $LiClO_4$, $Li(FSO_2)_2N$, $LiAsF_6$, $LiBF_4$, $LiCF_3SO_3$, $Li(CF_3SO_2)_2N$, and $Li(C_2F_5SO_2)_2N$. One of these electrolytes may be used alone or two or more of them may be used in an appropriate combination and in an appropriate ratio. In order to stabilize a reaction product, a small amount (1 wt %) of vinylene carbonate (VC) may be added to the electrolytic solution so that the decomposition amount of the electrolytic solution is further reduced.

Note that when carrier ions are alkali metal ions other than lithium ions, or alkaline-earth metal ions, instead of lithium in the above lithium salts, an alkali metal (e.g., sodium or potassium) or an alkaline-earth metal (e.g., calcium, strontium, barium, beryllium, or magnesium) may be used for the electrolyte.

As a solvent of the electrolytic solution, a material in which carrier ions can transfer is used. As the solvent of the electrolytic solution, an aprotic organic solvent is preferably used. Typical examples of the aprotic organic solvent include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Further, the storage battery can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharge or the like.

<Separator>

As the separator 408, an insulator such as cellulose (paper), polypropylene with pores, or polyethylene with pores can be used.

The above-described components are mainly included in a battery. One embodiment of the present invention can be used for a battery as long as dross might be generated in an electrode of the battery.

Further, one embodiment of the present invention is not limited to the above-described battery. As long as an electronic device has a structure in which dross might be generated to cause degradation, one embodiment of the present invention can be used to prevent the degradation of the electronic device or to reduce the degree of the degradation, resulting in increase in long-term reliability of the electronic device.

The dross deposited on an electrode of the electronic device can be a conductor or an insulator depending on an electrode material or a liquid substance in contact with the electrode. The dross might change a current path, and might be a conductor to cause a short circuit or be an insulator to block the current path.

Further, experiments suggest that the effect of one embodiment of the present invention cannot be obtained when supply of a current with which a reaction product is formed is stopped momentarily. A significant effect, i.e., prevention of degradation of an electrode in an electronic device or reduction in the degree of the degradation, can be obtained by applying a signal to supply a current reverse to the current with which a reaction product is formed (by supplying what is called a reverse pulse current) momentarily (for longer than or equal to 0.1 seconds and shorter than or equal to 3 minutes, typically longer than or equal to 3 seconds and shorter than or equal to 30 seconds).

Further, the technical idea disclosed in this specification is merely an example, and modifications and variations thereof can be regarded as embodiments of the present invention.

Dross (reaction product) formed on an electrode surface is dissolved by applying a signal to supply a current reverse to a current with which the dross is formed, which makes it possible to remove degradation of the electrode. The problem of the dross formed on the electrode surface cannot be solved conventionally. One embodiment of the present invention enables a battery that is not degraded in principle, which makes it possible to use a device including the battery for a long time.

With the use of the technical idea of utilizing the mechanism of formation of dross and the mechanism of dissolution of the dross, even when an electronic device is partly degraded, the degree of the degradation can be reduced and the electronic device can be brought into a state close to an initial state, ideally, the electronic device can be returned to the initial state.

BRIEF DESCRIPTION OF DRAWINGS

FIGS. 1A to 1F are cross-sectional views illustrating a concept of one embodiment of the present invention.

FIGS. 10A to 10C are diagrams illustrating charge.

BEST MODE FOR CARRYING OUT THE INVENTION

Figure 2A:
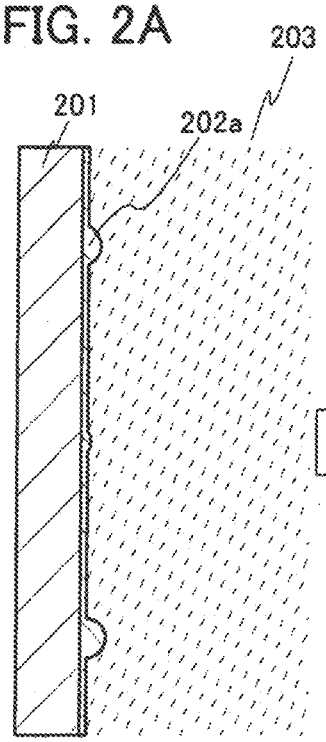
FIGS. 2A to 2F are cross-sectional views illustrating a concept of one embodiment of the present invention.
Figure 2B:
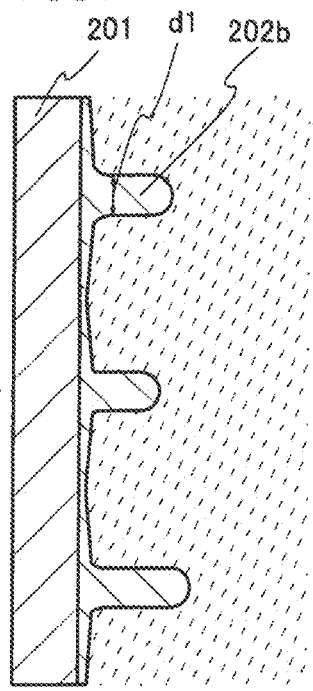
Figure 2C:
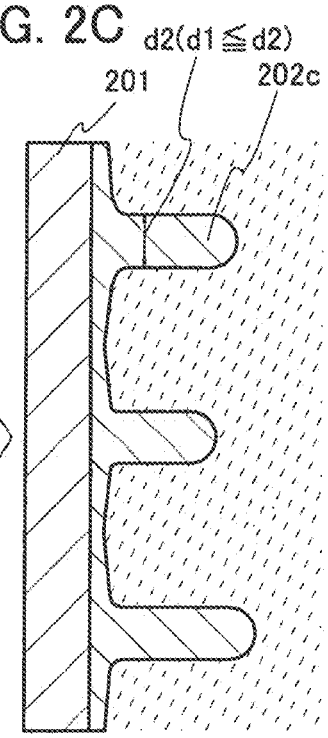
Figure 2D:
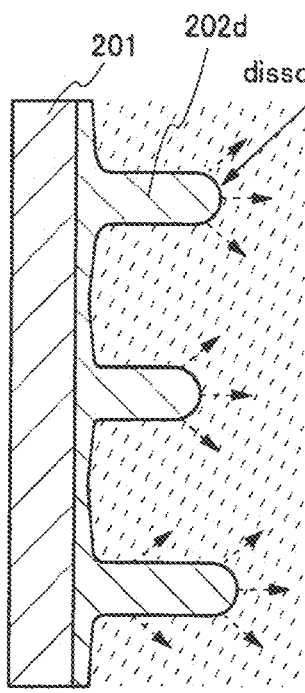
Figure 2E:
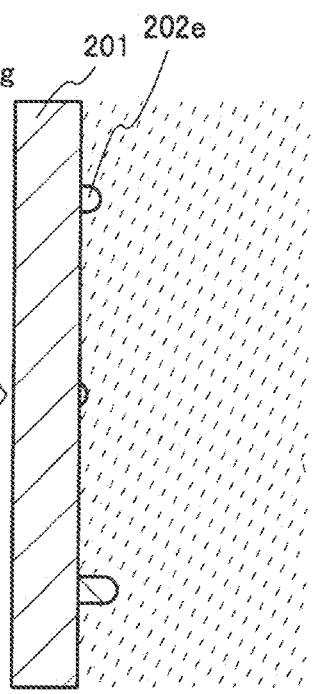
Figure 2F:
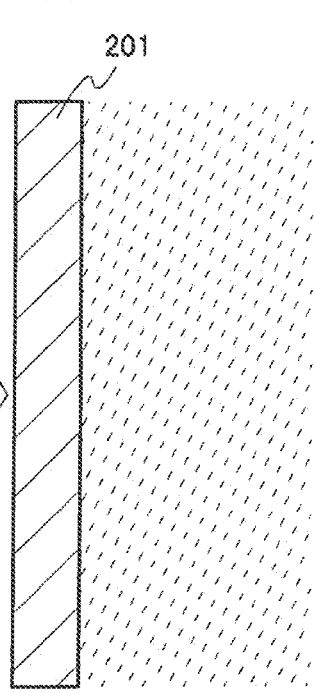
Figure 3A:
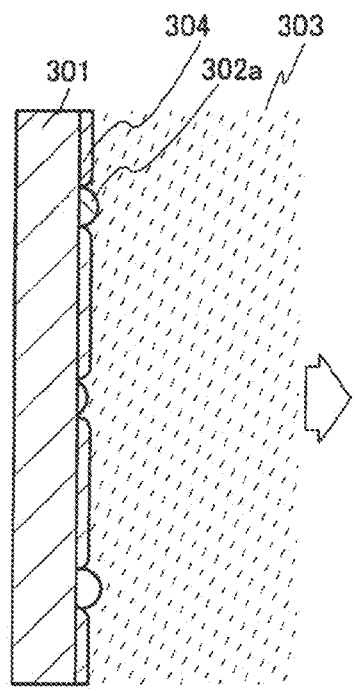
FIGS. 3A to 3F are cross-sectional views illustrating a concept of one embodiment of the present invention.
Figure 3B:
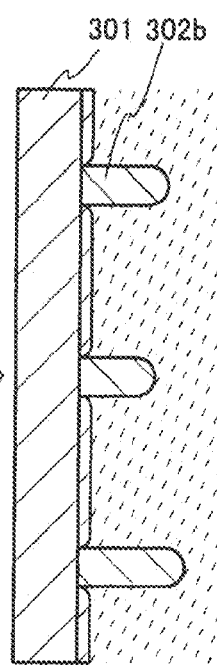
Figure 3C:
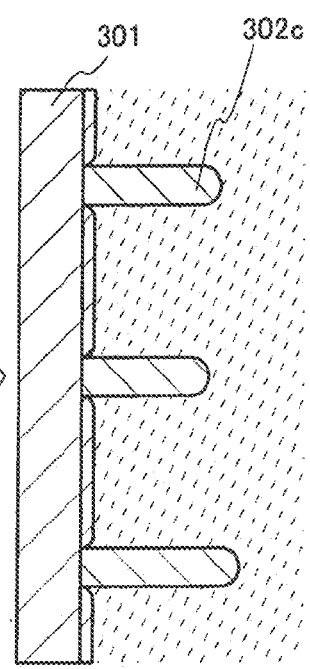
Figure 3D:
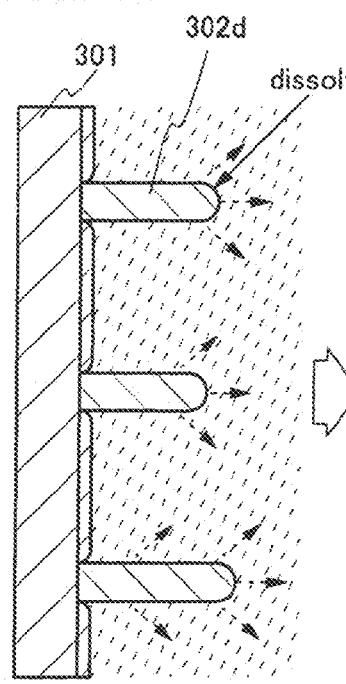
Figure 3E:
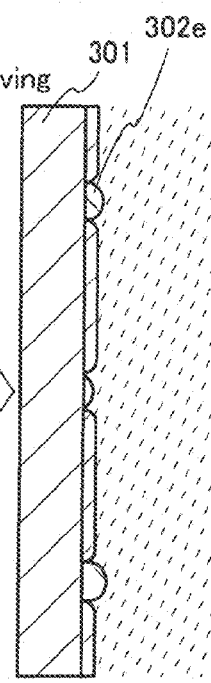
Figure 3F:
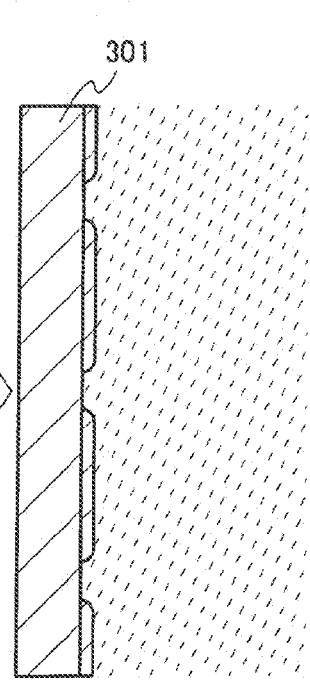
Figure 4A:
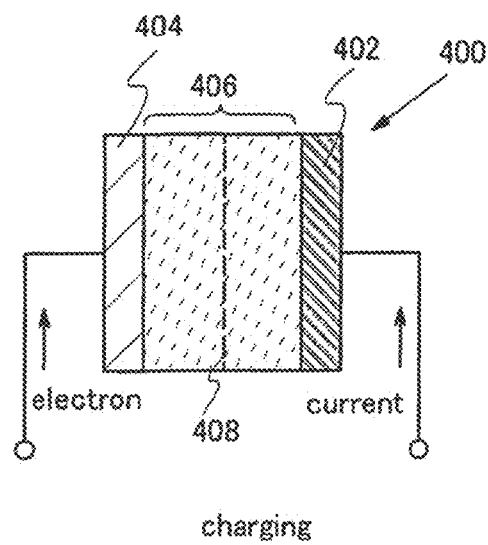
FIGS. 4A to 4C are cross-sectional views illustrating a concept of one embodiment of the present invention.
Figure 4B:
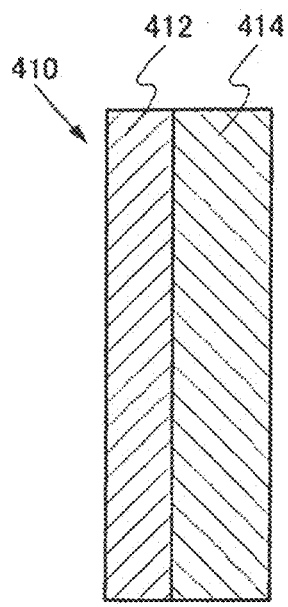
Figure 4C:
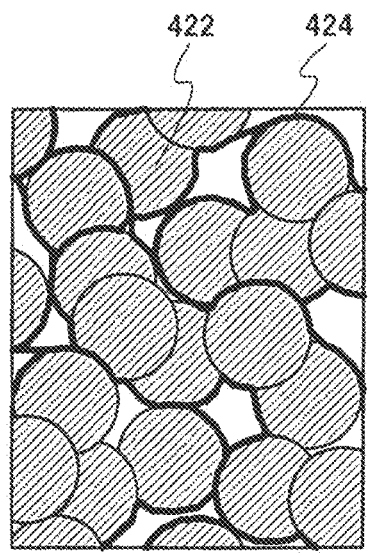

Embodiments and examples of the present invention will be described below in detail with reference to the drawings. Note that the present invention is not limited to the following description, and it is easily understood by those skilled in the art that modes and details disclosed herein can be modified in various ways. Further, the present invention is not construed as being limited to description of the embodiments and the examples.

Embodiment 1

A battery of one embodiment of the present invention is described in detail below.

[A-1. Fabrication of Evaluation Cell]

(Formation of Positive Electrode)

To form a positive electrode of an evaluation cell, first, lithium iron phosphate (LiFePO$_4$) whose surface was provided with a carbon layer by a method described in this embodiment and N-methyl-2-pyrrolidone (NMP) as a polar solvent were prepared. These were stirred and mixed in a mixer at 2000 rpm for 5 minutes, and ultrasonic vibration was applied for 3 minutes. Further stirring and mixing were performed in a mixer at 2000 rpm for a minute. The same process was repeated five times.

Next, graphene oxide was added to this mixture, and stirring and mixing of the mixture in a mixer at 2000 rpm for 3 minutes were performed eight times. While being mixed eight times, the contents in a container were stirred with a spatula. Then, half of the total amount of PVDF used as a binder was added and the mixture was stirred and mixed in a mixer at 2000 rpm for 3 minutes. After that, the other half of PVDF was added and stirring and mixing were performed in a mixer at 2000 rpm for 3 minutes. Further, NMP was added to adjust the viscosity and stirring and mixing were performed in a mixer at 2000 rpm for a minute. Furthermore, NMP was added and stirring and mixing were performed in a mixer at 2000 rpm for a minute. The LiFePO$_4$ provided with the carbon layer, the graphene oxide, and the PVDF were weighed and adjusted so that the compounding ratio thereof (excluding the polar solvent) was 91.4:0.6:8 (wt %) in the formed mixture.

The mixture formed in such a manner was applied onto aluminum foil subjected to surface treatment at a rate of 10 mm/sec with the use of an applicator. This was dried in hot air at 80° C. for 40 minutes to volatilize the polar solvent, and then pressing was performed to compress an active material layer so that the thickness of an electrode was reduced by approximately 20%.

Next, heating was performed at 170° C. in a reduced pressure atmosphere for 10 hours so that the electrode was dried and the graphene oxide was reduced to form graphene serving as a conductive additive.

Then, pressing was performed again with a gap which is the same as that in the above pressing to compress the active material layer, and the compressed layer was stamped into a positive electrode for a battery.

The thickness and the density of the positive electrode formed through the above steps were 58 μm and 1.82 g/cm$^3$, respectively. The amount of the positive electrode active material in the positive electrode was 9.7 mg/cm$^2$ and the single-electrode theoretical capacity was 1.6 mAh/cm$^2$.

(Formation of Negative Electrode)

Next, a negative electrode of the evaluation cell was formed. For the negative electrode, a negative electrode active material provided with a silicon oxide film as a coating film was used. For the negative electrode active material, graphite particles with an average diameter of 9 μm (mesocarbon microbeads (MCMB)) were used. First, water and ethanol were added to Si(OEt)$_4$ and hydrochloric acid serving as a catalyst, and this mixture was stirred to form a Si(OEt)$_4$ solution. The compounding ratio of this solution was as follows: the Si(OEt)$_4$ is $1.8 \times 10^{-2}$ mol; the hydrochloric acid, $4.44 \times 10^{-4}$ mol: the water, 1.9 ml; and the ethanol, 6.3 ml. Next, the Si(OEt)$_4$ solution to which the graphite particles serving as the negative electrode active material were added was stirred in a dry room. Then, the solution was held at 70° C. in a humid environment for 20 hours so that the Si(OEt)$_4$ in the mixed solution of the Si(OEt)$_4$ solution and the ethanol to which the graphite particles were added was hydrolyzed and condensed. In other words, the Si(OEt)$_4$ in the solution was made to react with water in the air, so that the hydrolysis reaction gradually occurred, and the hydrolyzed Si(OEt)$_4$ was condensed by the dehydration reaction following the hydrolysis reaction. In such a manner, gelled silicon oxide was attached to the surfaces of the graphite particles. Then, drying was performed at 500° C. in the air for 3 hours, whereby graphite particles covered with a film formed of silicon oxide were formed.

The negative electrode active material provided with the silicon oxide film that was formed in the above manner, PVDF as a binder, and NMP as a polar solvent were prepared. Stirring and mixing of these in a mixer at 2000 rpm for 10 minutes were performed three times to form a mixture. The negative electrode active material and the PVDF were weighed and adjusted so that the compounding ratio thereof (excluding the polar solvent) was 90:10 (wt %) in the formed mixture.

The mixture formed in such a manner was applied onto copper foil serving as a current collector at a rate of 10 mm/sec with the use of an applicator. This was dried in hot air at 70° C. for 40 minutes to volatilize the polar solvent, and then heating was performed at 170° C. in a reduced pressure atmosphere for 10 hours so that the electrode was dried.

Then, pressing was performed to compress an active material layer so that the thickness of the electrode was reduced by approximately 15%. The compressed layer was stamped into a negative electrode of a battery.

The thickness and the density of the negative electrode formed through the above steps were 90 μm and 1.3 g/cm$^3$, respectively. The amount of the negative electrode active material in the negative electrode was 11.0 mg/cm$^2$ and the single-electrode theoretical capacity was 4.0 mAh/cm$^2$.

(Evaluation Cell)

Evaluation cells were each fabricated using the positive electrode and the negative electrode. Each of the evaluation cells was a CR2032 coin-cell battery (20 mm in diameter and 3.2 mm high). An electrolytic solution was formed in such a manner that lithium hexafluorophosphate (LiPF$_6$) was dissolved at a concentration of 1 mol/L in a solution in which ethylene carbonate (EC) and diethyl carbonate (DEC) were mixed at a volume ratio of 3:7. As a separator, polypropylene (PP) was used.

[A-2. Experiment of Applying Signal to Supply Current Reverse to Charging Current During Charge and Evaluation Thereof]

Initial charge of the evaluation cells formed in the above manner was performed by a battery charging method of one embodiment of the present invention. In other words, during the initial charge, a signal to supply a current reverse to a charging current, here a reverse pulse current, was applied more than once. That is, the charge was stopped temporarily to supply a discharging current (i.e., a reverse pulse current) more than once. Note that there was a switching period from when the charge was stopped temporarily until when the supply of the reverse pulse current was started, in some cases. In the switching period, terminals of the battery were open-circuited, and a current hardly flowed in practice. Note that the expression "a current is supplied" can refer to the case where a current is supplied from a power supply source which exists outside the battery and supplies electric power such as a current or a voltage, or the case where a current is supplied from the battery serving as a power supply source to a load including a passive element such as a resister or a capacitor, an active element such as a transistor or a diode, and the like. The case where the battery serves as a power supply source to supply a current to the load corresponds to the case of discharging the battery. Accordingly, the reverse pulse current supplied at the time of charging the battery corresponds to a current supplied at the time of discharging the battery. Thus, the case where a current is supplied from the battery to the load can also be referred to as the case where the reverse pulse current is supplied to the battery.

The charge was performed at an environment temperature of 25° C. and a charging rate of 0.2 C (34 mA/g). The charge was terminated when the voltage reached 4.0 V at a constant current (CC). A signal to supply a current reverse to a charging current was applied more than once during charge. Specifically, in the charge, a reverse pulse current was supplied for a short time of 0 seconds, 1 second, 5 seconds, and 10 seconds, at 1 C (170 mA/g) and intervals of 0.294 hours. Note that 1 C means the amount of current per unit weight for fully charging a battery (each evaluation cell, here) in an hour. In this specification, when $LiFePO_4$ is used for the positive electrode of the battery and the theoretical capacity of the $LiFePO_4$ is 170 mAh/g, a charging current of 170 mA is 1 C (170 mA/g) assuming that the weight of the $LiFePO_4$ as the positive electrode is 1 g. In this case, an ideal battery is fully charged in an hour. Further, provided that 1 g of $LiFePO_4$ is a positive electrode, charging at a charging rate of 2 C means that charge is performed by supplying a charging current of 340 mA for 0.5 hours.

Figure 5A:
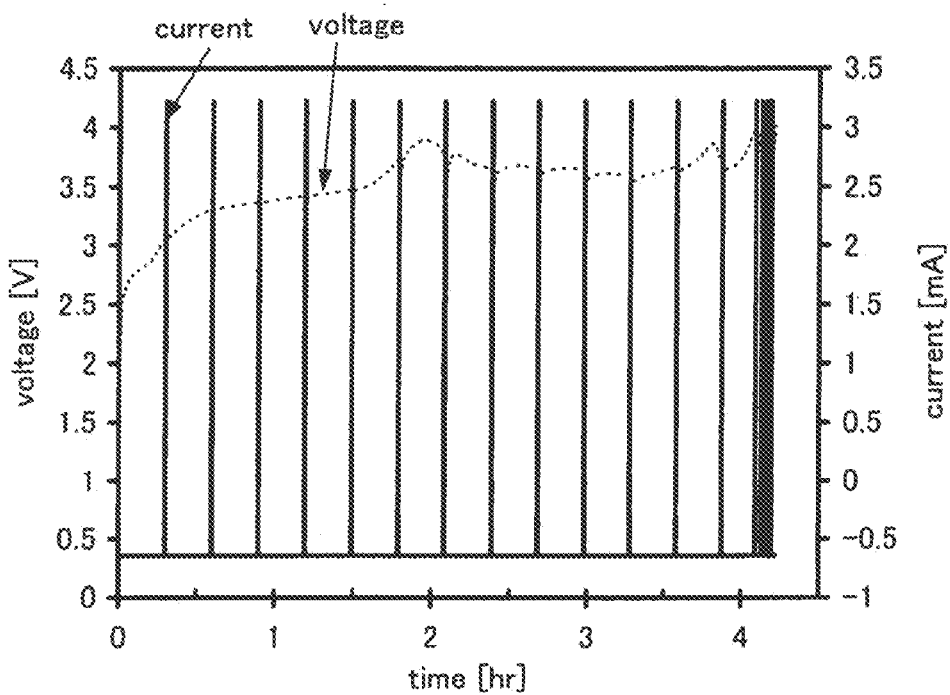
FIGS. 5A and 5B are graphs showing an example of a charging method.

FIG. 5A shows the waveform of a current signal applied to the positive electrode from outside of the battery in the case where the reverse pulse current supply time is 10 seconds. The direction of a current that flows to the positive electrode from outside of the battery and flows to outside of the battery from the negative electrode is assumed to be the positive direction. In other words, the direction in which the reverse pulse current flows in charging is assumed to be the positive direction. FIG. 5A also shows changes in the voltage of the evaluation cell during the application of the current signal. The horizontal axis represents time (hour), the longitudinal axis (on the left side) represents voltage (V) of the evaluation cell, and the longitudinal axis (on the right side) represents current (mA). Here, the voltage of the evaluation cell (also referred to as cell voltage) refers to the potential of the positive electrode relative to the potential of the negative electrode (the potential difference between the positive electrode and the negative electrode).

As shown in FIG. 5A, although charge is performed at a constant current (CC), a current reverse to a charging current, i.e., a reverse pulse current, is supplied for a short time during the charge.

Figure 5B:
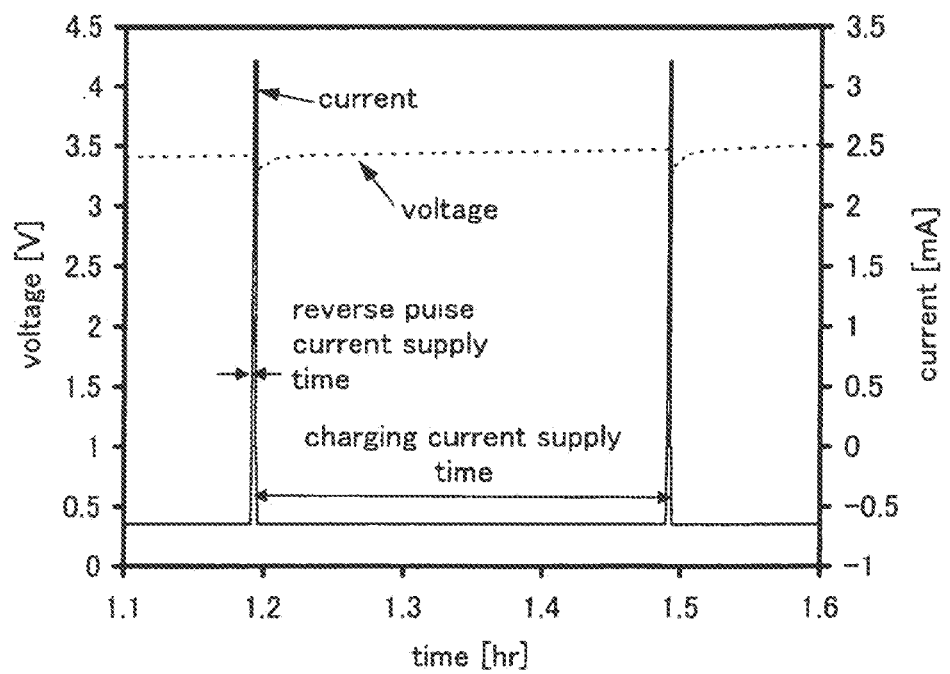

FIG. 5B is an enlarged graph showing the range of 1.1 hours to 1.6 hours in FIG. 5A. The reverse pulse current is supplied for a short time at intervals of 0.294 hours. The reverse pulse current at the time of charging the battery is a discharging current; thus, the cell voltage decreases when the reverse pulse current flows in a charging period.

Graphs of FIGS. 6A and 6B and FIGS. 7A and 7B show results of charging in the cases where the reverse pulse current supply time is 0 seconds, 1 second, 5 seconds, and 10 seconds. In each graph, the horizontal axis represents the charge capacity (mAh/g) of the evaluation cell, and the longitudinal axis represents the voltage (V) of the evaluation cell. Measurement was performed three times for each case and variations in characteristics were evaluated. In FIGS. 5A and 5B, the horizontal axis represents time and data over time are plotted in the right direction of the graphs. On the other hand, in FIGS. 6A and 6B and FIGS. 7A and 7B, the horizontal axis represents the charge capacity (mAh/g) of the evaluation cell, and even when time passes, the charge capacity of the evaluation cell is temporarily reduced when the reverse pulse current is supplied. Therefore, in FIGS. 6A and 6B and FIGS. 7A and 7B, since the charge capacity increases over time, the data are plotted in the right direction of the graphs; however, supply of the reverse pulse current temporarily reduce the charge capacity of the evaluation cell and data in the graphs is plotted in the left direction (however, a reduction in the charge capacity in a period when the reverse pulse current flows is too small; thus, it cannot be visually recognized in FIGS. 6A and 6B and FIGS. 7A and 7B). When the charging current flows again, the charge capacity of the evaluation cell increases over time and the data are plotted in the right direction of the graph.

Figure 6A:
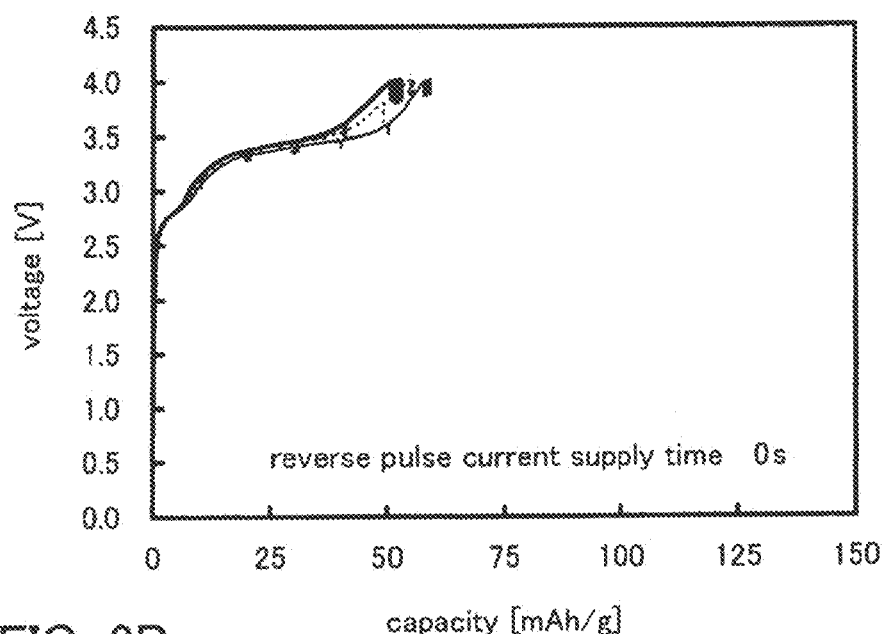
FIGS. 6A and 6B are graphs each showing changes in capacity on charge.

FIG. 6A shows a result of the case where the reverse pulse current supply time is 0 seconds, that is, the case where the reverse pulse current is not supplied during charge (the case of a conventional charging method). In this case, the charge is terminated when the charge capacity reaches approximately 60 mAh/g, and the charge capacity is low in each of the three measurement results. These results indicate that battery degradation cannot be prevented by a conventional charging method.

Figure 6B:
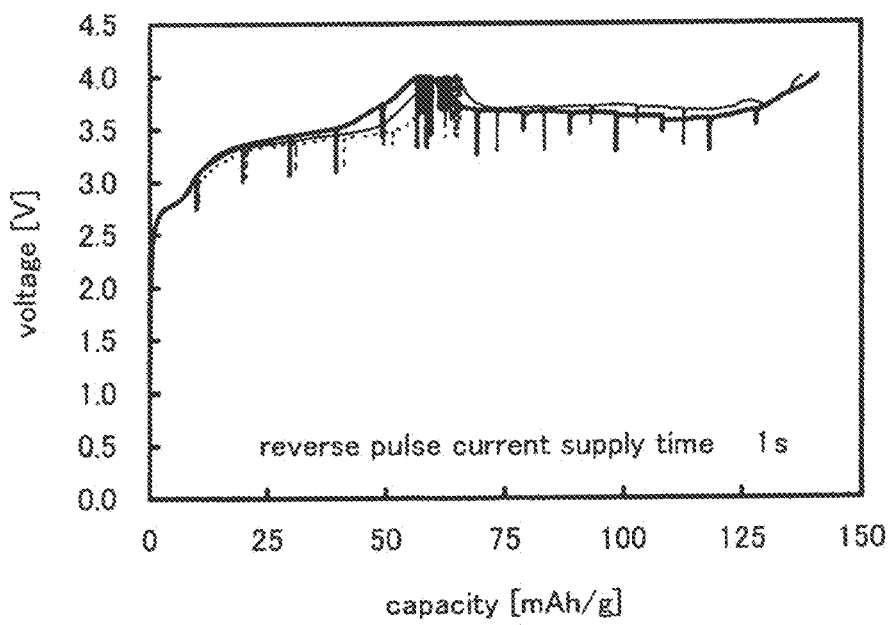

In contrast, FIG. 6B shows that the charge capacity is approximately 140 mAh/g when the reverse pulse current is supplied for 1 second, and charge can be normally performed. However, there is a tendency that the voltage approximates to a termination voltage of 4.0 V at a charge capacity of approximately 60 mAh/g, and charge is terminated in one of the three measurements.

Figure 7A:
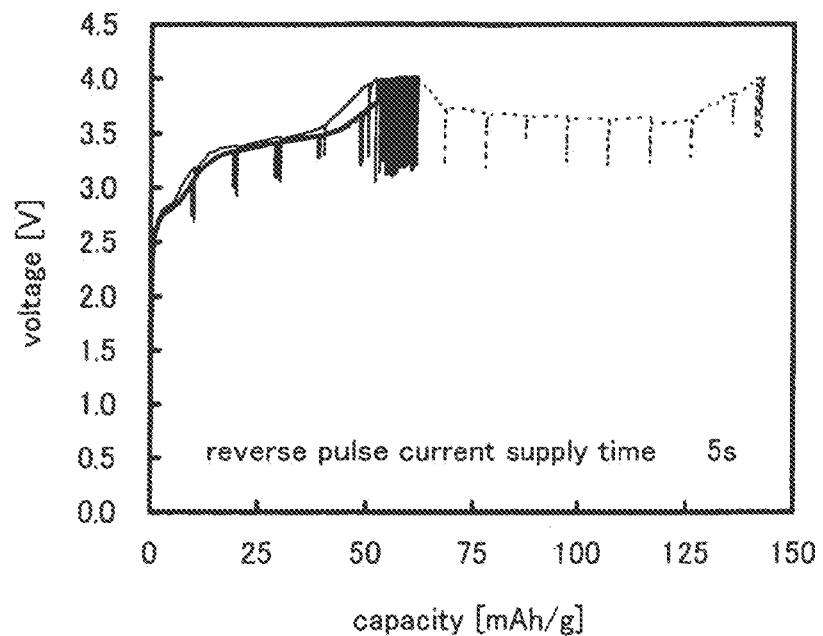
FIGS. 7A and 7B are graphs each showing changes in capacity on charge.

As shown in FIG. 7A, there is the cell capable of being normally charged so that charge capacity is obtained even when the reverse pulse current is supplied for 5 seconds. On the other hand, as in the case of supplying the reverse pulse current for 1 second, there are the cells having a low charge capacity in two of the measurements.

Figure 7B:
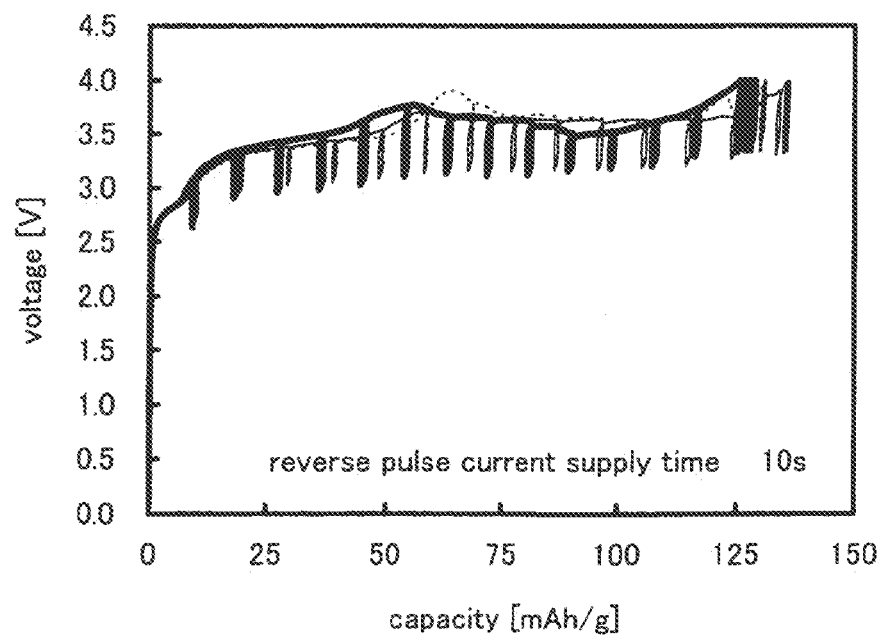

As shown in FIG. 7B, in the case where the reverse pulse current supply time is 10 seconds, the charge capacity is a normal value in all the three measurements. The voltage does not significantly approximate to a termination voltage of 4.0 V at a capacity of approximately 60 mAh/g and charge proceeds.

As described above, it is found that in the case of applying a signal (signal to supply a current reverse to a charging current) for a short time more than once, a decrease in charge capacity can be less, as compared to the case of conventional charge. In particular, it is found that the effect can be obtained with stability by supplying a reverse pulse current for 10 seconds or longer. This is presumably because resistance increased in the charge can be reduced by applying the signal (signal to supply a current reverse to a charging current) for a short time more than once. Specifically, it is suggested that an increase in the resistance can be inhibited by dissolving lithium deposited in a negative electrode through application of the signal (signal to supply a current reverse to a charging current) for a short time.

After the signal (signal to supply a current reverse to a charging current) was applied to the evaluation cells for a short time more than once during charge, characteristics of the charge and discharge capacity of the evaluation cells were checked. Results thereof are shown in FIGS. 8A and 8B and FIGS. 9A to 9B.

The characteristics of the charge capacity were checked at an environment temperature of 25° C. and a charging rate of 0.2 C (34 mA/g). The charge was terminated when the voltage reached 4.0 V at a constant current (CC). Note that 1 C means the amount of current per unit weight for fully charging a battery (each of the evaluation cells, here) in an hour. The characteristics of the discharge capacity were checked at an environment temperature of 25° C. and a discharging rate of 0.2 C (34 mA/g). The discharge was terminated when the voltage reached 2.0 V at a constant current (CC).

Figure 8A:
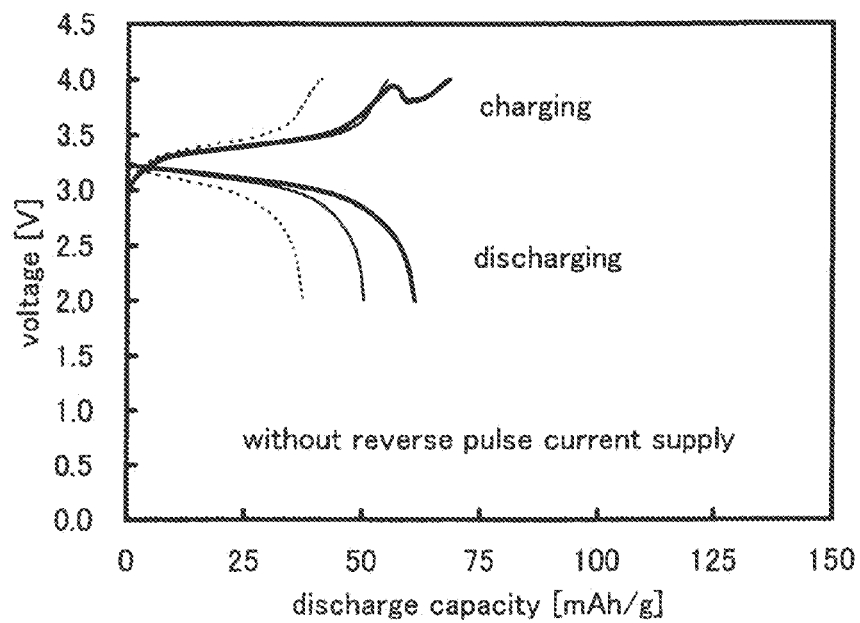
FIGS. 8A and 8B are graphs each showing charge and discharge characteristics.
Figure 8B:
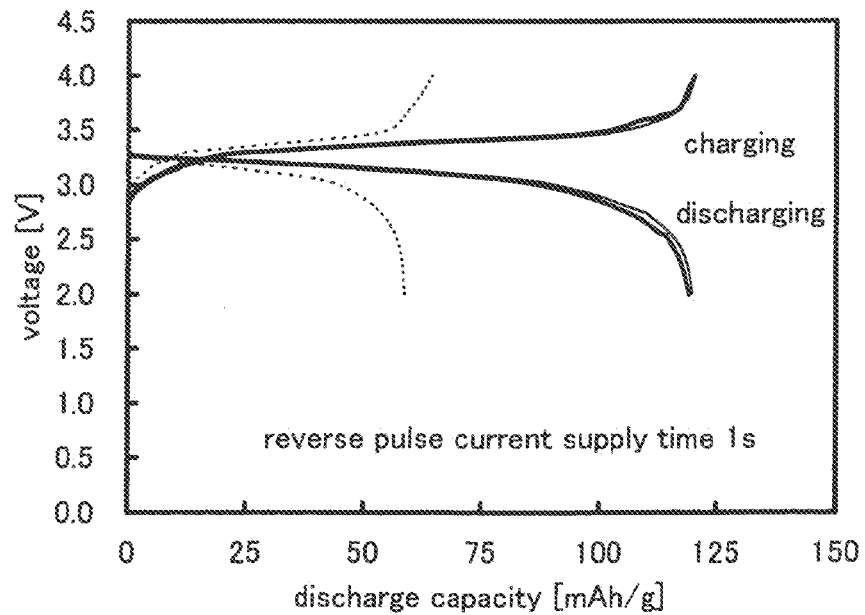
Figure 9A:
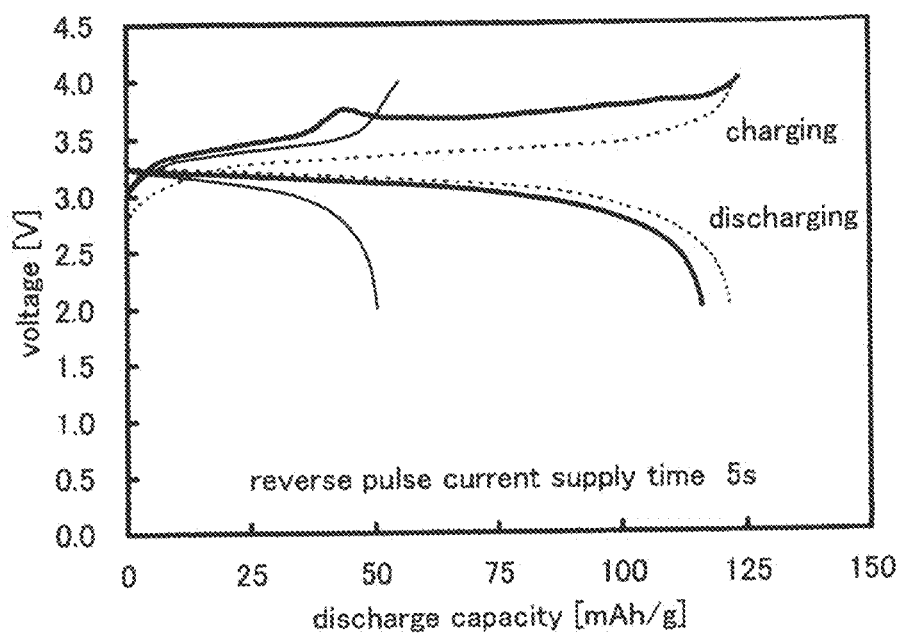
FIGS. 9A and 9B are graphs each showing charge and discharge characteristics.
Figure 9B:
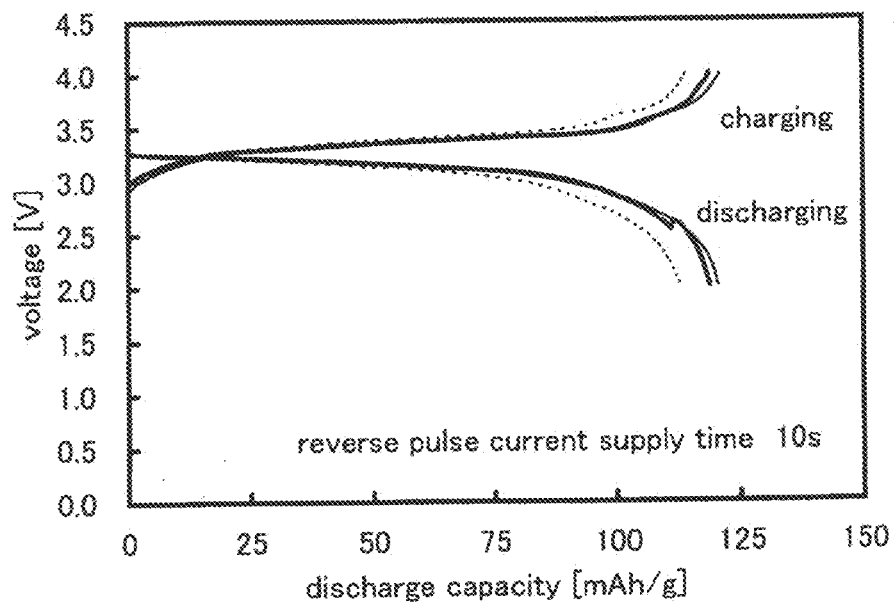

When the initial charge was performed by the conventional charging method, charge capacity was low as shown in FIG. 8A. In contrast, as shown in FIGS. 8B, 9A, and 9B, when the signal (signal to supply a current reverse to a charging current) was applied for a short time more than once during charge, it was found that the cell which can be charged normally in one cycle can also be charged normally in the following cycles. Thus, it is suggested that an effect results from the application of the signal (signal to supply a current reverse to a charging current) for a short time more than once during charge lasts after that, and charge can be performed normally.

Note that the example of supplying a reverse pulse current as a signal to supply a current reverse to a charging current is described in this embodiment: however, a charging rate, the number of supply of a reverse pulse current in one charge, the intensity of the reverse pulse current, a period and intervals of supply of the reverse pulse current, and the like are not particularly limited to those in the example, and are preferably set as appropriate by a practitioner, depending on battery characteristics and the like.

Embodiment 2

In this embodiment, description is made on an example of a reaction product which is a lithium deposit.

As illustrated in FIG. 10A, when a lithium-ion secondary battery is charged, lithium ions that are carrier ions are extracted from a positive electrode active material 802 over a positive electrode current collector 801 included in a positive electrode 800, and move to a negative electrode active material 805 over a negative electrode current collector 804 included in a negative electrode 803. A current flow direction 820 at the time of charging can be shown by an arrow in FIG. 10A. Then, the lithium ions are inserted into the negative electrode active material 805 to provide a negative electrode active material 821 into which the lithium ions are inserted (see FIG. 10B).

However, when a current value exceeds the allowable value of the negative electrode, an abnormal state where lithium 806 is deposited on a surface of the negative electrode active material 805 is obtained, as illustrated in FIG. 10C. Although FIG. 10C schematically illustrates the lithium 806 formed uniformly on the surface, the lithium 806 is deposited non-uniformly in practice.

Figure 11A:
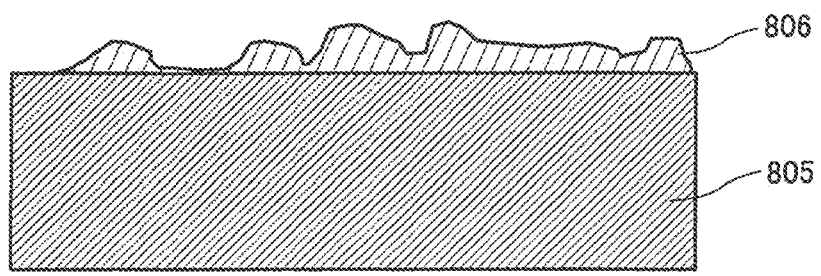
FIGS. 11A and 11B are diagrams illustrating lithium deposition.
Figure 11B:
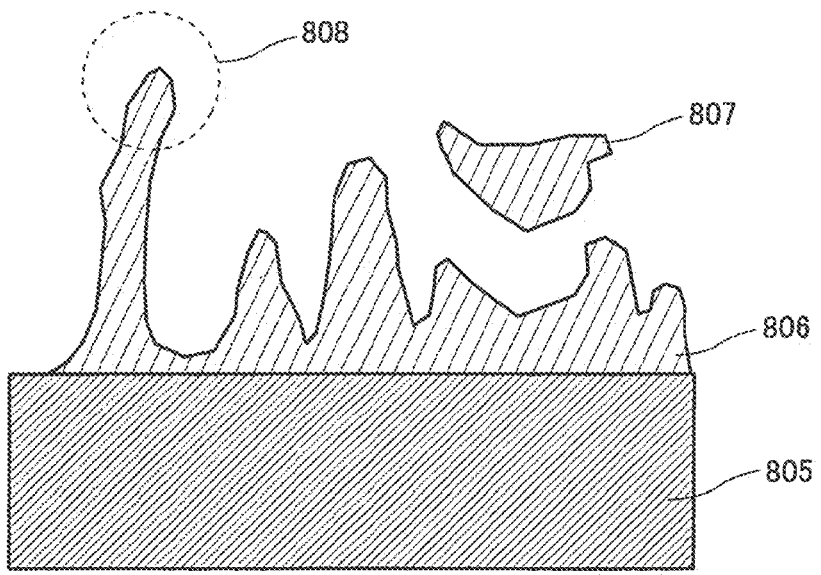

When the lithium is deposited on the surface of the negative electrode active material 805 in charging, the lithium 806 is deposited non-uniformly as illustrated in FIG. 11A. For this reason, as illustrated in FIG. 11B, the deposited lithium easily becomes a whisker 808. The whisker which is formed might cause the positive electrode and the negative electrode to be short-circuited, in which case there is a risk in which the battery catches fire, for example. Further, when the deposited lithium is separated, the amount of lithium is reduced by the amount of the separated lithium 807, resulting in a decrease in the capacity of the battery.

Here, description is made on the principle of operation of the lithium-ion secondary battery and the principle of lithium deposition with reference to FIGS. 12A and 12B, FIGS. 13A and 13B, and FIG. 14.

Figure 12A:
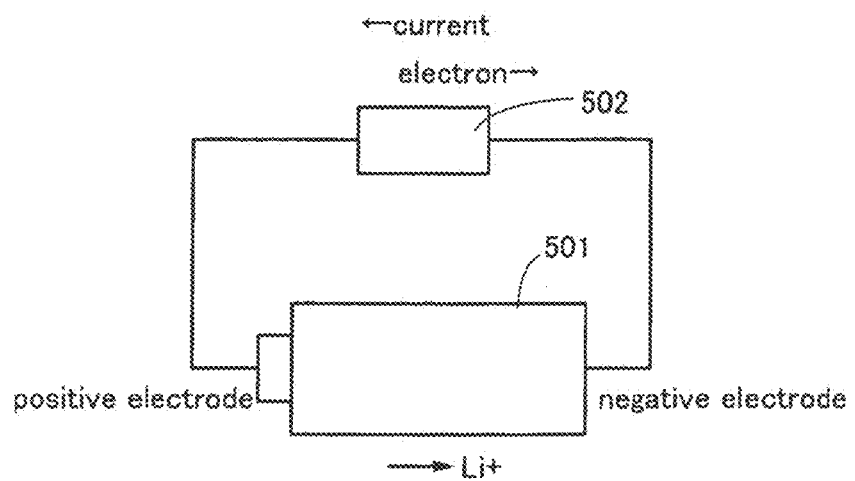
FIGS. 12A and 12B are conceptual diagrams illustrating a state where a lithium-ion secondary battery is charged.
Figure 12B:
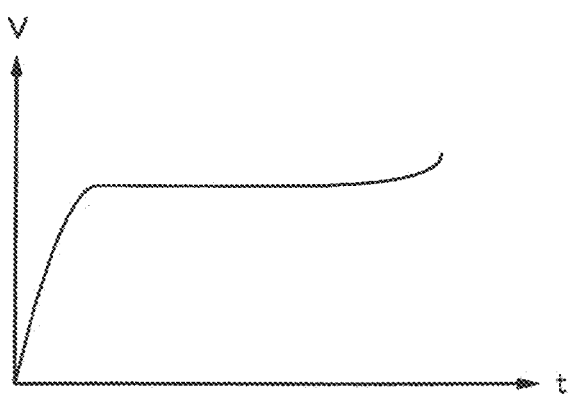
Figure 13A:
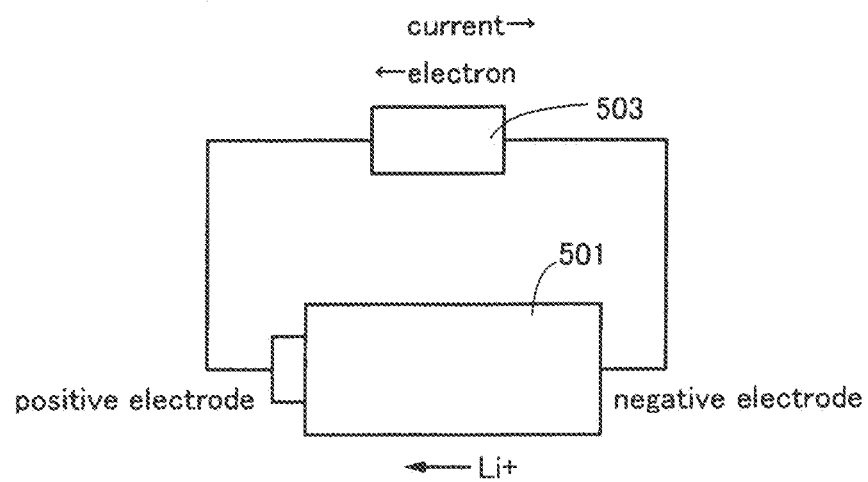
FIGS. 13A and 13B are conceptual diagrams illustrating a state where a lithium-ion secondary battery is discharged.
Figure 13B:
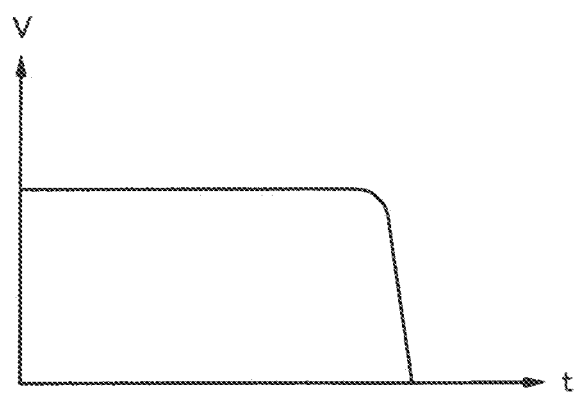

FIGS. 12A and 12B show the case of charging the lithium-ion secondary battery, and FIGS. 13A and 13B show the case of discharging the lithium-ion secondary battery. As illustrated in FIGS. 12A and 12B and FIGS. 13A and 13B, when a battery using lithium is regarded as a closed circuit, lithium ions move and a current flows in the same direction. Further, in the lithium-ion secondary battery, an anode and a cathode change places in charge and discharge, and an oxidation reaction and a reduction reaction occur on the corresponding sides; hence, an electrode with a high redox potential is called a positive electrode and an electrode with a low redox potential is called a negative electrode in this specification. For this reason, in this specification, the positive electrode is referred to as a "positive electrode" and the negative electrode is referred to as a "negative electrode" in all the cases where charge is performed, discharge is performed, a reverse pulse current is supplied, a discharging current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the terms "anode" or "cathode" is used, whether it is at the time of charging or discharging is noted and whether it corresponds to a positive electrode or a negative electrode is also noted. In FIGS. 12A and 12B and FIGS. 13A and 13B, a positive electrode includes lithium iron phosphate (LiFePO$_4$) as a positive electrode active material, and a negative electrode includes graphite as a negative electrode active material.

FIG. 12A illustrates a lithium-ion secondary battery 501 and a charger 502 in the case of charging the lithium-ion secondary battery. When the lithium-ion secondary battery is charged, a reaction expressed by Formula (1) occurs in the positive electrode.

$$\mathrm{LiFePO_4 \rightarrow FePO_4 + Li^+ + e^-} \quad (1)$$

In addition, a reaction expressed by Formula (2) occurs in the negative electrode.

$$\mathrm{C_6 + Li^+ + e^- \rightarrow LiC_6} \quad (2)$$

Thus, the overall reaction in charging the lithium-ion secondary battery is expressed by Formula (3).

$$\mathrm{LiFePO_4 + C_6 \rightarrow FePO_4 + LiC_6} \quad (3)$$

When the battery is charged, in general, lithium is stored in graphite in the negative electrode; however, in the case where deposition of a lithium metal occurs at the negative electrode for any cause, a reaction expressed by Formula (4) occurs. That is, both a reaction of lithium insertion into graphite and a lithium deposition reaction occur at the negative electrode.

$$\mathrm{Li^+ + e^- \rightarrow Li} \quad (4)$$

The equilibrium potentials of the positive electrode and the negative electrode are determined by a material and an equilibrium state of the material. The potential difference (voltage) between the electrodes varies depending on the equilibrium states of the materials of the positive electrode and the negative electrode.

FIG. 12B shows a voltage at the time of charging the lithium-ion secondary battery. As shown in FIG. 12B, in charging, as a reaction proceeds due to a current which flows over time t, the voltage between the electrodes increases.

FIG. 13A illustrates the lithium-ion secondary battery 501 and a load 503 in the case of discharging the lithium-ion secondary battery. When the lithium-ion secondary battery is discharged, a reaction expressed by Formula (5) occurs in the positive electrode.

$$FePO_4 + Li^+ + e^- \rightarrow LiFePO_4 \qquad (5)$$

In addition, a reaction expressed by Formula (6) occurs in the negative electrode.

$$LiC_6 \rightarrow C_6 + Li^+ + e^- \qquad (6)$$

Thus, the overall reaction in discharging the lithium-ion secondary battery is expressed by Formula (7).

$$FePO_4 + LiC_6 \rightarrow LiFePO_4 + C_6 \qquad (7)$$

In addition, in discharge performed after the lithium metal is deposited, a reaction expressed by Formula (8) occurs in the negative electrode. That is, both a reaction of lithium extraction from graphite and a lithium dissolution reaction occur at the negative electrode.

$$Li \rightarrow Li^+ + e^- \qquad (8)$$

FIG. 13B shows a voltage at the time of discharging the lithium-ion secondary battery. As shown in FIG. 13B, in discharging, as a reaction proceeds due to a current which flows over time t, the voltage between the electrodes decreases.

Figure 14:
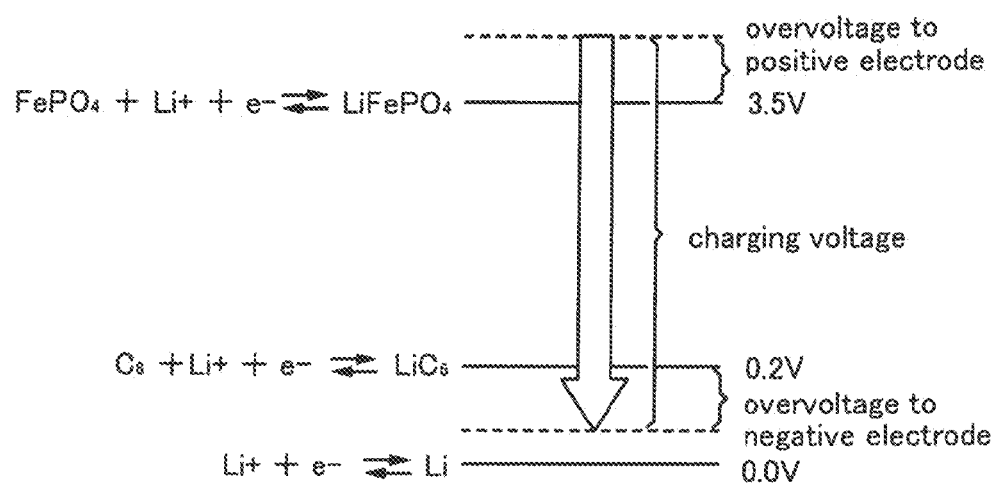
FIG. 14 is a diagram illustrating the relation between the potentials of a positive electrode and a negative electrode.

FIG. 14 illustrates the relation between the electrode potential of a positive electrode including lithium iron phosphate and the electrode potential of an electrode including a lithium metal, and the relation between the electrode potential of a negative electrode including graphite and the electrode potential of the electrode including a lithium metal. In FIG. 14, the hollow arrow represents a charging voltage.

The electrode potential difference between the positive electrode including lithium iron phosphate and the negative electrode including graphite is as follows: 3.5 V−0.2 V=3.3 V. Since the electrode potentials are determined by the equilibrium states, at a charging voltage of 3.3 V, the reaction of Formula (1) and the reaction of Formula (5) equilibrate in the positive electrode and the reaction of Formula (2) and the reaction of Formula (6) equilibrate in the negative electrode; thus, a current does not flow.

For this reason, a charging voltage higher than 3.3 V is required to supply a charging current. For example, on the assumption that a series resistance component inside the battery is ignored and all extra charging voltage is used in the electrode reactions of Formulae (1) and (2), as indicated by the hollow arrow in FIG. 14, the extra charging voltage is shared by the positive electrode and the negative electrode as an overvoltage to the positive electrode and an overvoltage to the negative electrode. In order to obtain a higher current density per unit electrode area, a higher overvoltage is needed. For example, when quick charge is performed on the battery, a current density per unit surface area of an active material needs to be high, in which case a higher overvoltage is required.

However, as the overvoltage is raised to increase the current density per unit surface area of the active material, the overvoltage to the negative electrode increases; therefore, the tip of the hollow arrow in FIG. 14 becomes lower than the electrode potential of the electrode including the lithium metal. Then, the reaction of Formula (4) occurs. At this time, lithium is deposited on the surface of the negative electrode.

In the state illustrated in FIG. 10C, 11A, or 11B, the lithium 806 and the whisker 808, which are deposited, can be dissolved by supplying a reverse pulse current as a signal to supply a current reverse to a charging current; thus, the surface of the negative electrode can be returned to a normal state. Further, a reverse pulse current is supplied before the deposited lithium is separated in charging, whereby the lithium is reduced in size or is dissolved; thus, separation of the lithium 807 can be prevented.

Further, as shown in the formulae at the time of charging and discharging, ideally, the reactions of lithium insertion and extraction at the negative electrode is equivalent to the reactions of lithium insertion and extraction at the positive electrode. Accordingly, in the case where the capacity per volume of the negative electrode is 1 and that of the positive electrode is 1, the ideal capacity ratio is denoted by 100%. However, in practice, the capacity per volume of the negative electrode is generally higher than that of the positive electrode. In FIGS. 10A to 10C, the size of a piece of the graphite is greater than or equal to 9 μm and less than or equal to 30 μm, and a layer of the graphite has a thickness of greater than or equal to 50 μm and less than or equal to 100 μm. The size of a particle of the lithium iron phosphate is greater than or equal to 50 nm and less than or equal to 200 nm, and a layer of the lithium iron phosphate has a thickness of greater than or equal to 60 μm and less than or equal to 110 μm. In addition, as the capacity ratio is closer to 100%, the capacity easily decreases and an abnormal behavior is easily shown.

Supply of a reverse pulse current as a signal to supply a current reverse to a charging current can prevent a decrease in capacity and an abnormal behavior even at a high capacity ratio of 60% or 85%. This indicates that an abnormal behavior caused by lithium deposition is inhibited. Further, the capacity ratio can be close to 100%, resulting in a great improvement of capacity per cell volume. That is, application of a signal to supply a current reverse to a charging current during charge enables reduction in the size of a battery, in addition to prevention of progress in the battery degradation or increase in reliability by reducing the degree of the degradation. In addition, quick charge and discharge of the battery can be performed.

When lithium is deposited and thus the length of a whisker is increased, a positive electrode and a negative electrode might be short-circuited; however, supply of a reverse pulse current during charge can reduce the lithium deposition and can desirably dissolve a deposit, resulting in increase in the reliability of a battery. Further, when the reverse pulse current is supplied during charge, a structure without a separator which is provided to prevent a positive electrode and a negative electrode from being short-circuited can be employed, resulting in a reduction in the cost of materials and shortening the manufacturing process owing to the simplified structure.

This embodiment can be freely combined with any of the other embodiments.

Embodiment 3

Next, structures of nonaqueous secondary batteries are described with reference to FIGS. 15A to 15C and FIGS. 16A and 16B.

Figure 15A:
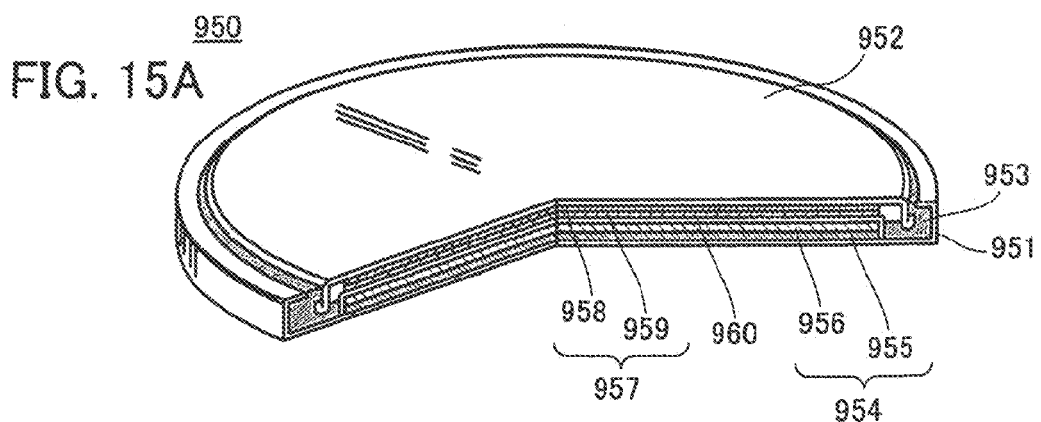
FIGS. 15A to 15C are diagrams illustrating batteries.

FIG. 15A is an external view of a coin-type (single-layer flat type) lithium-ion secondary battery, part of which illustrates a cross-sectional view of the coin-type lithium-ion secondary battery.

In a coin-type secondary battery 950, a positive electrode can 951 serving also as a positive electrode terminal and a negative electrode can 952 serving also as a negative electrode terminal are insulated and sealed with a gasket 953 formed of polypropylene or the like. A positive electrode 954 includes a positive electrode current collector 955 and a positive electrode active material layer 956 which is provided to be in contact with the positive electrode current collector 955. A negative electrode 957 includes a negative electrode current collector 958 and a negative electrode active material layer 959 which is provided to be in contact with the negative electrode current collector 958. A separator 960 and an electrolytic solution (not illustrated) are included between the positive electrode active material layer 956 and the negative electrode active material layer 959.

The negative electrode 957 includes the negative electrode current collector 958 and the negative electrode active material layer 959. The positive electrode 954 includes the positive electrode current collector 955 and the positive electrode active material layer 956.

For the positive electrode 954, the negative electrode 957, the separator 960, and the electrolytic solution, the above-described members can be used.

For the positive electrode can 951 and the negative electrode can 952, a metal having corrosion resistance to an electrolytic solution, such as nickel, aluminum, or titanium, an alloy of such a metal, or an alloy of such a metal and another metal (e.g., stainless steel or the like) can be used. Alternatively, the positive electrode can 951 and the negative electrode can 952 are preferably covered with nickel, aluminum, or the like in order to prevent corrosion caused by the electrolytic solution. The positive electrode can 951 and the negative electrode can 952 are electrically connected to the positive electrode 954 and the negative electrode 957, respectively.

The negative electrode 957, the positive electrode 954, and the separator 960 are immersed in the electrolytic solution. Then, as illustrated in FIG. 15A, the positive electrode can 951, the positive electrode 954, the separator 960, the negative electrode 957, and the negative electrode can 952 are stacked in this order with the positive electrode can 951 positioned at the bottom, and the positive electrode can 951 and the negative electrode can 952 are subjected to pressure bonding with the gasket 953 interposed therebetween. In such a manner, the coin-type secondary battery 950 is fabricated.

Figure 15B:
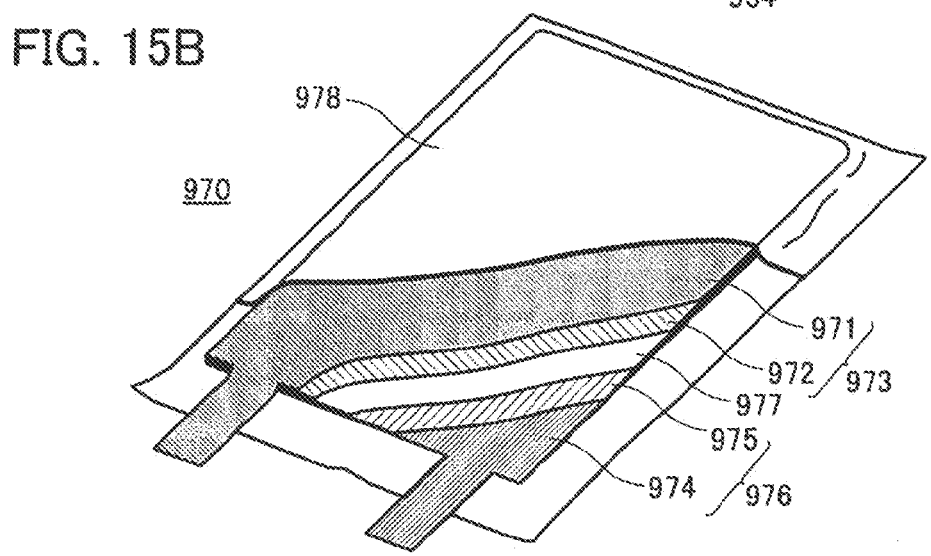

Next, an example of a laminated secondary battery is described with reference to FIG. 15B. In FIG. 15B, a structure inside the laminated secondary battery is partly exposed for convenience.

A thin secondary battery (also referred to as a laminated secondary battery) 970 using a laminate film as an exterior body and illustrated in FIG. 15B includes a positive electrode 973 including a positive electrode current collector 971 and a positive electrode active material layer 972, a negative electrode 976 including a negative electrode current collector 974 and a negative electrode active material layer 975, a separator 977, an electrolytic solution (not illustrated), and an exterior body 978. The separator 977 is provided between the positive electrode 973 and the negative electrode 976 in the exterior body 978. The exterior body 978 is filled with the electrolytic solution. Although the one positive electrode 973, the one negative electrode 976, and the one separator 977 are used in FIG. 15B, the secondary battery may have a stacked-layer structure in which positive electrodes and negative electrodes are alternately stacked and separated by separators.

For the positive electrode, the negative electrode, the separator, and the electrolytic solution (an electrolyte and a solvent), the above-described members can be used.

In the laminated secondary battery 970 illustrated in FIG. 15B, the positive electrode current collector 971 and the negative electrode current collector 974 also serve as terminals (tabs) for an electrical contact with the outside. For this reason, each of the positive electrode current collector 971 and the negative electrode current collector 974 is arranged so that part of the positive electrode current collector 971 and part of the negative electrode current collector 974 are exposed outside the exterior body 978.

As the exterior body 978 in the laminated secondary battery 970, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. With such a three-layer structure, permeation of the electrolytic solution and a gas can be blocked and an insulating property can be obtained.

Figure 16A:
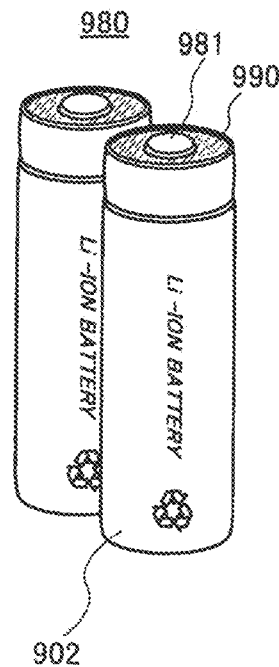
FIGS. 16A and 16B are diagrams illustrating a battery.

Next, an example of a cylindrical secondary battery is described with reference to FIGS. 16A and 16B. As illustrated in FIG. 16A, a cylindrical secondary battery 980 includes a positive electrode cap (battery lid) 981 on the top surface and a battery can (outer can) 982 on the side surface and bottom surface. The positive electrode cap (battery lid) 981 and the battery can (outer can) 982 are insulated by the gasket 990 (insulating packing).

Figure 16B:
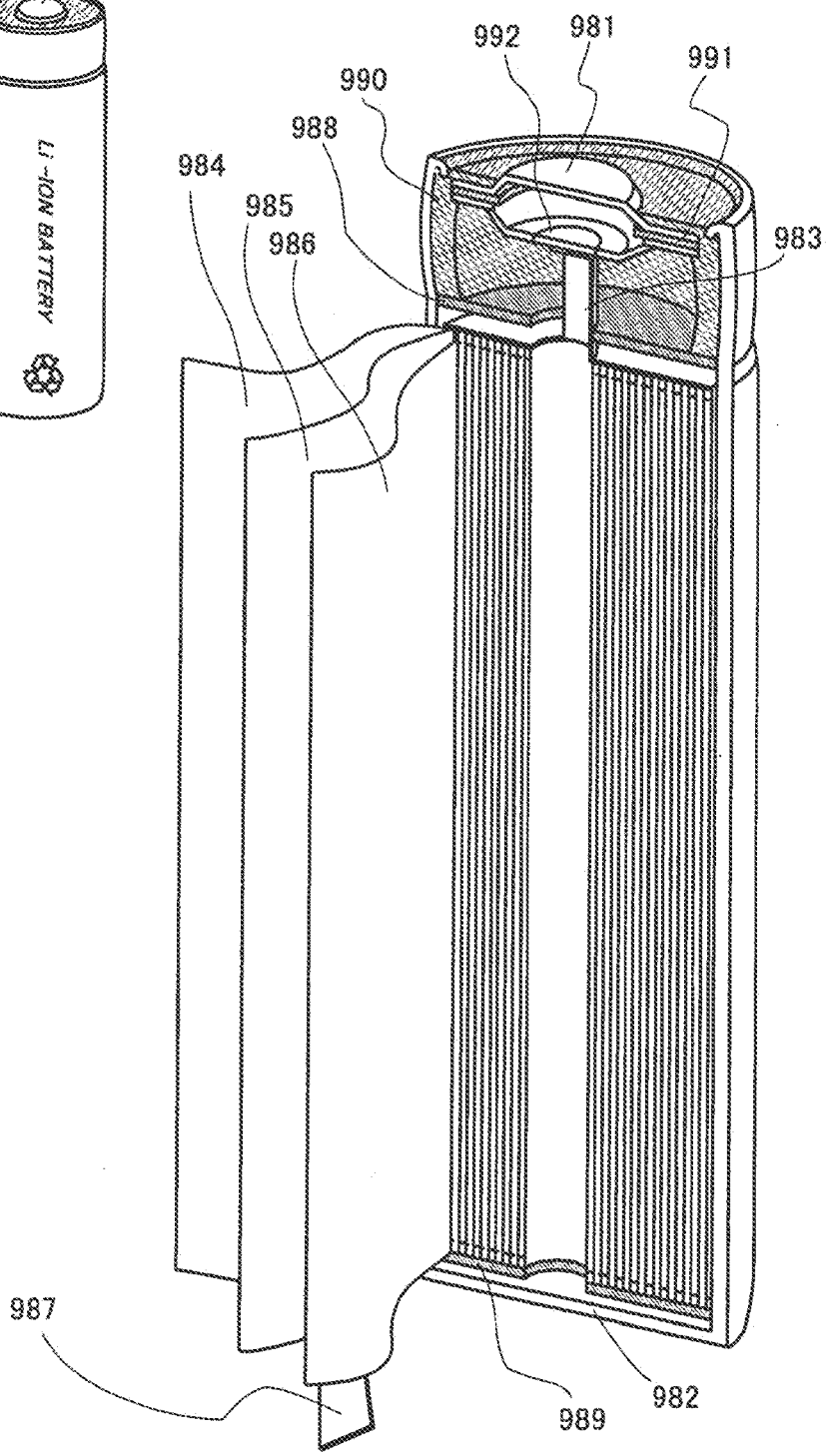

FIG. 16B is a schematic view of a cross-section of the cylindrical secondary battery. Inside the battery can 982 having a hollow cylindrical shape, a battery element in which a strip-like positive electrode 984 and a strip-like negative electrode 986 are wound with a stripe-like separator 985 provided therebetween is provided. Although not illustrated, the battery element is wound around a center pin. The battery can 982 is closed at one end and opened at the other end.

For the positive electrode 984, the negative electrode 986, and the separator 985, the above-described members can be used.

For the battery can 982, a metal having corrosion resistance to an electrolytic solution, such as nickel, aluminum, or titanium, an alloy of such a metal, or an alloy of such a metal and another metal (e.g., stainless steel or the like) can be used. Alternatively, the battery can 982 is preferably covered with nickel, aluminum, or the like in order to prevent corrosion caused by the electrolytic solution. Inside the battery can 982, the battery element in which the positive electrode, the negative electrode, and the separator are wound is provided between a pair of insulating plates 988 and 989 which face each other.

Further, an electrolytic solution (not illustrated) is injected inside the battery can 982 in which the battery element is provided. For the electrolytic solution, the above-described electrolyte and solvent can be used.

Since the positive electrode 984 and the negative electrode 986 of the cylindrical secondary battery are wound, active material layers are formed on both sides of the current collectors. A positive electrode terminal (positive electrode current collecting lead) 983 is connected to the positive electrode 984, and a negative electrode terminal (negative electrode current collecting lead) 987 is connected to the negative electrode 986. Both the positive electrode terminal 983 and the negative electrode terminal 987 can be formed using a metal material such as aluminum. The positive electrode terminal 983 and the negative electrode terminal 987 are resistance-welded to a safety valve mechanism 992 and the bottom of the battery can 982, respectively. The safety valve mechanism 992 is electrically connected to the positive electrode cap 981 through a positive temperature coefficient (PTC) element 991. The safety valve mechanism 992 cuts off electrical connection between the positive electrode cap 981 and the positive electrode 984 when the internal pressure of the battery increases and exceeds a predetermined threshold value. The PTC element 991 is a heat sensitive resistor whose resistance increases as temperature rises, and controls the amount of current by increase in resistance to prevent unusual heat generation. Barium titanate ($BaTiO_3$)-based semiconductor ceramic or the like can be used for the PTC element.

Figure 15C:
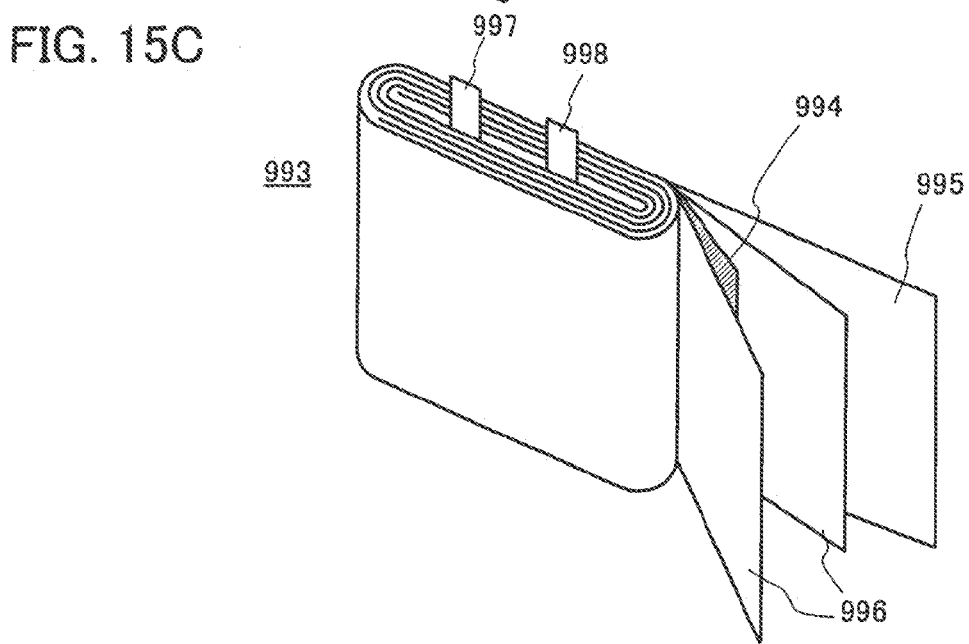

Next, an example of a rectangular secondary battery is described with reference to FIG. 15C. A wound body 993 illustrated in FIG. 15C includes a negative electrode 994, a positive electrode 995, and a separator 996. The wound body 993 is obtained by winding a sheet of a stack in which the negative electrode 994 overlaps with the positive electrode 995 with the separator 996 provided therebetween. The wound body 993 is covered with a rectangular scaled can or the like; thus, a rectangular secondary battery is fabricated. Note that the number of stacks each including the negative electrode 994, the positive electrode 995, and the separator 996 may be determined as appropriate depending on capacity and an element volume which are required.

As in the cylindrical secondary battery, in the rectangular secondary battery, the negative electrode 994 is connected to a negative electrode tab (not illustrated) through one of a terminal 997 and a terminal 998, and the positive electrode 995 is connected to a positive electrode tab (not illustrated) through the other of the terminal 997 and the terminal 998. Surrounding structures such as a safety valve mechanism are similar to those in the cylindrical secondary battery.

As described above, although the coin-type secondary battery, the laminated secondary battery, the cylindrical secondary battery, and the rectangular secondary battery are described as examples of the secondary battery, secondary batteries having a variety of shapes can be used. Further, a structure in which a plurality of positive electrodes, a plurality of negative electrodes, and a plurality of separators are stacked or wound may be employed.

Next, description is made on a lithium-ion capacitor, which is an example of batteries.

The lithium-ion capacitor is a hybrid capacitor which combines a positive electrode of an electric double layer capacitor (EDLC) and a negative electrode of a lithium-ion secondary battery using a carbon material, and also an asymmetric capacitor in which the principles of power storage are different between the positive electrode and the negative electrode. The positive electrode forms an electrical double layer and enables charge and discharge by a physical action, whereas the negative electrode enables charge and discharge by a chemical action of lithium. With the use of a negative electrode in which lithium is occluded in advance as the carbon material or the like that is a negative electrode active material, the lithium-ion capacitor can have energy density dramatically higher than that of a conventional electrical double layer capacitor including a negative electrode using active carbon.

In a lithium-ion capacitor, instead of a positive electrode active material layer in a lithium-ion secondary battery, a material that can reversibly adsorb at least one of lithium ions and anions is used. Examples of such a material are active carbon, a conductive high molecule, and a polyacenic semiconductor (PAS).

The lithium-ion capacitor has high efficiency of charge and discharge, capability of rapidly performing charge and discharge, and a long life even when it is repeatedly used.

For such a lithium-ion capacitor, the method for dissolving a reaction product, which is one embodiment of the present invention, can be used. Thus, generation of irreversible capacity can be reduced, so that a battery having increased cycle characteristics can be fabricated.

Next, a battery including an electric circuit and the like is described.

FIGS. 17A to 17D illustrate an example of a battery in which the above-described rectangular secondary battery is provided with an electric circuit and the like. In a battery 6600 illustrated in FIGS. 17A and 17B, a wound body 6601 is stored inside a battery can 6604. The wound body 6601 includes a terminal 6602 and a terminal 6603, and is impregnated with an electrolytic solution inside the battery can 6604. It is preferable that the terminal 6603 be in contact with the battery can 6604, and the terminal 6602 be insulated from the battery can 6604 with the use of an insulating member or the like. A metal material such as aluminum or a resin material can be used for the battery can 6604.

Figure 17A:
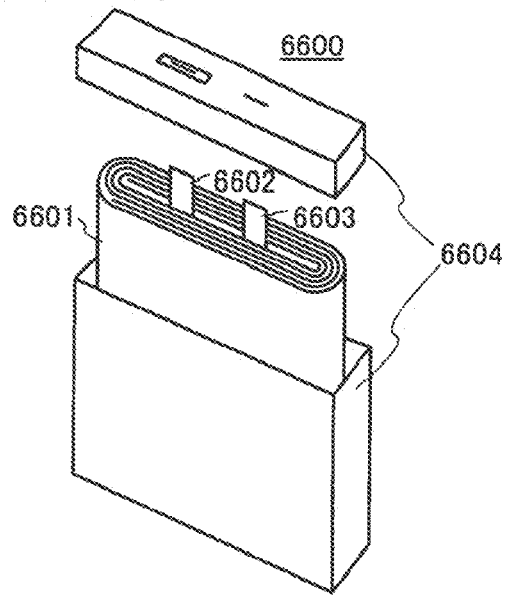
FIGS. 17A to 17D are diagrams illustrating a battery.
Figure 17B:
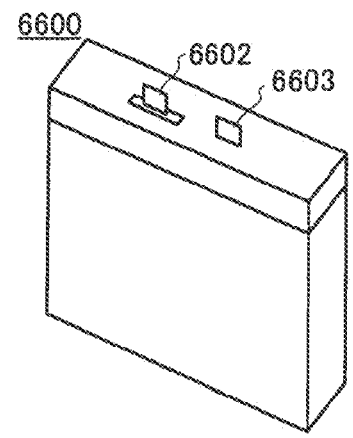
Figure 17C:
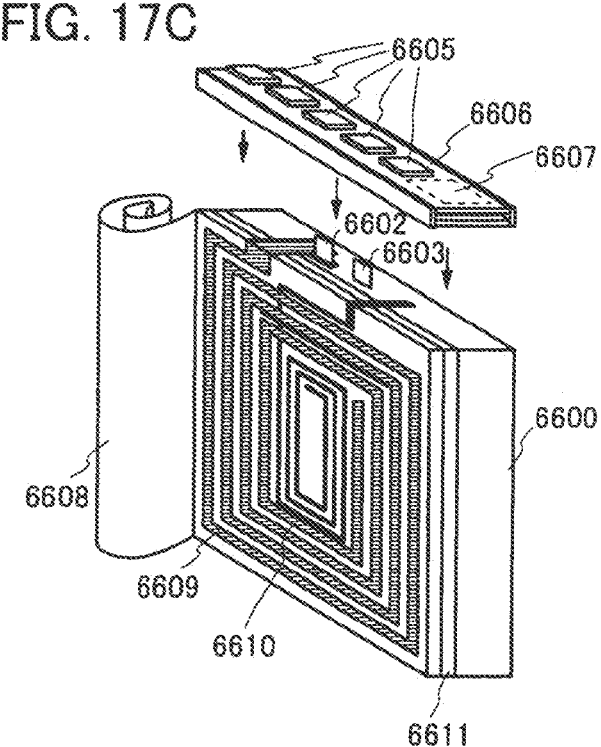
Figure 17D:
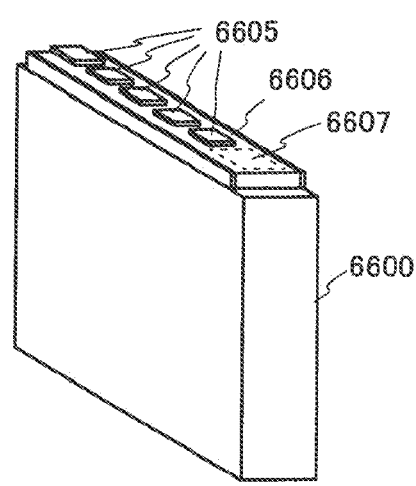

Further, as illustrated in FIG. 17B, the battery 6600 can be provided with an electric circuit and the like. FIGS. 17C and 17D illustrate an example of providing the battery 6600 with a circuit board 6606 in which an electric circuit and the like are provided, an antenna 6609, an antenna 6610, and a label 6608.

The circuit board 6606 includes an electric circuit 6607, terminals 6605, and the like. As the circuit board 6606, a printed circuit board (PCB) can be used, for example. When the printed circuit board is used as the circuit board 6606, electronic components such as a resistor, a capacitor, a coil (an inductor), and a semiconductor integrated circuit (IC) are mounted over the printed circuit board and connected, whereby the electric circuit 6607 can be formed. As well as the above-described electronic components, a variety of components, for example, a temperature sensing element such as a thermistor, a fuse, a filter, a crystal oscillator, and an electromagnetic compatibility (EMC) component can be mounted.

The electric circuit 6607 including these electronic components can function as a monitoring circuit for preventing overcharge or overdischarge of the battery 6600, a protection circuit against overcurrent, or the like.

The terminals 6605 included in the circuit board 6606 are connected to the terminal 6602, the terminal 6603, the antenna 6609, the antenna 6610, and the electric circuit 6607. Although the number of the terminals 6605 is five in FIGS. 17C and 17D, the number is not limited thereto, and may be a given number. With the use of the terminals 6605, the battery 6600 can be charged and discharged, and further, a signal can be sent and received to/from an electrical device including the battery 6600.

The antenna 6609 and the antenna 6610 can be used for transmitting and receiving electric power and a signal to/from the outside of the battery, for example. One or both of the antenna 6609 and the antenna 6610 are electrically connected to the electric circuit 6607 to allow the electric circuit 6607 to control the transmission and reception of electric power and a signal to/from the outside. Alternatively, one or both of the antenna 6609 and the antenna 6610 are electrically connected to the terminals 6605 to allow a control circuit of the electrical device including the battery 6600 to control the transmission and reception of electric power and a signal to/from the outside.

Note that although FIGS. 17C and 17D illustrate an example of the battery 6600 provided with two kinds of antenna, a variety of antennas may be provided or a structure where an antenna is not provided may be employed.

In FIGS. 17C and 17D, the antenna 6609 and the antenna 6610 each have a coil shape; however, without limitation thereon, a linear antenna or a flat plate antenna may be used, for example. Further, a planar antenna, an aperture antenna, a traveling-wave antenna, an EH antenna, a magnetic-field antenna, or a dielectric antenna may be used.

Note that an electromagnetic induction method, a magnetic resonance method, an electric wave method, or the like can be used for transmitting and receiving electric power wirelessly (also referred to as contactless power transmission, non-contact power transmission, wireless power supply, or the like).

The line width of the antenna 6609 is preferably larger than that of the antenna 6610. This makes it possible to increase the amount of electric power received by the antenna 6609.

In addition, a layer 6611 is provided between the antennas 6609 and 6610 and the battery 6600. The layer 6611 has a function of preventing shielding of an electric field or a magnetic field due to the wound body 6601, for example. In this case, a magnetic substance can be used for the layer 6611, for example. Alternatively, the layer 6611 may be a shielding layer.

Note that the antenna 6609 and the antenna 6610 can be used for a purpose which is different from the purpose of transmitting and receiving electric power or a signal to/from the outside. For example, when the electrical device including the battery 6600 does not include an antenna, the antenna 6609 and the antenna 6610 enable wireless communication with the electrical device.

This embodiment can be freely combined with any of the other embodiments. Specifically, in charging a battery, a reaction product is dissolved by applying a signal to supply a current reverse to a current with which the reaction product is formed; thus, degradation of the battery is prevented or the degree of the degradation is reduced, and charge and discharge performance of the battery is maximized and maintained for a long time. Further, a method for dissolving a reaction product, which is one embodiment of the present invention, i.e., application of a signal to supply a current reverse to a current with which a reaction product is formed, during charge of a battery, can reduce defective products which suddenly do not function as batteries later from any cause although being charged and discharged without any problem when manufactured and shipped as quality products.

Embodiment 4

The method for dissolving a reaction product, which is one embodiment of the present invention, can be used for power sources included in a variety of electrical devices. Further, a maintenance-free battery can be obtained by supplying a reverse pulse current in charging a battery which is fabricated in one embodiment of the present invention.

Here, "electrical devices" refer to all general industrial products including portions which operate by electric power. Electrical devices are not limited to consumer products such as home electrical products and also include products for various uses such as business use, industrial use, and military use in their category. Examples of electrical devices each using the battery of one embodiment of the present invention are as follows: display devices of televisions, monitors, and the like, lighting devices, desktop personal computers, laptop personal computers, word processors, image reproduction devices which reproduce still images or moving images stored in recording media such as digital versatile discs (DVDs), portable or stationary music reproduction devices such as compact disc (CD) players and digital audio players, portable or stationary radio receivers, recording reproduction devices such as tape recorders and IC recorders (voice recorders), headphone stereos, stereos, remote controls, clocks such as table clocks and wall clocks, cordless phone handsets, transceivers, mobile phones, car phones, portable or stationary game machines, pedometers, calculators, portable information terminals, electronic notebooks, e-book readers, electronic translators, audio input devices such as microphones, cameras such as still cameras and video cameras, toys, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, smoke detectors, and a health equipment and a medical equipment such as hearing aids, cardiac pacemakers, portable X-ray equipments, radiation counters, electric massagers, and dialyzers. The examples also include industrial equipment such as guide lights, traffic lights, meters such as gas meters and water meters, belt conveyors, elevators, escalators, automatic vending machines, automatic ticket machine, cash dispensers (CD), automated teller machines (ATM), digital signage, industrial robots, radio relay stations, mobile phone base stations, power storage systems, and batteries for leveling the amount of power supply and smart grid.

Note that in the electrical devices, the battery of one embodiment of the present invention can be used as main power sources for supplying enough electric power for almost the whole power consumption. Alternatively, in the electrical devices, the method for dissolving a reaction product, which is one embodiment of the present invention, can be used for an uninterruptible power source which can supply power to the electrical devices when the supply of electric power from the main power sources or a commercial power source is stopped. Still alternatively, in the electrical devices, the method for dissolving a reaction product, which is one embodiment of the present invention, can be used for an auxiliary power source for supplying electric power to the electrical devices at the same time as the electrical devices are supplied with electric power from the main power sources or the commercial power source. When the method for dissolving a reaction product, which is one embodiment of the present invention, is used for an auxiliary power source, a maintenance-free battery can be obtained by applying a signal to supply a current reverse to a current with which a reaction product is formed, during charge of the battery, resulting in a reduction in cost and time which are required for the maintenance of a fixed power source or power storage equipment. Although the maintenance of the fixed power source or power storage equipment requires considerable cost, a significant effect, such as a great reduction in cost for the maintenance, can be obtained with the use of the method for dissolving a reaction product, which is one embodiment of the present invention, i.e., application of a signal to supply a current reverse to a current with which a reaction product is formed, during charge of the battery.

As another example of the electrical devices, a portable information terminal is described with reference to FIGS. 18A to 18C.

Figure 18A:
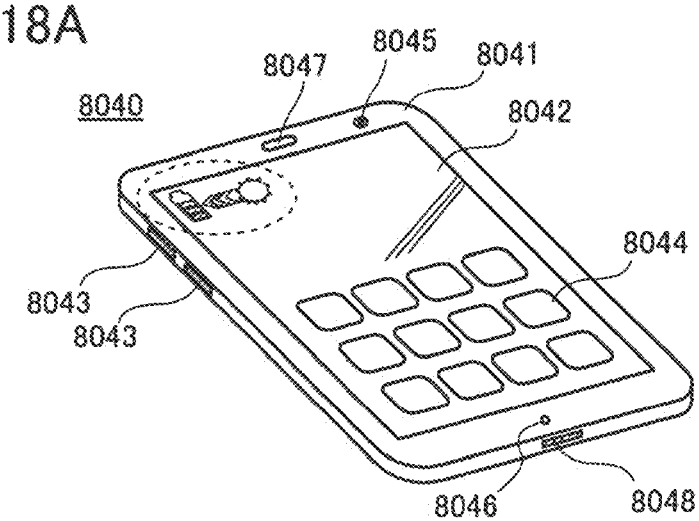
FIGS. 18A to 18C are diagrams illustrating an electrical device.

FIG. 18A is a perspective view illustrating a front surface and a side surface of a portable information terminal 8040. The portable information terminal 8040 is capable of executing a variety of applications such as mobile phone calls, e-mailing, viewing and editing texts, music reproduction, Internet communication, and a computer game. In the portable information terminal 8040, a housing 8041 includes a display portion 8042, a camera 8045, a microphone 8046, and a speaker 8047 on its front surface, a button 8043 for operation on its left side, and a connection terminal 8048 on its bottom surface.

A display module or a display panel is used for the display portion 8042. Examples of the display module or the display panel are a light-emitting device in which each pixel includes a light-emitting element typified by an organic light-emitting element (OLED); a liquid crystal display device: an electronic paper performing a display in an electrophoretic mode, an electronic liquid powder (registered trademark) mode, or the like: a digital micromirror device (DMD): a plasma display panel (PDP); a field emission display (FED); a surface conduction electron-emitter display (SED); a light-emitting diode (LED) display; a carbon nanotube display; a nanocrystal display; and a quantum dot display.

The portable information terminal 8040 illustrated in FIG. 18A is an example of providing the one display portion 8042 in the housing 8041; however, one embodiment of the present invention is not limited to this example. The display portion 8042 may be provided on a rear surface of the portable information terminal 8040. Further, the portable information terminal 8040 may be a foldable portable information terminal in which two or more display portions are provided.

A touch panel with which data can be input by an instruction means such as a finger or a stylus is provided as an input means on the display portion 8042. Therefore, icons 8044 displayed on the display portion 8042 can be easily operated by the instruction means. Since the touch panel is provided, a region for a keyboard on the portable information terminal 8040 is not needed and thus the display portion can be provided in a large region. Further, since data can be input with a finger or a stylus, a user-friendly interface can be obtained. Although the touch panel may be of any of various types such as a resistive type, a capacitive type, an infrared ray type, an electromagnetic induction type, and a surface acoustic wave type, the resistive type or the capacitive type is particularly preferable because the display portion 8042 can be curved. Furthermore, such a touch panel may be what is called an in-cell touch panel, in which a touch panel is integral with the display module or the display panel.

The touch panel may also function as an image sensor. In this case, for example, an image of a palm print, a fingerprint, or the like is taken with the display portion 8042 touched with the palm or the finger, whereby personal authentication can be performed. Furthermore, with the use of backlight or a sensing light source emitting near-infrared light for the display portion 8042, an image of a finger vein, a palm vein, or the like can also be taken.

Further, instead of the touch panel, a keyboard may be provided in the display portion 8042. Furthermore, both the touch panel and the keyboard may be provided.

The button 8043 for operation can have various functions in accordance with the intended use. For example, the button 8043 may be used as a home button so that a home screen is displayed on the display portion 8042 by pressing the button 8043. Further, the portable information terminal 8040 may be configured such that main power source thereof is turned off with a press of the button 8043 for a predetermined time. A structure may also be employed in which a press of the button 8043 brings the portable information terminal 8040 which is in a sleep mode out of the sleep mode. Besides, the button can be used as a switch for starting a variety of functions, for example, depending on the length of time for pressing or by pressing the button at the same time as another button.

Further, the button 8043 may be used as a volume control button or a mute button to have a function of adjusting the volume of the speaker 8047 for outputting sound, for example. The speaker 8047 outputs various kinds of sound, examples of which are sound set for predetermined processing, such as startup sound of an operating system (OS), sound from sound files executed in various applications, such as music from music reproduction application software, and an incoming e-mail alert. Although not illustrated, a connector for outputting sound to a device such as headphones, earphones, or a headset may be provided together with or instead of the speaker 8047 for outputting sound.

As described above, the button 8043 can have various functions. Although the number of the button 8043 is two in the portable information terminal 8040 in FIG. 18A, it is needless to say that the number, arrangement, position, or the like of the buttons is not limited to this example and can be designed as appropriate.

The microphone 8046 can be used for sound input and recording. Images obtained with the use of the camera 8045 can be displayed on the display portion 8042.

In addition to the operation with the touch panel provided on the display portion 8042 or the button 8043, the portable information terminal 8040 can be operated by recognition of user's movement (gesture) (also referred to as gesture input) using the camera 8045, a sensor provided in the portable information terminal 8040, or the like. Alternatively, with the use of the microphone 8046, the portable information terminal 8040 can be operated by recognition of user's voice (also referred to as voice input). By introducing a natural user interface (NUI) technique which enables data to be input to an electrical device by natural behavior of a human, the operational performance of the portable information terminal 8040 can be further improved.

The connection terminal 8048 is a terminal for inputting a signal at the time of communication with an external device or inputting electric power at the time of power supply. For example, the connection terminal 8048 can be used for connecting an external memory drive to the portable information terminal 8040. Examples of the external memory drive are storage medium drives such as an external hard disk drive (HDD), a flash memory drive, a digital versatile disk (DVD) drive, a DVD-recordable (DVD-R) drive, a DVD-rewritable (DVD-RW) drive, a compact disc (CD) drive, a compact disc recordable (CD-R) drive, a compact disc rewritable (CD-RW) drive, a magneto-optical (MO) disc drive, a floppy disk drive (FDD), and other nonvolatile solid state drive (SSD) devices. Although the portable information terminal 8040 has the touch panel on the display portion 8042, a keyboard may be provided on the housing 8041 instead of the touch panel or may be externally added.

Although the number of the connection terminal 8048 is one in the portable information terminal 8040 in FIG. 18A, it is needless to say that the number, arrangement, position, or the like of the connection terminals is not limited to this example and can be designed as appropriate.

Figure 18B:
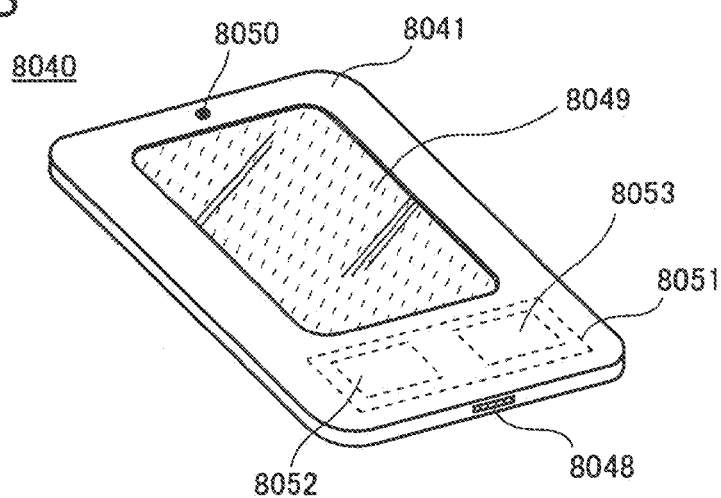

FIG. 18B is a perspective view illustrating the rear surface and the side surface of the portable information terminal 8040. In the portable information terminal 8040, the housing 8041 includes a solar cell 8049 and a camera 8050 on its rear surface; the portable information terminal 8040 further includes a charge and discharge control circuit 8051, a battery 8052, a DC-DC converter 8053, and the like. FIG. 18B illustrates an example where the charge and discharge control circuit 8051 includes the battery 8052 and the DC-DC converter 8053. The method for dissolving a reaction product, which is one embodiment of the present invention described above, can be used for the battery 8052.

The solar cell 8049 attached on the rear surface of the portable information terminal 8040 can supply electric power to the display portion, the touch panel, a video signal processor, and the like. Note that the solar cell 8049 can be provided on one or both surfaces of the housing 8041. By including the solar cell 8049 in the portable information terminal 8040, the battery 8052 in the portable information terminal 8040 can be charged even in a place where an electric power supply unit is not provided, such as outdoors.

As the solar cell 8049, it is possible to use any of the following: a silicon-based solar cell including a single layer or a stacked layer of single crystal silicon, polycrystalline silicon, microcrystalline silicon, or amorphous silicon; an InGaAs-based, GaAs-based, CIS-based, $Cu_2ZnSnS_4$-based, or CdTe-CdS-based solar cell; a dye-sensitized solar cell including an organic dye; an organic thin film solar cell including a conductive polymer, fullerene, or the like; a quantum dot solar cell having a pin structure in which a quantum dot structure is formed in an i-layer with silicon or the like; and the like.

Here, an example of a structure and operation of the charge and discharge control circuit 8051 illustrated in FIG. 18B is described with reference to a block diagram in FIG. 18C.

Figure 18C:
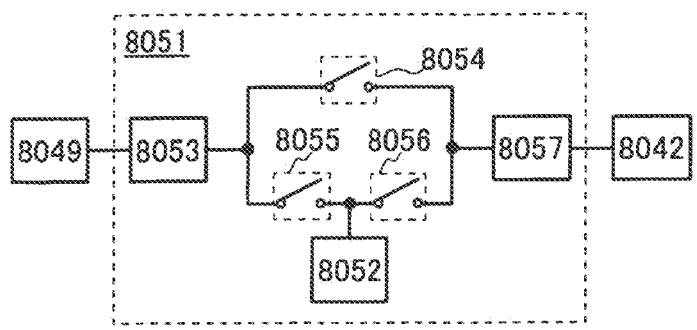

FIG. 18C illustrates the solar cell 8049, the battery 8052, the DC-DC converter 8053, a converter 8057, a switch 8054, a switch 8055, a switch 8056, and the display portion 8042. The battery 8052, the DC-DC converter 8053, the converter 8057, and the switches 8054 to 8056 correspond to the charge and discharge control circuit 8051 in FIG. 18B.

The voltage of electric power generated by the solar cell 8049 with the use of external light is raised or lowered by the DC-DC converter 8053 to be at a level needed for charging the battery 8052. When electric power from the solar cell 8049 is used for the operation of the display portion 8042, the switch 8054 is turned on and the voltage of the electric power is raised or lowered by the converter 8057 to a voltage needed for operating the display portion 8042. In addition, when display on the display portion 8042 is not performed, the switch 8054 is turned off and the switch 8055 is turned on so that the battery 8052 may be charged.

Although the solar cell 8049 is described as an example of a power generation means, the power generation means is not particularly limited thereto, and the battery 8052 may be charged by another power generation means such as a piezoelectric element or a thermoelectric conversion element (Peltier element). The charging method of the battery 8052 in the portable information terminal 8040 is not limited thereto, and the connection terminal 8048 may be connected to a power source to perform charge, for example. The battery 8052 may be charged by a non-contact power transmission module performing charge by transmitting and receiving electric power wirelessly, or any of the above charging methods may be used in combination.

Here, the state of charge (SOC) of the battery 8052 is displayed on the upper left corner (in the dashed frame in FIG. 18A) of the display portion 8042. Thus, the user can check the state of charge of the battery 8052 and can accordingly select a power saving mode of the portable information terminal 8040. When the user selects the power saving mode, for example, the button 8043 or the icons 8044 can be operated to switch the components of the portable information terminal 8040, e.g., the display module or the display panel, an arithmetic unit such as CPU, and a memory, to the power saving mode. Specifically, in each of the components, the use frequency of a given function is decreased to stop the use. Further, the portable information terminal 8040 can be configured to be automatically switched to the power saving mode depending on the state of charge. Furthermore, by providing a sensor such as an optical sensor in the portable information terminal 8040, the amount of external light at the time of using the portable information terminal 8040 is sensed to optimize display luminance, which makes it possible to reduce the power consumption of the battery 8052.

In addition, when charging with the use of the solar cell 8049 or the like is performed, an image or the like showing that the charging is performed with the solar cell may be displayed on the upper left corner (in the dashed frame) of the display portion 8042 as illustrated in FIG. 18A.

It is needless to say that one embodiment of the present invention is not limited to the electrical device illustrated in FIGS. 18A to 18C as long as the battery of one embodiment of the present invention is included.

Figure 19A:
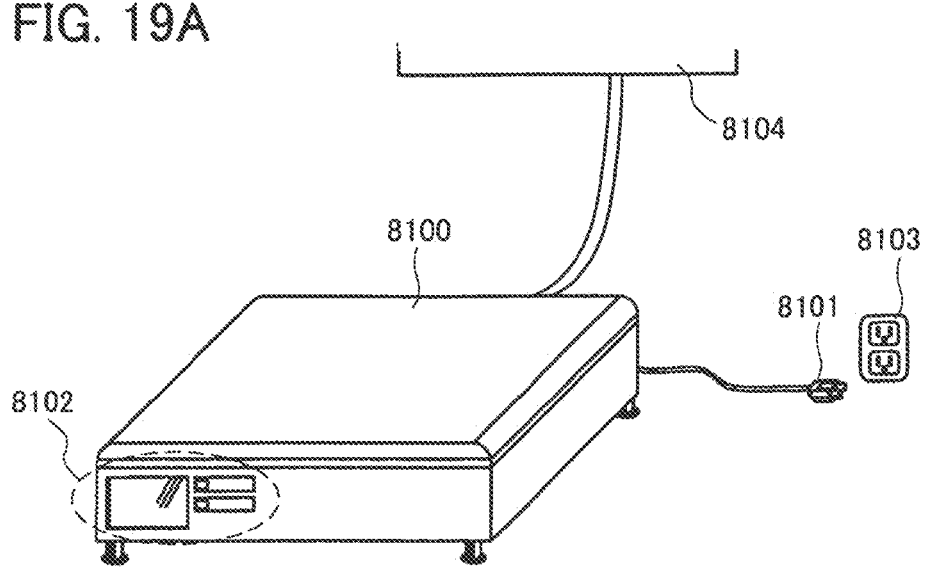
FIGS. 19A and 19B are diagrams illustrating an electrical device.
Figure 19B:
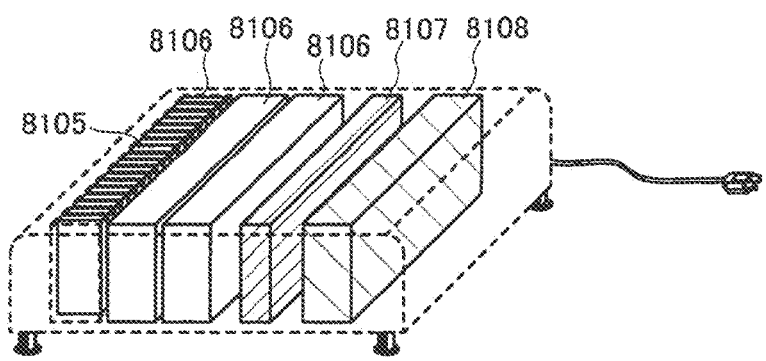

Moreover, a power storage system is described as another example of the electrical devices with reference to FIGS. 19A and 19B. A power storage system 8100 to be described here can be used at home. Here, the power storage system 8100 is described as a home-use power storage system as an example; however, it is not limited thereto and can also be used for business use or other uses.

As illustrated in FIG. 19A, the power storage system 8100 includes a plug 8101 for being electrically connected to a system power supply 8103. Further, the power storage system 8100 is electrically connected to a panelboard 8104 installed in home.

The power storage system 8100 may further include a display panel and the like 8102 for displaying an operation state or the like, for example. The display panel may have a touch screen. In addition, the power storage system 8100 may include a switch for turning on and off a main power source, a switch to operate the power storage system, and the like as well as the display panel.

Although not illustrated, an operation switch to operate the power storage system 8100 may be provided separately from the power storage system 8100; for example, the operation switch may be provided on a wall in a room. Alternatively, the power storage system 8100 may be connected to a personal computer, a server, or the like provided in home, in order to be operated indirectly. Still alternatively, the power storage system 8100 may be remotely operated using the Internet, an information terminal such as a smartphone, or the like. In such cases, a mechanism that performs wired or wireless communication between the power storage system 8100 and other devices is provided in the power storage system 8100.

FIG. 19B is a schematic view illustrating the inside of the power storage system 8100. The power storage system 8100 includes a plurality of battery groups 8106, a battery management unit (BMU) 8107, and a power conditioning system (PCS) 8108.

In the battery group 8106, a plurality of batteries 8105 described above are connected to each other. Electric power from the system power supply 8103 can be stored in the battery group 8106. The plurality of battery groups 8106 are each electrically connected to the BMU 8107.

The BMU 8107 has functions of monitoring and controlling states of the plurality of batteries 8105 in the battery group 8106 and protecting the batteries 8105. Specifically, the BMU 8107 collects data of cell voltages and cell temperatures of the plurality of batteries 8105 in the battery group 8106, monitors overcharge and overdischarge, monitors overcurrent, controls a cell balancer, manages the degradation condition of a battery, calculates the remaining battery level (the state of charge (SOC)), controls a cooling fan of a driving power storage device, or controls detection of failure, for example. Note that the batteries 8105 may have some of or all the functions, or the power storage device groups may have the functions. The BMU 8107 is electrically connected to the PCS 8108.

Overcharge means that charge is further performed in a state of full charge, and overdischarge means that discharge is further performed to the extent that the capacity is reduced so that operation becomes impossible. Overcharge can be prevented by monitoring the voltage of a battery during charge so that the voltage does not exceed a specified value (allowable value), for example. Overdischarge can be prevented by monitoring the voltage of a battery during discharge so that the voltage does not become lower than a specified value (allowable value). Overcurrent refers to a current exceeding a specified value (allowable value). Overcurrent of a battery is caused when a positive electrode and a negative electrode are short-circuited in the battery or the battery is under an extremely heavy load, for example. Overcurrent can be monitored by monitoring a current flowing through a battery.

The PCS 8108 is electrically connected to the system power supply 8103, which is an AC power source and performs DC-AC conversion. For example, the PCS 8108 includes an inverter, a system interconnection protective device that detects irregularity of the system power supply 8103 and terminates its operation, and the like. In charging the power storage system 8100, for example, AC power from the system power supply 8103 is converted into DC power and transmitted to the BMU 8107. In discharging the power storage system 8100, electric power stored in the battery group 8106 is convened into AC power and supplied to an indoor load, for example. Note that the electric power may be supplied from the power storage system 8100 to the load through the panelboard 8104 as illustrated in FIG. 19A or may be directly supplied from the power storage system 8100 through wired or wireless transmission.

Note that a power source for charging the power storage system 8100 is not limited to the system power supply 8103 described above; for example, electric power may be supplied from a solar power generating system installed outside.

This embodiment can be freely combined with any of the other embodiments.

Example 1

In this example, a result that one embodiment of the present invention can inhibit a reaction product from being generated is described while comparing the result with results of comparative examples.

Specifically, description is made on a result that generation of a whisker-like reaction product on a surface of a negative electrode can be inhibited by applying a signal to supply a current reverse to a current with which a reaction product is formed on an electrode surface, with reference to FIG. 20, FIGS. 21A and 21B, FIGS. 22A to 22C, FIG. 23, FIGS. 24A and 24B, FIGS. 25A to 25C, FIG. 26, and FIGS. 27A and 27B. Note that results of the comparative examples are described with reference to FIGS. 24A and 24B, FIGS. 25A to 25C, FIG. 26, and FIGS. 27A and 27B.

Figure 20:
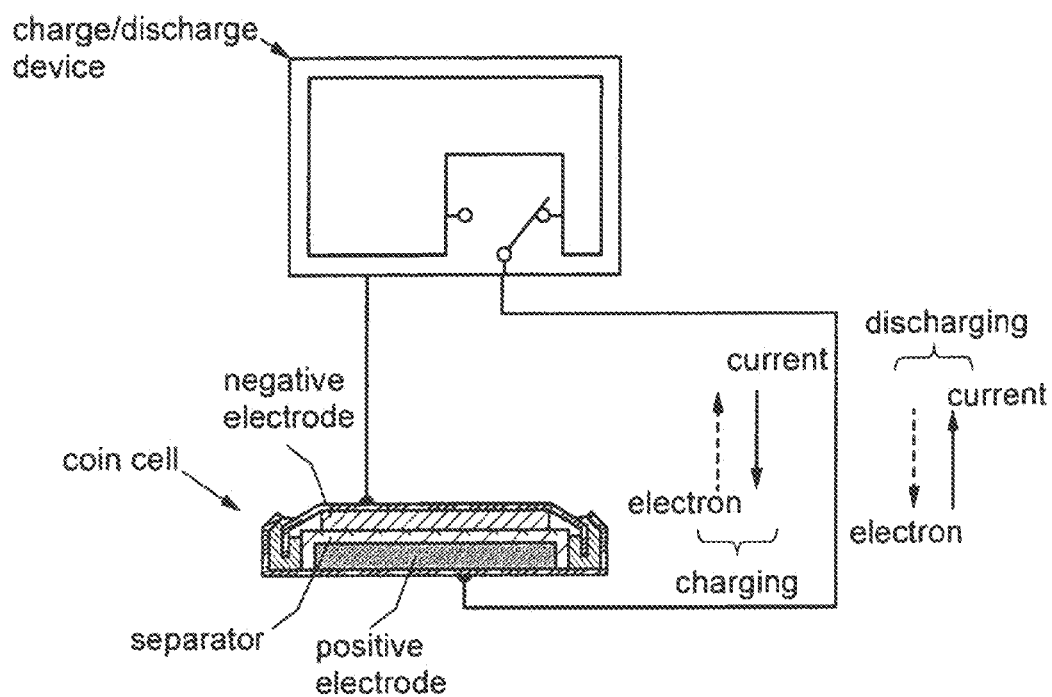
FIG. 20 is a schematic view illustrating a structure of a charge/discharge device.

FIG. 20 is a schematic view illustrating structures of a lithium-ion secondary battery and a charge/discharge device which were used in this example.

Figure 21A:
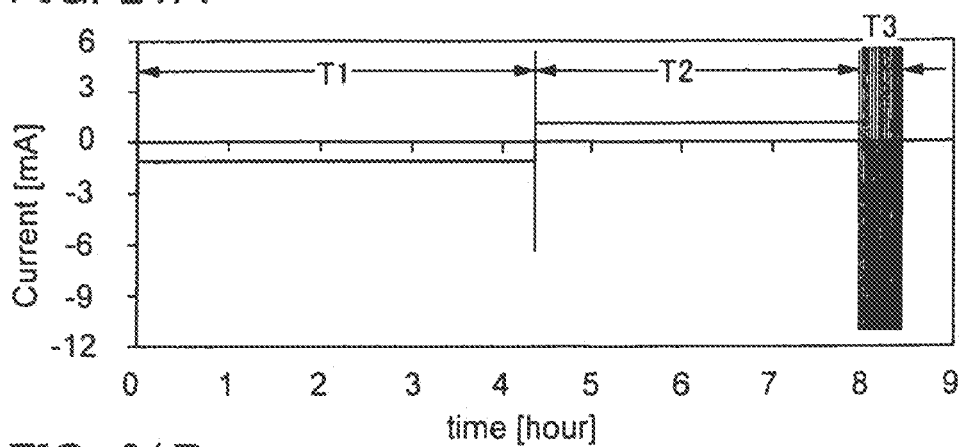
FIGS. 21A and 21B are graphs showing a signal applied to a battery.
Figure 21B:
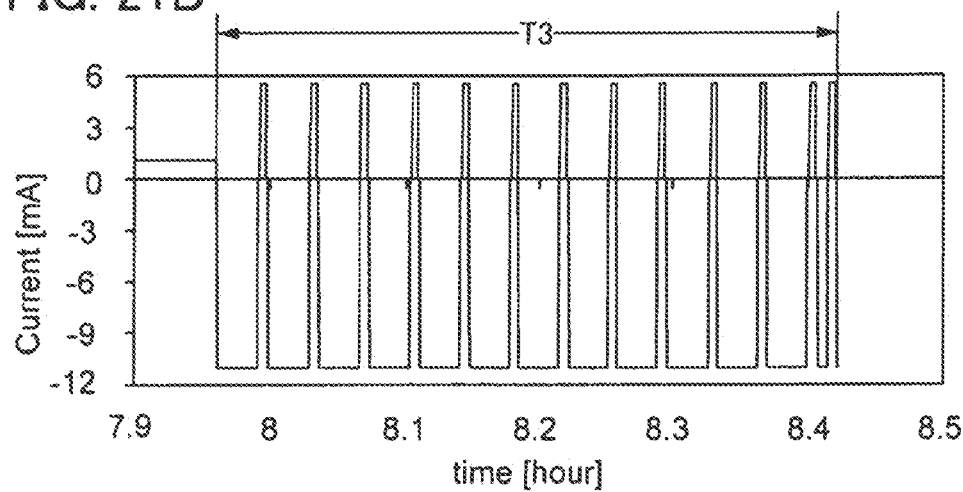

FIGS. 21A and 21B show a signal applied to the lithium-ion secondary battery in this example. Specifically, current values of the applied signal relative to time represented by the horizontal axis are shown. Here, in charging, the direction in which a reverse pulse current flows, i.e., the direction of a current that flows from a positive electrode to the outside of the battery, is assumed to be the positive direction. For this reason, a value of a charging current of the lithium-ion secondary battery is shown by a negative value, and a value of a discharging current of the lithium-ion secondary battery is shown by a positive value.

Figure 22A:
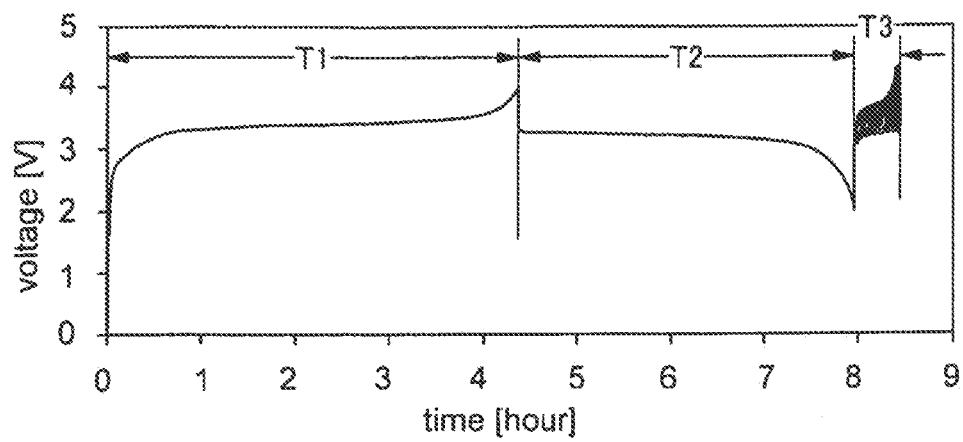
FIGS. 22A to 22C are graphs showing results of application of a signal to a battery.
Figure 22B:
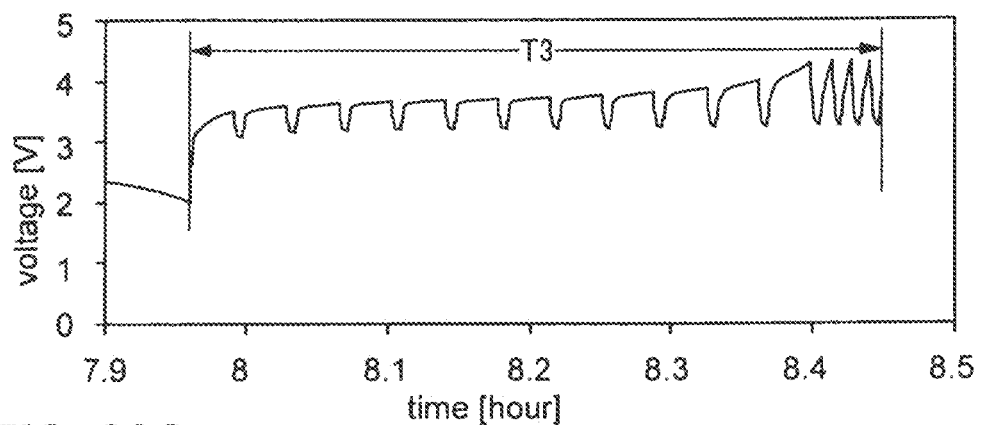
Figure 22C:
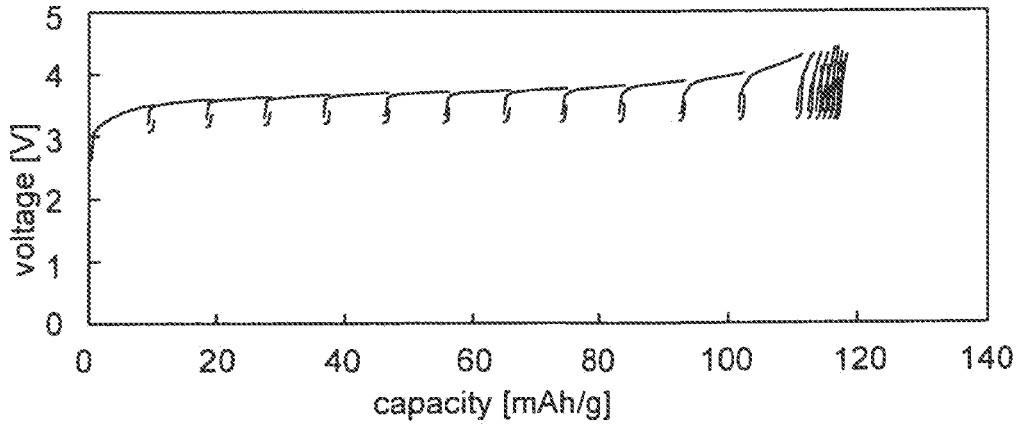

FIGS. 22A to 22C show results of application of the signal to the lithium-ion secondary battery in this example. Specifically, FIGS. 22A to 22C show a voltage (cell voltage) observed between a positive electrode and a negative electrode and here, show a voltage value of the positive electrode when a voltage value of the negative electrode is used as a reference value. Further, cell voltages relative to capacity stored in an active material per unit weight of the positive electrode expressed by the horizontal axis are shown. Note that the voltage of the positive electrode in the lithium-ion secondary battery is shown with the use of the voltage of the negative electrode as a reference voltage.

Figure 23:
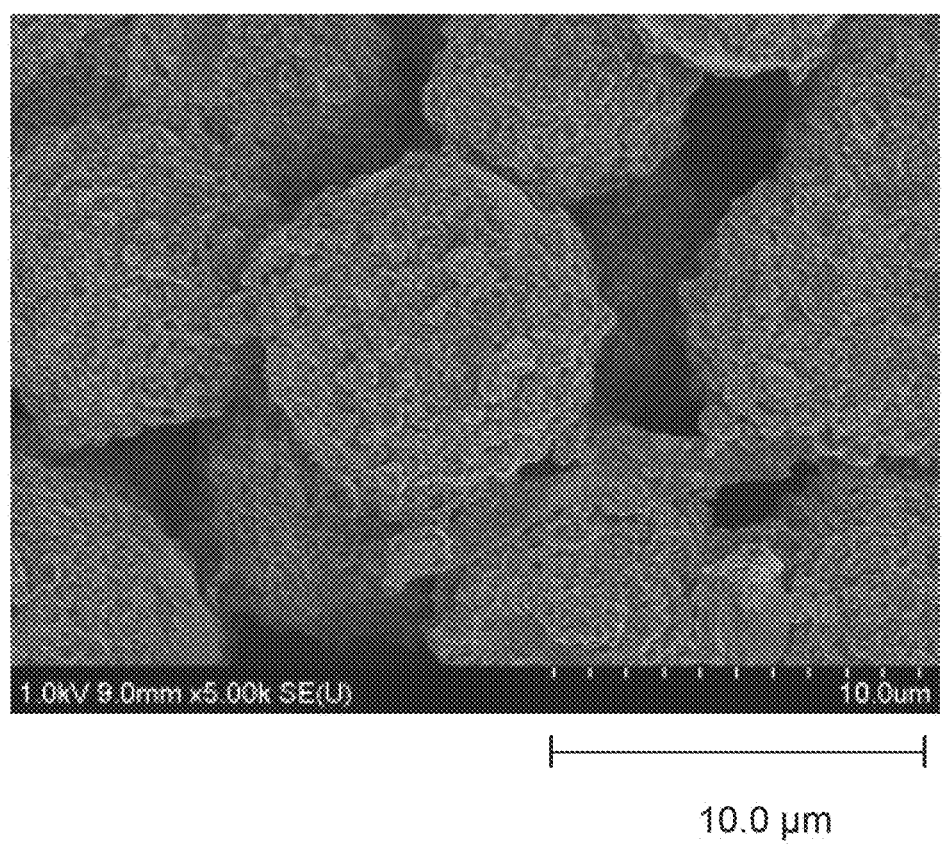
FIG. 23 is a SEM image of a surface of a negative electrode.

FIG. 23 is a secondary electron image of a surface of the negative electrode after quick charge in this example that is observed with a scanning electron microscope (SEM).

Figure 24A:
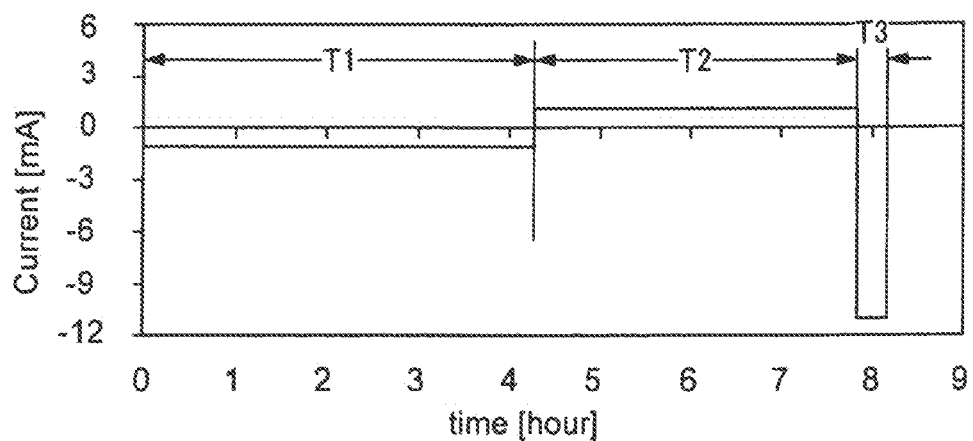
FIGS. 24A and 24B are graphs each showing a signal applied to a battery (in Comparative Example 1).
Figure 24B:
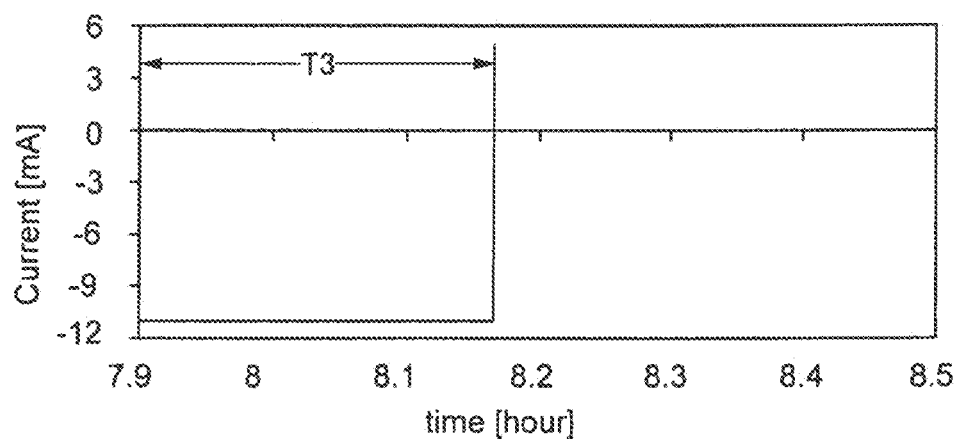

FIGS. 24A and 24B show a signal applied to a lithium-ion secondary battery in a comparative example. Specifically, current values of the applied signal relative to time represented by the horizontal axis are shown.

Figure 25A:
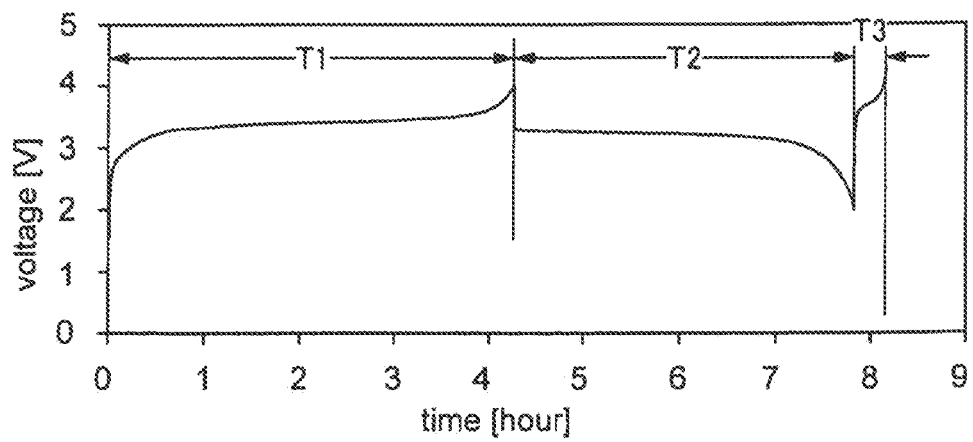
FIGS. 25A to 25C are graphs showing results of application of a signal to a battery (in Comparative Example 1).
Figure 25B:
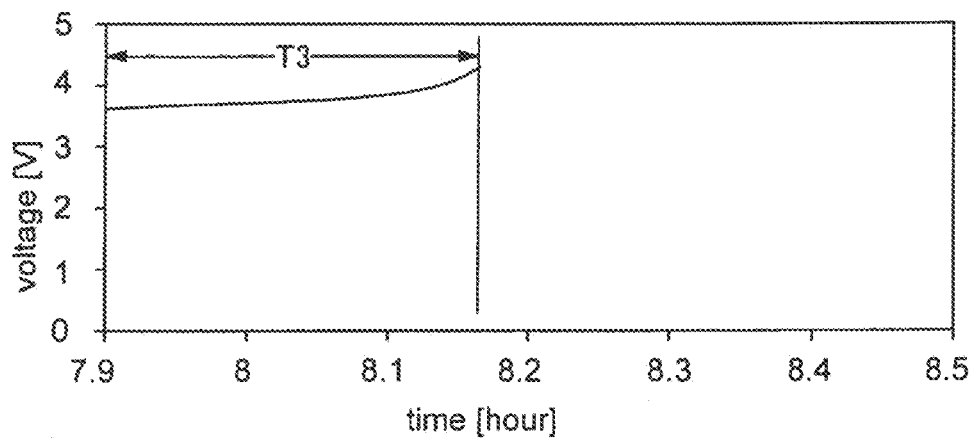
Figure 25C:
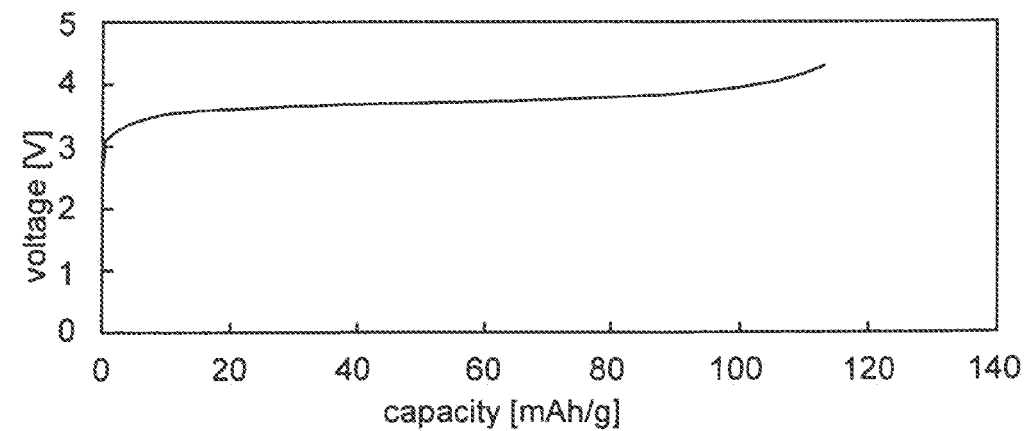

FIGS. 25A to 25C show results of applying the signal to the lithium-ion secondary battery in the comparative example. Specifically, cell voltages relative to time represented by the horizontal axis are shown. Further, the cell voltages relative to capacity stored in an active material per unit weight of a positive electrode expressed by the horizontal axis are shown.

Figure 26:
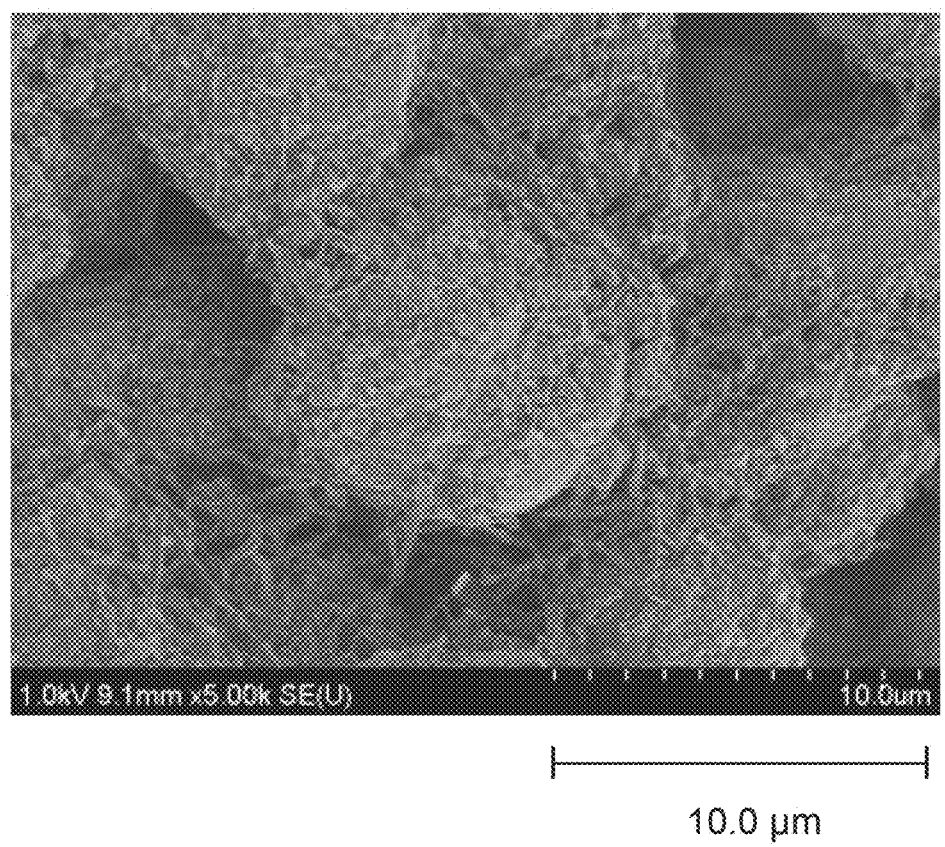
FIG. 26 is a SEM image of a surface of a negative electrode (in Comparative Example 1).

FIG. 26 is a secondary electron image of a surface of a negative electrode after quick charge in the comparative example that is observed with a SEM.

Figure 27A:
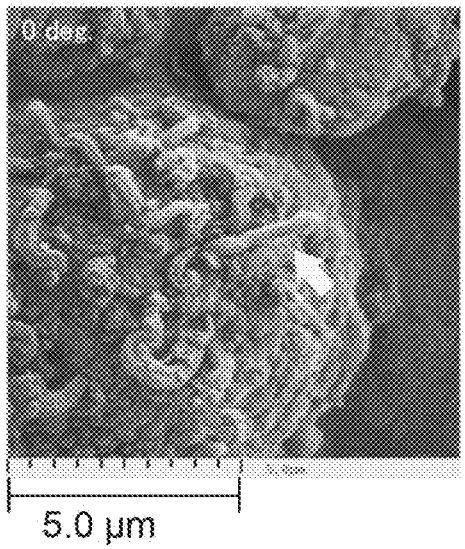
FIGS. 27A and 27B are cross-sectional TEM images of a reaction product (in Comparative Example 2).
Figure 27B:
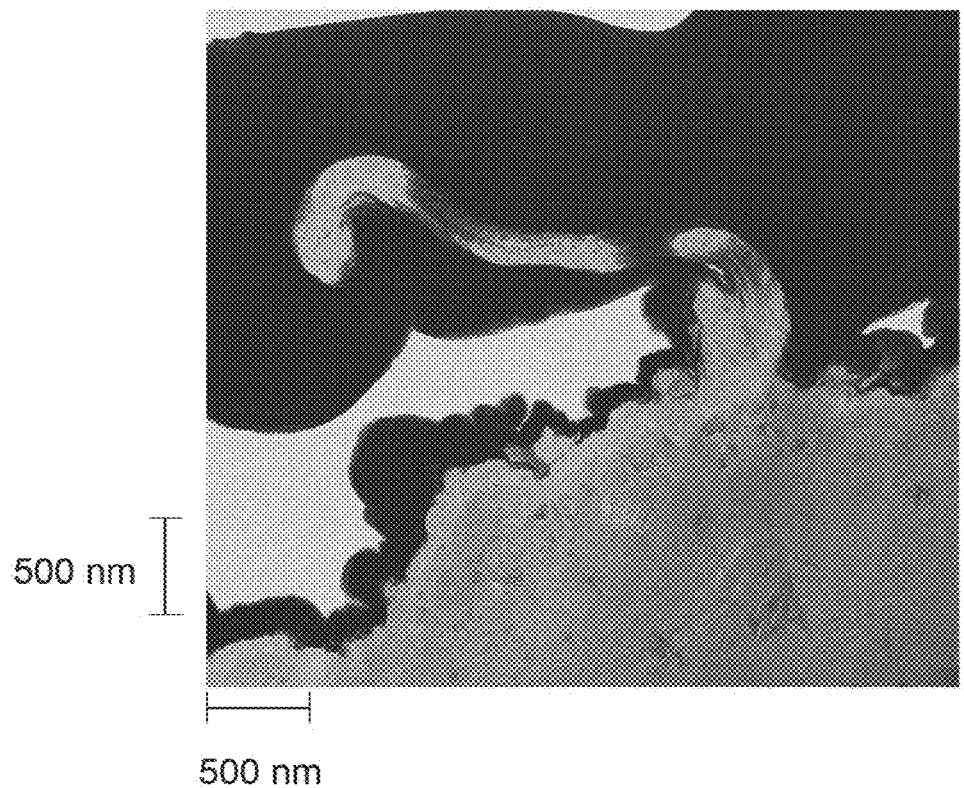

FIGS. 27A and 27B are micrographs of an example of a whisker-like reaction product formed on a surface of a negative electrode active material.

The structure of the lithium-ion secondary battery used in this example is illustrated in FIG. 20. Note that a charge/discharge device was used in charging and discharging the lithium-ion secondary battery.

<Structure of Lithium-Ion Secondary Battery>

The lithium-ion secondary battery used in this example includes the positive electrode, the negative electrode, and a separator between the positive electrode and the negative electrode. A space between the positive electrode and the negative electrode is filled with an electrolytic solution. In this example, a coin-type lithium-ion secondary battery was fabricated and used.

<<Structure and Formation Method of Negative Electrode>>

As a negative electrode active material, spherulite graphite with a particle size distribution D50 (a particle diameter when accumulation of particles accounts for 50% of a particle size distribution curve in a measurement result of the particle size distribution) of 9 μm produced by JFE Chemical Corporation was used. The graphite was mixed with acetylene black (AB), polyvinylidene fluoride (PVDF), and N-methyl-2-pyrrolidone (NMP) to form slurry. The weight ratio of the graphite to the AB and the PVDF was 93:2:5. The slurry was applied onto a current collector (18-μm-thick copper foil) and dried. Thus, the negative electrode was formed. The electrode was stamped out to have a diameter of 16.16 mm, and used as an electrode for a coin cell.

The negative electrode used in this example had a thickness of 84 μm, and the negative electrode active material had a weight of 16.833 mg. Note that the graphite had a theoretical capacity of 372 mAh/g.

<<Structure and Formation Method of Positive Electrode>>

As a positive electrode active material, lithium iron phosphate ($LiFePO_4$) with a particle size distribution D90 (a particle diameter when accumulation of particles accounts for 90% of a particle size distribution curve in a measurement result of the particle size distribution) of 2.9 μm was used. The $LiFePO_4$, AB, PVDF, and NMP were mixed to form slurry. The weight ratio of the $LiFePO_4$ to the AB and the PVDF was 85:8:7. The slurry was applied onto a current collector (20-μm-thick aluminum foil) and dried. Thus, the positive electrode was formed. The electrode was stamped out to have a diameter of 15.96 mm, and used as an electrode for the coin cell.

The positive electrode used in this example had a thickness of 137 μm, and the positive electrode active material had a weight of 33.316 mg. Further, the capacity of the positive electrode was 90.4% of the capacity of the negative electrode. Note that a C rate used below was calculated on the assumption that 1 C was the amount of current for discharging the total capacity calculated from the weight of the active material and theoretical capacity of the $LiFePO_4$, i.e., 170 mAh/g, in 1 hour.

<<Structure of Electrolytic Solution>>

The electrolytic solution was obtained by dissolving lithium hexafluorophosphate ($LiPF_6$) in a mixed solvent of ethylene carbonate (EC) and diethyl carbonate (DEC).

Note that a mixing ratio of the EC to the DEC was 3:7 (volume ratio), and the $LiPF_6$ was dissolved in the mixed solvent at a concentration of 1 mol/L.

<<Structure of Separator>>

A 260-μm-thick glass fiber filter was used as the separator.

<Conditions of Charge and Discharge of Lithium-Ion Secondary Battery>

FIGS. 21A and 21B show the signal applied to the lithium-ion secondary battery in this example.

FIGS. 21A and 21B show current values of the applied signal relative to time represented by the horizontal axis. Note that a value of a charging current of the lithium-ion secondary battery is shown by a negative value, and a value of a discharging current of the lithium-ion secondary battery is shown by a positive value.

Further, FIGS. 22A and 22B show observed cell voltages relative to the time represented by the horizontal axis. Note that the voltage of the positive electrode of the lithium-ion secondary battery is shown with the use of the voltage of the negative electrode as a reference voltage.

<<Conditions of Initial Charge and Discharge>>

In FIG. 21A and FIG. 22A, a period T1 and a period T2 represent a period for initial charge and a period for initial discharge, respectively.

The initial charge was performed at 0.2 C, and was terminated when the cell voltage reached 4.0 V. The initial discharge was performed at 0.2 C after the initial charge was performed, and was finished when the cell voltage decreased to 2.0 V. Note that an environmental temperature was 25° C.

<<Condition of Second Charge>>

In FIG. 21A and FIG. 22A, a period T3 represents a period for the second charge. In this example, in the second charge of the lithium-ion secondary battery, a signal to supply a current reverse to a current with which a reaction of lithium insertion into the negative electrode occurred and a reaction product was formed was applied. Note that FIG. 21B and FIG. 22B show the period T3 in detail.

Specifically, a signal to perform discharge at 1 C (5.6 mA) for 10 seconds was applied to the lithium-ion secondary battery every time charge was performed at 2 C (11 mA) by a capacity of 10 mAh/g (0.33 mAh). The second charge was terminated when the cell voltage reached 4.3 V. Note that an environmental temperature was 25° C.

Note that FIG. 22C shows cell voltages relative to capacity stored in the active material per unit weight of the positive electrode expressed by the horizontal axis.

<Observation of Negative Electrode>

After the second charge, the lithium-ion secondary battery was disassembled in a glove box in an argon atmosphere, and the negative electrode was taken out and washed with dimethyl carbonate. Then, the negative electrode was carried in the SEM with the use of a holder for shielding an atmosphere to observe the surface thereof.

The secondary electron image was shown in FIG. 23. The spherical substance in FIG. 23 is graphite used as the negative electrode active material.

A whisker-like reaction product was not observed on the surface of the graphite.

Note that the comparative examples where charge was performed at 2 C without applying a signal to supply a current reverse to a current with which a reaction product is formed on an electrode surface are described later. In the comparative examples, a whisker-like reaction product was observed on the surface of graphite used as a negative electrode active material.

The results of this example show that a whisker-like reaction product is dissolved by application of electrical stimulus, specifically by application of a signal to supply a current reverse to a current with which a reaction product is formed, which is a significant effect.

Comparative Example 1

Next, in this comparative example, a result that a reaction product was formed on a surface of a negative electrode active material is described with reference to FIGS. 24A and 24B, FIGS. 25A to 25C, and FIG. 26.

<Structure of Lithium-Ion Secondary Battery>

A lithium-ion secondary battery used in this comparative example had a structure similar to that in Example 1 except that the capacity per volume of a negative electrode is different from that of a positive electrode. Thus, description is made on the capacity of the negative electrode and the capacity of the positive electrode, and the description in Example 1 can be referred to for description of other components.

<<Structures of Negative Electrode and Positive Electrode>>

The negative electrode had a thickness of 83 µm, and a negative electrode active material had a weight of 16.386 mg. The positive electrode had a thickness of 135 µm, and a positive electrode active material had a weight of 32.486 mg. The capacity of the positive electrode was 90.7% of the capacity of the negative electrode.

<Conditions of Charge and Discharge of Lithium-Ion Secondary Battery>

FIGS. 24A and 24B show a signal applied to the lithium-ion secondary battery in this comparative example.

FIGS. 24A and 24B show current values of the applied signal relative to time represented by the horizontal axis. Note that a value of a charging current of the lithium-ion secondary battery is shown by a negative value, and a value of a discharging current of the lithium-ion secondary battery is shown by a positive value.

Further. FIGS. 25A and 25B show observed cell voltages relative to the time represented by the horizontal axis. Note that the voltage of the positive electrode of the lithium-ion secondary battery is shown with the use of the voltage of the negative electrode as a reference voltage.

<<Conditions of Initial Charge and Discharge>>

In FIG. 24A and FIG. 25A, a period T1 and a period T2 represent a period for initial charge and a period for initial discharge, respectively.

The initial charge was performed at 0.2 C, and was terminated when the cell voltage reached 4.0 V in a manner similar to that in Example 1. The initial discharge was performed at 0.2 C after the initial charge was performed, and was finished when the cell voltage decreased to 2.0 V. Note that an environmental temperature was 25° C.

<<Condition of Second Charge>>

In FIG. 24A and FIG. 25A, a period T3 represents a period for the second charge. In this comparative example, the second charge of the lithium-ion secondary battery was performed at a high rate. Note that in this comparative example, a signal to supply a current reverse to a current with which a reaction product is formed was not applied.

Specifically, the second charge was performed at 2 C, and was terminated when the cell voltage reached 4.3 V.

Note that FIG. 25C shows cell voltages relative to capacity stored in the active material per unit weight of the positive electrode expressed by the horizontal axis.

<Observation of Negative Electrode>

After the second charge, the lithium-ion secondary battery was disassembled in a manner similar to that in Example 1. Then, the surface of the negative electrode was observed with the SEM.

The secondary electron image was shown in FIG. 26. The spherical substance in FIG. 26 is graphite used as the negative electrode active material. The graphite in FIG. 26 is also referred to as spherulite graphite.

A whisker-like reaction product covering the surface of the graphite was observed.

Comparative Example 2

FIGS. 27A and 27B show observation results of an example of a whisker-like reaction product formed on a surface of a negative electrode active material.

FIG. 27A is a planar image of a surface of a negative electrode active material observed with a scanning ion microscope (SIM) after a lithium-ion secondary battery was charged. There is a whisker-like reaction product in a portion indicated by the white arrow in FIG. 27A.

In addition, FIG. 27B is a cross-sectional image observed in the direction of the arrow in the SIM image. In the observation, a transmission electron microscope (TEM), H-9000NAR, manufactured by Hitachi High-Technologies Corporation was used at an acceleration voltage of 200 kV and a magnification of 55,000 times. As shown in FIG. 27B, whisker-like lithium grows while bending and thus is partly bent. The bent portion indicates that the whisker-like lithium grows from its tip and bottom.

Figure 28:
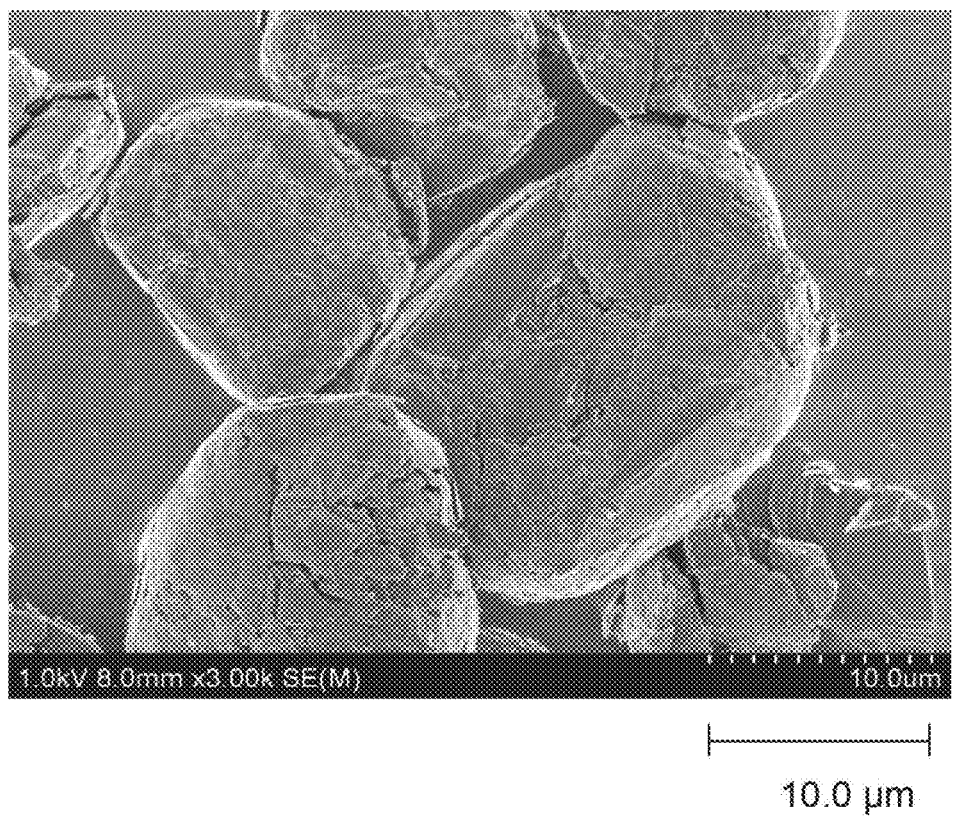
FIG. 28 is a SEM image of spherical natural graphite.
Figure 29:
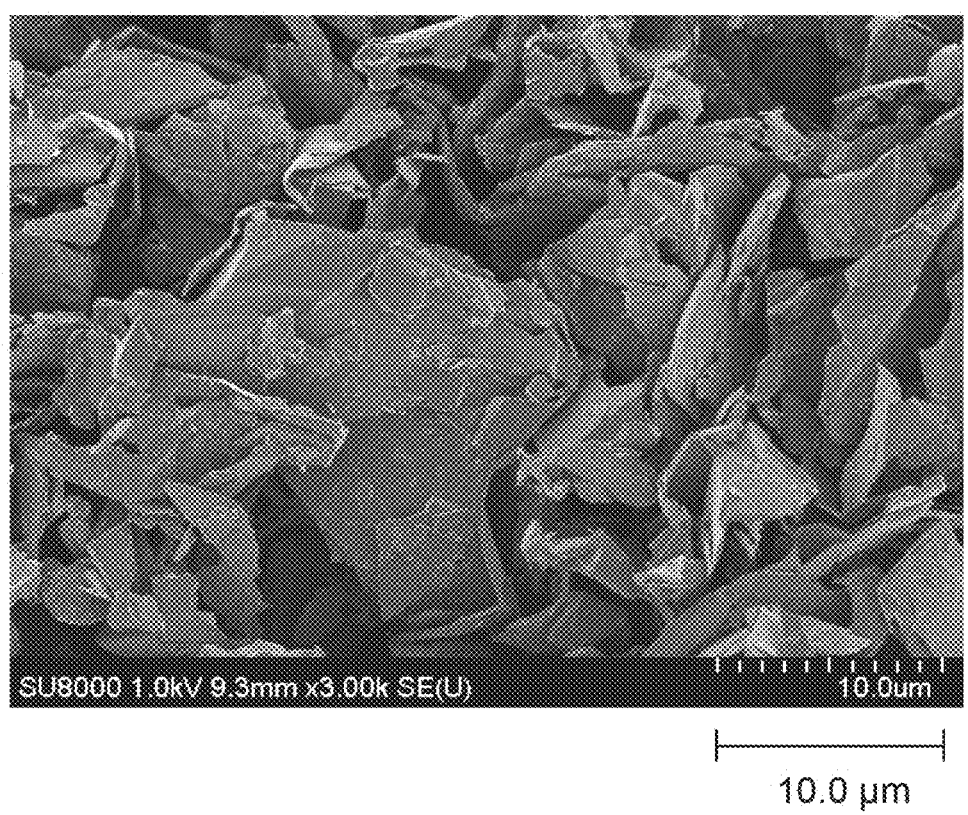
FIG. 29 is a SEM image of flake graphite.

For comparison, FIG. 23, FIG. 26, and FIGS. 27A and 27B show the example of using the spherulite graphite; however, the negative electrode active material is not particularly limited thereto. For example, spherical natural graphite may be used as shown in a SEM image of FIG. 28, or flake graphite may be used as shown in a SEM image of FIG. 29. A position where lithium is deposited to have a whisker shape and the size of the whisker-like lithium might vary depending on the shape of graphite. Regardless of the shape of graphite used in a negative electrode, one embodiment of the present invention can be used for a battery as long as lithium is deposited in the battery; by applying a signal to supply a current reverse to a current with which a reaction product is formed one or more times, ideally, an electrode surface can be returned to an initial state where the reaction product is not deposited on the electrode surface.

Example 2

In this example, description is made on conditions of application of a signal to supply a current reverse to a current with which a reaction product is formed on an electrode surface of a secondary battery (time, intervals, and intensity of the application) while comparing the conditions with those in comparative examples.

Four lithium battery cells were fabricated. Experiments were conducted to check whether a reaction product (lithium) was deposited or not in different lengths of time during which a current reverse to a charging current was supplied at the time of charging. Whether the lithium was deposited or not was checked by observing inside of electrodes in charging or discharging without exposure to the air with a confocal microscope. The electrodes were immersed in an electrolytic solution. Note that each of the battery cells was regarded as being fully charged when the voltage reached 4 V, and the charge was terminated. Table 1 shows the results.

TABLE 1

| Time of application (sec) | Lithium deposition |
|---|---|
| 80 | Not observed |
| 40 | Not observed |
| 20 | Slightly observed |
| 5 | Observed |
| Comparative Example | Observed |

As shown in Table 1, lithium deposition can be inhibited when the application of the signal is longer than or equal to 20 seconds. The four battery cells were charged at 2 C, and during the charge, a current reverse to a charging current was applied to the four battery cells at 1 C for 80 seconds, 40 seconds, 20 seconds, and 5 seconds, respectively, every time the capacities thereof increased by 10 mAh/g. Then, the battery cells were observed. For a comparative example, another battery cell was prepared and charged at 2 C without being supplied with a current reverse to a charging current.

The positive electrode was obtained by applying slurry in which LiFePO$_4$ as a positive electrode active material, AB. PVDF, and NMP (weight ratio of the LiFePO$_4$ to the AB and the PVDF was 83:8:9) were mixed onto a current collector. The negative electrode was obtained by applying slurry in which spherulite graphite (also referred to as mesophase spherical graphite) as a negative electrode active material. AB. PVDF, and NMP (weight ratio of the spherulite graphite to the AB and the PVDF was 93:2:5) were mixed onto a current collector. As a separator, polypropylene was used. The electrolytic solution was obtained by dissolving LiClO$_4$ in a mixed solvent of EC and DEC. Note that a mixing ratio of the EC to the DEC was 1:1 (volume ratio), and the LiClO$_4$ was dissolved in the mixed solvent at a concentration of 1 mol/L. With the use of the positive electrode, the negative electrode, the positive electrode active material, the negative electrode active material, the separator, and the electrolytic solution, each of the four battery cells was fabricated.

Three lithium battery cells were additionally prepared. Experiments were conducted to check whether a reaction product (lithium) was deposited or not at different intervals in which a current reverse to a charging current was supplied. Table 2 shows the results.

TABLE 2

| Interval of application (mAh/g) | Lithium deposition |
|---|---|
| 5 | Not observed |
| 10 | Not observed |
| 20 | Observed |
| Comparative Example | Observed |

As shown in Table 2, in the case where a signal to supply a current reverse to a charging current is applied every time the capacity increases by less than 20 mAh/g, preferably less than or equal to 10 mAh/g, lithium deposition can be inhibited. The three battery cells were charged at 2 C, and the signal was applied to the three battery cells for 20 seconds every time the capacities thereof increased by 5 mAh/g, 10 mAh/g, and 20 mAh/g, respectively. Then, the battery cells were observed. For a comparative example, another battery cell was prepared and charged at 2 C without being supplied with a current reverse to a charging current.

A positive electrode was obtained by applying slurry in which LiFePO$_4$ as a positive electrode active material, AB, PVDF, and NMP (weight ratio of the LiFePO$_4$ to the AB and the PVDF was 83:8:9) were mixed onto a current collector. A negative electrode was obtained by applying slurry in which spherulite graphite (also referred to as mesophase spherical graphite) as a negative electrode active material, AB, PVDF, and NMP (weight ratio of the spherulite graphite to the AB and the PVDF was 93:2:5) were mixed onto a current collector. As a separator, polypropylene was used. An electrolytic solution was obtained by dissolving LiPF$_6$ in a mixed solvent of EC and DEC. Note that a mixing ratio of the EC to the DEC was 3:7 (volume ratio), and the LiPF$_6$ was dissolved in the mixed solvent at a concentration of 1 mol/L. With the use of the positive electrode, the negative electrode, the positive electrode active material, the negative electrode active material, the separator, and the electrolytic solution, each of the three battery cells was fabricated.

Three lithium battery cells were additionally prepared. Experiments were conducted to check whether a reaction product (lithium) was deposited or not in different intensities of a current reverse to a charging current. Table 3 shows the results.

TABLE 3

| Rate of application (C) | Lithium deposition |
|---|---|
| 3 | Not observed |
| 2 | Not observed |
| 1 | Slightly observed |
| Comparative Example | Observed |

As shown in Table 3, when the signal to supply a current reverse to a charging current is applied at more than or equal to 1 C, lithium deposition can be inhibited. The three battery cells were charged at 1 C, and discharged at 1 C, 2 C, and 3 C, respectively, for 20 seconds every time the capacities thereof increased by 10 mAh/g. Then, the battery cells were observed. For a comparative example, another battery cell was prepared and charged at 1 C without being supplied with a current reverse to a charging current.

A positive electrode was obtained by applying slurry in which LiFePO$_4$ as a positive electrode active material. AB, PVDF, and NMP (weight ratio of the LiFePO$_4$ to the AB and the PVDF was 83:8:9) were mixed onto a current collector. A negative electrode was obtained by applying slurry in which natural graphite as a negative electrode active material, carboxymethylcellulose (CMC), and styrene-butadiene rubber (SBR) (weight ratio of the natural graphite to the CMC and the SBR was 94:2:4) were mixed onto a current collector. As a separator, polypropylene overlapping with a glass fiber filter was used. An electrolytic solution was obtained by dissolving LiClO$_4$ in a mixed solvent of EC and DEC. Note that a mixing ratio of the EC to the DEC was 1:1 (volume ratio), and the LiClO$_4$ was dissolved in the mixed solvent at a concentration of 1 mol/L. With the use of the positive electrode, the negative electrode, the positive electrode active material, the negative electrode active material, the separator, and the electrolytic solution, each of the three battery cells was fabricated.

Figure 30A:
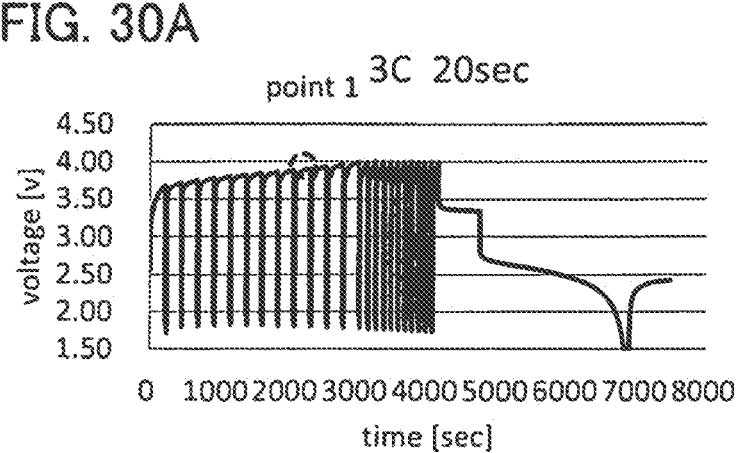
FIG. 30A is a graph showing the relation between voltage and time at the time of charging.
Figure 30B:
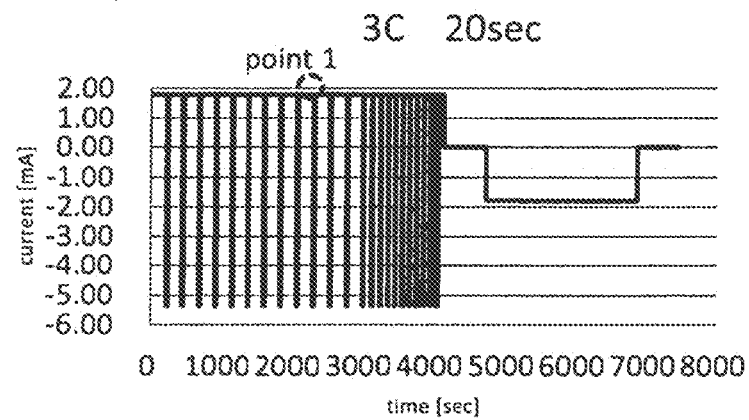
FIG. 30B is a graph showing the relation between current and time at the time of charging.
Figure 31:
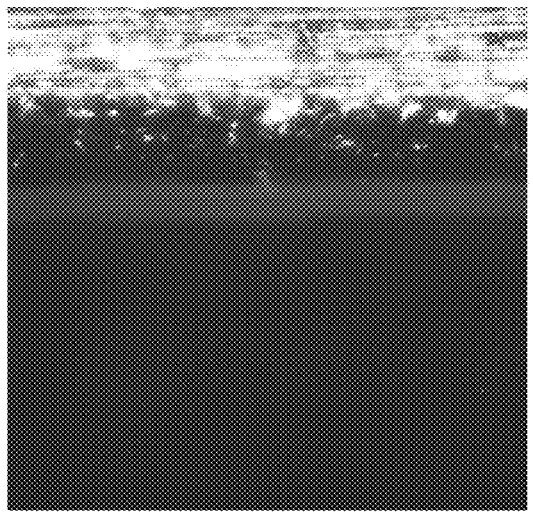
FIG. 31 is a cross-sectional image at the point 1 in FIGS. 30A and 30B.

Further, FIG. 30A is a graph showing the relation between time and voltage in the case where the intensity of the application of the signal to supply a current reverse to a charging current is 3 C as shown in Table 3; FIG. 30B is a graph showing the relation between time and current in the case. FIG. 31 is a cross-sectional image of a state observed with a confocal microscope at the point 1 in FIGS. 30A and 30B. It is found that lithium is not deposited when the intensity of the application of the signal to supply a current reverse to a charging current is 3 C.

Figure 32A:
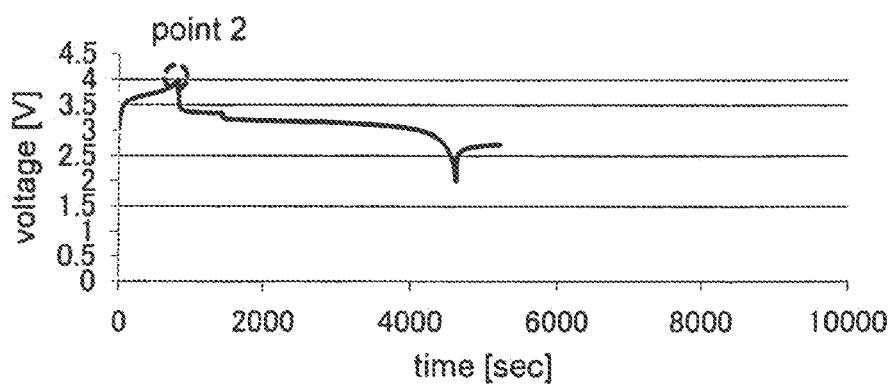
FIG. 32A is a graph showing the relation between voltage and time at the time of charging.
Figure 32B:
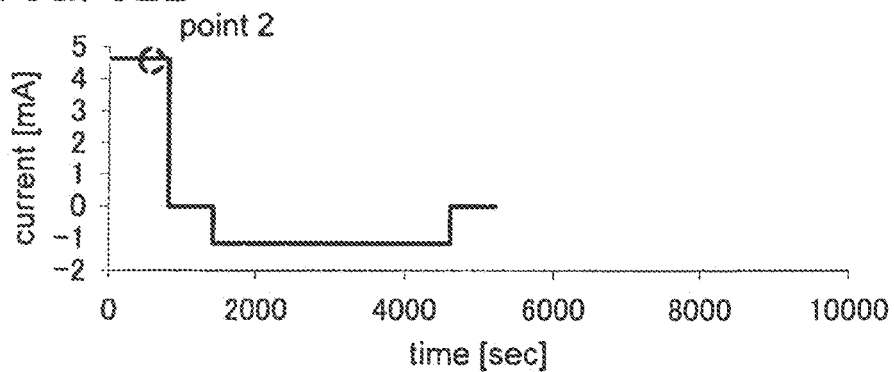
FIG. 32B is a graph showing the relation between current and time at the time of charging (in Comparative Example).
Figure 33:
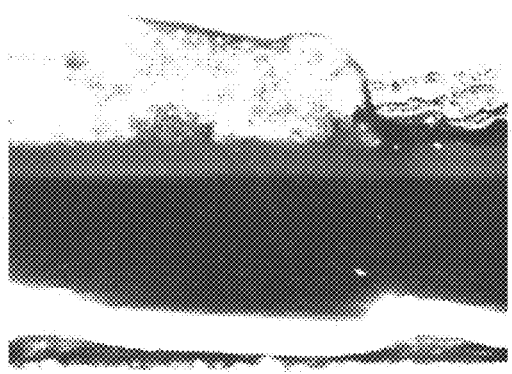
FIG. 33 is a cross-sectional image at the point 2 in FIGS. 32A and 32B (in Comparative Example).

FIG. 32A is a graph showing the relation between time and voltage in the comparative example; FIG. 32B is a graph showing the relation between time and current in the comparative example. FIG. 33 is a cross-sectional image of a state observed with a confocal microscope at the point 2 in FIGS. 32A and 32B. In FIG. 33, lithium deposition which was not seen before the charge can be observed after the charge.

EXPLANATION OF REFERENCE

101: electrode, 102a: reaction product, 102b: reaction product, 102c: reaction product, 102d: reaction product, 102e: reaction product, 103: electrolytic solution, 201: electrode, 202a: reaction product, 202b: reaction product, 202c: reaction product, 202d: reaction product, 202e: reaction product, 203: electrolytic solution, 301: electrode, 303:

electrolytic solution, 302a: reaction product, 302b: reaction product, 302c: reaction product, 302d: reaction product, 302e: reaction product, 304: protective film, 400: storage battery, 402: positive electrode, 404: negative electrode, 406: electrolytic solution, 408: separator, 410: storage battery electrode, 412: current collector, 414: active material layer, 422: active material particle, 424: graphene, 501: lithium-ion secondary battery, 502: charger, 503: load, 800: positive electrode, 801: positive electrode current collector, 802: positive electrode active material, 803: negative electrode, 804: negative electrode current collector, 805: negative electrode active material, 806: lithium, 807: lithium, 808: whisker, 820: current flow direction, 821: negative electrode active material, 993: wound body, 950: secondary battery, 951: positive electrode can, 952: negative electrode can, 953: gasket, 954: positive electrode, 955: positive electrode current collector, 956: positive electrode active material layer, 957: negative electrode, 958: negative electrode current collector, 959: negative electrode active material layer, 960: separator, 970: secondary battery, 971: positive electrode current collector, 972: positive electrode active material layer, 973: positive electrode, 974: negative electrode current collector, 975: negative electrode active material layer, 976: negative electrode, 977: separator, 978: exterior body, 980: secondary battery, 981: positive electrode cap, 982: battery can, 983: positive electrode terminal, 984: positive electrode, 985: separator, 986: negative electrode, 987: negative electrode terminal, 988: insulating plate, 989: insulating plate, 991: PTC element, 992: safety valve mechanism, 994: negative electrode, 995: positive electrode, 996: separator, 997: terminal, 998: terminal, 6600: battery, 6601: wound body, 6602: terminal, 6603: terminal, 6604: battery can, 6605: terminal, 6606: circuit board, 6607: electric circuit, 6608: label, 6609: antenna, 6610: antenna, 6611: layer, 8040: portable information terminal, 8041: housing, 8042: display portion, 8043: button, 8044: icon, 8045: camera, 8046: microphone, 8047: speaker, 8048: connection terminal, 8049: solar cell, 8050: camera, 8051: charge and discharge control circuit, 8052: battery, 8053: DC-DC converter, 8054: switch, 8055: switch, 8056: switch, 8057: converter, 8100: power storage system, 8101: plug, 8102: display panel and the like, 8103: system power supply, 8104: panelboard, 8105: battery, 8106: battery group, 8107: BMU, and 8108: PCS.

This application is based on Japanese Patent Application serial No. 2013-004115 filed with Japan Patent Office on Jan. 11, 2013 and Japanese Patent Application No. 2013-030753 filed with Japan Patent Office on Feb. 20, 2013, the entire contents of which are hereby incorporated by reference.

What is claimed is:

1. A method of charging an electronic device comprising:
a power source;
a first electrode;
a second electrode; and
an electrolytic solution between the first electrode and the second electrode,
the method comprising:
supplying a first current from the power source that flows between the first electrode and the second electrode in a first direction during a first period; and
supplying a second current from the power source that flows between the first electrode and the second electrode in a second direction during a second period;
wherein the first direction and the second direction are opposite to each other,
wherein a reaction product grows on the first electrode by supplying the first current,
wherein the reaction product on the first electrode is dissolved by supplying the second current,
wherein the first period is longer than the second period, and
wherein the reaction product is a compound.

2. The method of charging the electronic device according to claim 1, wherein supplying the second current is repeated after the reaction product is dissolved.

3. The method of charging the electronic device according to claim 1, wherein the first electrode is a negative electrode and the second electrode is a positive electrode.

4. The method of charging the electronic device according to claim 1, wherein the first electrode is a positive electrode and the second electrode is a negative electrode.

5. The method of charging the electronic device according to claim 1, wherein the electronic device is a secondary battery.

6. The method of charging the electronic device according to claim 1, the electronic device further comprising a protective film that covers part of the first electrode,
wherein the reaction product that grows from a region of a surface of the first electrode that is not covered with the protective film is dissolved by supplying the second current.

7. The method of charging the electronic device according to claim 1,
wherein the first period is longer than the second period, and
wherein the second period is longer than or equal to 10 seconds and shorter than or equal to 30 seconds.

8. An electronic device comprising:
a power source;
a first electrode;
a second electrode; and
an electrolytic solution between the first electrode and the second electrode,
wherein the first electrode is configured to cause growth of a reaction product by a first current from the power source and is configured to cause dissolution of the reaction product by a second current from the power source,
wherein the second current is a current which flows in a direction opposite to a flow direction of the first current, and
wherein the reaction product is a compound.

9. The electronic device according to claim 8, wherein the power source is configured to supply the second current more than once during one charge.

10. The electronic device according to claim 8, wherein the first electrode is a negative electrode and the second electrode is a positive electrode.

11. The electronic device according to claim 8, wherein the first electrode is a positive electrode and the second electrode is a negative electrode.

12. The electronic device according to claim 8, wherein the electronic device comprises a secondary battery.

13. The electronic device according to claim 8, wherein the electrolytic solution is configured to deposit the reaction product on a surface of the first electrode.

14. The electronic device according to claim 8, wherein the reaction product is what is changed in quality and is degraded from part of the electrolytic solution.

15. An electronic device comprising:
a power source;
a first electrode;

a protective film that covers part of the first electrode;
a second electrode; and
an electrolytic solution between the first electrode and the second electrode,
wherein the first electrode is configured to cause growth of a reaction product by a first current from the power source and is configured to cause dissolution of the reaction product by a second current from the power source,
wherein the second current is a current which flows in a direction opposite to a flow direction of the first current,
wherein, by the first current, the reaction product is configured to grow from a region of a surface of the first electrode that is not covered with the protective film, and
wherein the reaction product is a compound.

16. The electronic device according to claim 15, wherein supplying the second current is repeated after the reaction product is dissolved.

17. The electronic device according to claim 15, wherein the first electrode is a negative electrode and the second electrode is a positive electrode.

18. The electronic device according to claim 15, wherein the first electrode is a positive electrode and the second electrode is a negative electrode.

19. The electronic device according to claim 15, wherein the electronic device comprises a secondary battery.

* * * * *